(12) United States Patent
Sato

(10) Patent No.: US 7,733,517 B2
(45) Date of Patent: Jun. 8, 2010

(54) INFORMATION PROCESSING APPARATUS AND CONTROL METHOD THEREOF, AND PROGRAM

(75) Inventor: Junko Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 11/686,505

(22) Filed: Mar. 15, 2007

(65) Prior Publication Data
US 2007/0229902 A1    Oct. 4, 2007

(30) Foreign Application Priority Data
Mar. 31, 2006  (JP) .............................. 2006-100400

(51) Int. Cl.
G06K 15/00  (2006.01)
G06K 15/02  (2006.01)
G06K 9/36   (2006.01)
H04N 1/46   (2006.01)

(52) U.S. Cl. ...................... 358/1.18; 358/1.12; 358/1.2; 358/537; 358/538; 382/282; 382/284; 382/306

(58) Field of Classification Search .................. 358/500, 358/1.18, 1.12, 1.2, 1.13, 3.28, 1.17, 537, 358/538, 540; 382/282, 284, 306
See application file for complete search history.

(56) References Cited

U.S. PATENT DOCUMENTS

| 6,416,082 | B1 | 7/2002 | Gayoso |
| 6,839,149 | B2 | 1/2005 | Herr |
| 7,203,898 | B2 | 4/2007 | Miyazato et al. |
| 7,471,401 | B2 | 12/2008 | Saito |
| 2002/0069228 | A1 | 6/2002 | Mori et al. |
| 2002/0131075 | A1 | 9/2002 | Kremer |
| 2004/0066527 | A1 | 4/2004 | Kloosterman et al. |
| 2004/0105128 | A1* | 6/2004 | Sano ......................... 358/1.18 |
| 2004/0190057 | A1 | 9/2004 | Takahashi et al. |
| 2005/0243371 | A1 | 11/2005 | Kanaya et al. |
| 2005/0289460 | A1 | 12/2005 | Tomita et al. |
| 2006/0082793 | A1* | 4/2006 | Goel et al. .................. 358/1.2 |

FOREIGN PATENT DOCUMENTS

| JP | 11-110535 | 4/1999 |
| JP | 2003-220738 | 8/2003 |
| JP | 2004-310746 | 11/2004 |
| WO | 2006/023106 | 3/2006 |
| WO | 2006/025590 | 3/2006 |

* cited by examiner

*Primary Examiner*—Charlotte M Baker
(74) *Attorney, Agent, or Firm*—Fitzpatrick, Cella, Harper & Scinto

(57) ABSTRACT

Bleed widths are set for finishing pages. An imposition method that requires to execute binding processing of sheets is set. Bleed regions including the finishing pages are determined based on the set bleed widths for the finishing pages, and the size of the finishing page. The allocation of manuscript data is so determined as to align the center of the manuscript data to be allocated to that of a bleed region on the side to undergo the binding processing of the determined bleed regions, based on the setting contents.

1 Claim, 49 Drawing Sheets

FIG. 4A

| NO | ATTRIBUTE INFORMATION | | REMARKS |
|---|---|---|---|
| 1 | PRINT METHOD | SINGLE-SIDED, DOUBLE-SIDED, AND BOOKLET PRINT | |
| 2 | SHEET SIZE | MANUSCRIPT SIZE OR FIXED SIZE | • Z-FOLD DESIGNATION IN CASE OF DESIGNATION OF "A4 + A3", "B4 + B3", AND "LETTER + LEDGER (11 × 17)"<br>• AUTOMATICALLY SELECT MANUSCRIPT SIZE OF FIRST CHAPTER / FIRST PAGE UPON DESIGNATION OF BOOKLET PRINT OR N-up PRINT |
| 3 | SHEET ORIENTATION | PORTRAIT AND LANDSCAPE | • SELECTABLE ONLY FOR FIXED SIZE |
| 4 | FINISHING SIZE | FIXED SIZE OR USER DESIGNATED SIZE | |
| 5 | IMPOSITION METHOD | LEAFLET, QUARTO, SADDLE STITCHING, AND CASING-IN | |
| 6 | PRINTER'S MARK / BLEED (OFFSET) | ON / OFF | |
| 7 | BINDING MARGIN / BINDING DIRECTION | | • ALLOW SHIFT AND ENLARGEMENT / REDUCTION DESIGNATION |
| 8 | N-up PRINT DESIGNATION | NUMBER OF PAGES, ALLOCATION ORDER, BOUNDARY LINE, ALLOCATION POSITION, ETC. | • NINE PATTERNS OF ALLOCATION POSITIONS<br>• ALLOW EQUAL-MAGNIFICATION PRINT DESIGNATION |
| 9 | ENLARGEMENT / REDUCTION | ON / OFF | • AUTOMATIC ON DESIGNATION UPON SELECTION OF SHEET SIZE = FIXED SIZE OR N-up PRINT; ALLOW OFF DESIGNATION |
| 10 | WATERMARK | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |
| 11 | HEADER / FOOTER | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |

FIG. 4B

| | | | |
|---|---|---|---|
| 12 | DISCHARGE METHOD | STAPLING / PUNCH HOLE | • ALLOW STAPLING OR PUNCH HOLE DESIGNATION ONLY FOR SINGLE-SIDED / DOUBLE-SIDED PRINT<br>• 1 OR 2 STAPLING POSITIONS AVAILABLE |
| 13 | BOOKBINDING DETAILS | OPENING DIRECTION, SADDLE STITCHING, ENLARGEMENT / REDUCTION DESIGNATION, BINDING MARGIN, SEPARATE BINDING DESIGNATION, ETC. | • ONLY IN BOOKLET PRINT |
| 14 | FRONT COVER / BACK COVER | | • PRINT DESIGNATION FOR FRONT COVER 1/2 AND BACK COVER 1/2<br>• PAPER FEED PORT (INCLUDING INSERTER) DESIGNATION |
| 15 | INDEX SHEET | | • ALLOW TO SET CHARACTER STRING PRINT ON INDEX PART AND ANNOTATION ON INDEX SHEET<br>• NOT ALLOW TO DESIGNATE BOOKLET PRINT |
| 16 | INTERLEAF | | • PAPER FEED PORT (INCLUDING INSERTER) DESIGNATION<br>• ALLOW TO PRINT MANUSCRIPT DATA ON INSERTED SHEET<br>• NOT ALLOW TO DESIGNATE BOOKLET PRINT |
| 17 | CHAPTER DIVISION | "NONE", "CHANGE FOR PAGE", AND "CHANGE FOR SHEET" | • FIX "CHANGE FOR SHEET" UPON DESIGNATION OF INDEX SHEET OR INTERLEAF<br>• "CHANGE FOR SHEET" IN SINGLE-SIDED PRINT |
| 18 | FINISHING | SADDLE STITCHING, CASING-IN, AND TRIMMING | |
| 19 | GLUED-ON COVER SIZE | FIXED SIZE OR USER DESIGNATED SIZE | |
| 20 | FINISHING ENLARGEMENT / REDUCTION | ON / OFF | |
| 21 | BLEED ENLARGEMENT / REDUCTION | ON / OFF | |

FIG. 5

| NO | ATTRIBUTE INFORMATION | | REMARKS |
|---|---|---|---|
| 1 | SHEET SIZE | MANUSCRIPT SIZE OR FIXED SIZE | • AUTOMATICALLY DESIGNATE "CHANGE FOR SHEET" UPON SELECTION OF FIXED SIZE<br>• ALLOW TO CHANGE ONLY DESIGNATED SHEET UPON SELECTION OF PLURAL SHEETS IN BOOK; ALLOW TO CHANGE SHEET SIZE IN DESIGNATION TO FIT TO BOOK |
| 2 | SHEET ORIENTATION | PORTRAIT OR LANDSCAPE | • ALLOW TO DESIGNATE ONLY FOR CASE OF FIXED SIZE |
| 3 | N-up PRINT DESIGNATION | NUMBER OF PAGES, ALLOCATION ORDER, BOUNDARY LINE, ALLOCATION POSITION, ETC. | • NINE PATTERNS OF ALLOCATION POSITIONS<br>• ALLOW EQUAL-MAGNIFICATION PRINT DESIGNATION |
| 4 | ENLARGEMENT / REDUCTION | ON / OFF | • AUTOMATIC ON DESIGNATION UPON SELECTION OF SHEET SIZE = FIXED SIZE OR N-up PRINT; ALLOW OFF DESIGNATION |
| 5 | WATERMARK | DISPLAY / NON-DISPLAY | • DESIGNATE WHETHER OR NOT TO DISPLAY ALL WATERMARKS DESIGNATED IN BOOK |
| 6 | HEADER / FOOTER | DISPLAY / NON-DISPLAY | • DESIGNATE WHETHER OR NOT TO DISPLAY ALL HEADERS / FOOTERS DESIGNATED IN BOOK |
| 7 | DISCHARGE METHOD | STAPLING | • ALLOW TO DESIGNATE OFF IN CASE OF STAPLING DESIGNATION IN BOOK; DEFAULT = ON |

FIG. 6

| NO | ATTRIBUTE INFORMATION | | REMARKS |
|---|---|---|---|
| 1 | PAGE ROTATION DESIGNATION | | • ALLOW TO DESIGNATE 0, 90, 180, OR 270° |
| 2 | WATERMARK | DISPLAY / NON-DISPLAY | • DESIGNATE WHETHER OR NOT TO DISPLAY ALL WATERMARKS DESIGNATED IN BOOK |
| 3 | HEADER / FOOTER | DISPLAY / NON-DISPLAY | • DESIGNATE WHETHER OR NOT TO DISPLAY ALL HEADERS / FOOTERS DESIGNATED IN BOOK |
| 4 | ZOOM | 50% ~ 200% | • DESIGNATE RELATIVE SCALE TO HAVE SIZE THAT FITS VIRTUAL LOGICAL PAGE REGION AS 100% |
| 5 | ALLOCATION POSITION | | • DESIGNATE FIXED NINE PATTERNS AND ARBITRARY POSITION |
| 6 | ANNOTATION | | |
| 7 | VARIABLE ITEM | | |
| 8 | PAGE DIVISION | | |

FIG. 14

DOCUMENT BODY SETTING — 1400

| SHEET SETTING | PAGE SETTING | FINISHING | EDIT | PAPER SOURCE | PRINT QUALITY |

OUTPUT SHEET SIZE (S): SRA3 ▼
ORIENTATION OF OUTPUT SHEET (T): ● PORTRAIT ○ LANDSCAPE

FINISHING SIZE (S): A3 ▼  DETAILS SETTING — 1401
ORIENTATION OF FINISHING PAGE (M): ● PORTRAIT ○ LANDSCAPE
☐ ENLARGE / REDUCE MANUSCRIPT TO FIT FINISHING SIZE — 1403

IMPOSITION MODE (X): ● STANDARD ○ SIMPLE
TYPE OF IMPOSITION (X): LEAFLET (1 (VERTICAL) ×1 (HORIZONTAL)) ▼   NUMBER OF IMPOSITION (X)... — 1402
IMPOSITION METHOD (X): PAGE ORDER ▼   PRINTER'S MARK / BLEED SETTING (X)...
☐ ADD PRINTER'S MARK OR BLEED   RECORD ALLOCATION SETTING UPON MULTI-RECORD PRINT(X)...
1404

☐ ENLARGE / REDUCE MANUSCRIPT TO FIT BLANK OF FINISHING PAGE (F)   BLANK OF FINISHING PAGE (M)...

RESTORE LATEST STORAGE STATE (V)

| OK | CANCEL | APPLY (A) | HELP (H) |

FIG. 16

PRINTER'S MARK / BLEED SETTING

TYPE (P) :  [ ⌐ DOUBLE PRINTER'S MARK ▼ ]

LINE WIDTH (B) :  [ ——— 0.1mm ▼ ]

PRINTER'S MARK TO BE DISPLAYED (T) :
- ☑ CORNER PRINTER'S MARK (X)
- ☑ CENTER PRINTER'S MARK (X) — 1601
- ☑ FOLD PRINTER'S MARK (X)

☑ ADD PRINTER'S MARK TO ONLY COVER

BLEED WIDTH :
(WIDTH OF INNER AND OUTER PRINTER'S MARKS)

- TOP (X) : [ 3.0 ] mm (0.0~330.0)
- BOTTOM (X) : [ 3.0 ] mm (0.0~330.0)
- EDGE (X) : [ 3.0 ] mm (0.0~330.0)
- GUTTER (X) : [ 3.0 ] mm (0.0~330.0)

— 1602

☑ SET TOP, BOTTOM, EDGE, AND GUTTER BLEED WIDTHS TO SAME VALUE (X)

☐ SUPERIMPOSE MANUSCRIPT ON BLEED WIDTHS BY ENLARGING / REDUCING MANUSCRIP (X) — 1603

☑ ADD ADDITIONAL INFORMATION (X)     [ PROPERTY (X) ]

[ OK ]   [ CANCEL ]   [ HELP(H) ]

FIG. 17

WHOLE DOCUMENT SETTING

| SHEET SETTING | PAGE SETTING | FINISHING | EDIT | PAPER SOURCE | PRINT QUALITY |

PRINT METHOD (Y):  ○ SINGLE-SIDED PRINT
○ DOUBLE-SIDED PRINT

BINDING (B): [ CASING-IN ▼ ] ~1700

OPENING DIRECTION (O): [ LEFT OPENING ▼ ]

☐ ADD BOOKLET BINDING MARGIN (G)   [ 5 ] mm (0~30)
☐ APPROACH MANUSCRIPT TO BINDING POSITION (B)

ADJUST MANUSCRIPT (J): ● REDUCE TO FIT PRINT REGION SET IN BLANK
○ MOVE TO FIT BINDING WIDTH

COVER SHEET SIZE: [ A3 WIDE ▼ ] ~1702
SHEET DESIGNATION: [ Type A ▼ ] ~1703

FOR DETAILS SETTING OF PAPER FEED UNIT, SELECT "COVER / INTERLEAF SETTING" FROM MAIN WINDOW TO CONTROL MANUSCRIPT PRINT ON COVER, SELECT "PRINT MANUSCRIPT ON FIRST / LAST PAGE OF SHEETS"

[ EDIT COVER (S)... ]

CHAPTER DIVISION (X): [ NOT DESIGNATED ▼ ]

FINISHING SETTING (F): [ GLUE AND TRIM COVER ▼ ] ~1701
GLUE AND TRIM COVER
NOT USED

[ RESTORE LATEST STORAGE STATE (V) ]

[ OK ]  [ CANCEL ]  [ APPLY (A) ]  [ HELP (H) ]

| CHAPTER SETTING | | | | | ? ✕ |
|---|---|---|---|---|---|
| SHEET SETTING | PAGE SETTING | FINISHING | EDIT | PAPER SOURCE | PRINT QUALITY |

☐ SET FOLLOWING ITEMS TO HAVE SETTING DIFFERENT ~2001
FROM DOCUMENT(I)

OUTPUT SHEET SIZE (S) : [ A3 ▼ ]

ORIENTATION OF
    OUTPUT SHEET (T) :    [A] ⦿ PORTRAIT   [A] ○ LANDSCAPE

---

☐ SET FOLLOWING ITEMS TO HAVE SETTING DIFFERENT ~2002
FROM DOCUMENT (D)

FINISHING SIZE (S) :    [ PLAIN PAPER ]

ORIENTATION OF
    FINISHING PAGE (M) :    [A] PORTRAIT

☐ ENLARGE / REDUCE MANUSCRIPT TO FIT FINISHING SIZE

---

☐ SET FOLLOWING ITEMS TO HAVE SETTING DIFFERENT ~2003
FROM DOCUMENT (_)

☐ ENLARGE / REDUCE MANUSCRIPT TO FIT BLANK OF
       FINISHING PAGE (F)

[ RESTORE LATEST STORAGE STATE (V) ]

[ OK ]   [ CANCEL ]   [ APPLY (A) ]   [ HELP (H) ]

FIG. 21

PAGE SETTING

| SHEET SETTING | EDIT | PRINT QUALITY |

ROTATION OF MANUSCRIPT PAGE (T): [R] OFF ▼

☑ SET FOLLOWING ITEMS TO HAVE SETTING DIFFERENT FROM CHAPTER (I) ~2101
☐ PRINT MANUSCRIPT AT EQUAL SCALE (S)
☐ ENLARGE / REDUCE MANUSCRIPT WITH REFERENCE TO  100  % (25~200)
   PRINT REGION SET IN BLANK (E):

ALLOCATION OF MANUSCRIPT (G): [☐] CENTER ▼

DESIGNATE ALLOCATION (C)...

RESTORE LATEST STORAGE STATE (V)

| OK | CANCEL | APPLY (A) | HELP (H) |

2100

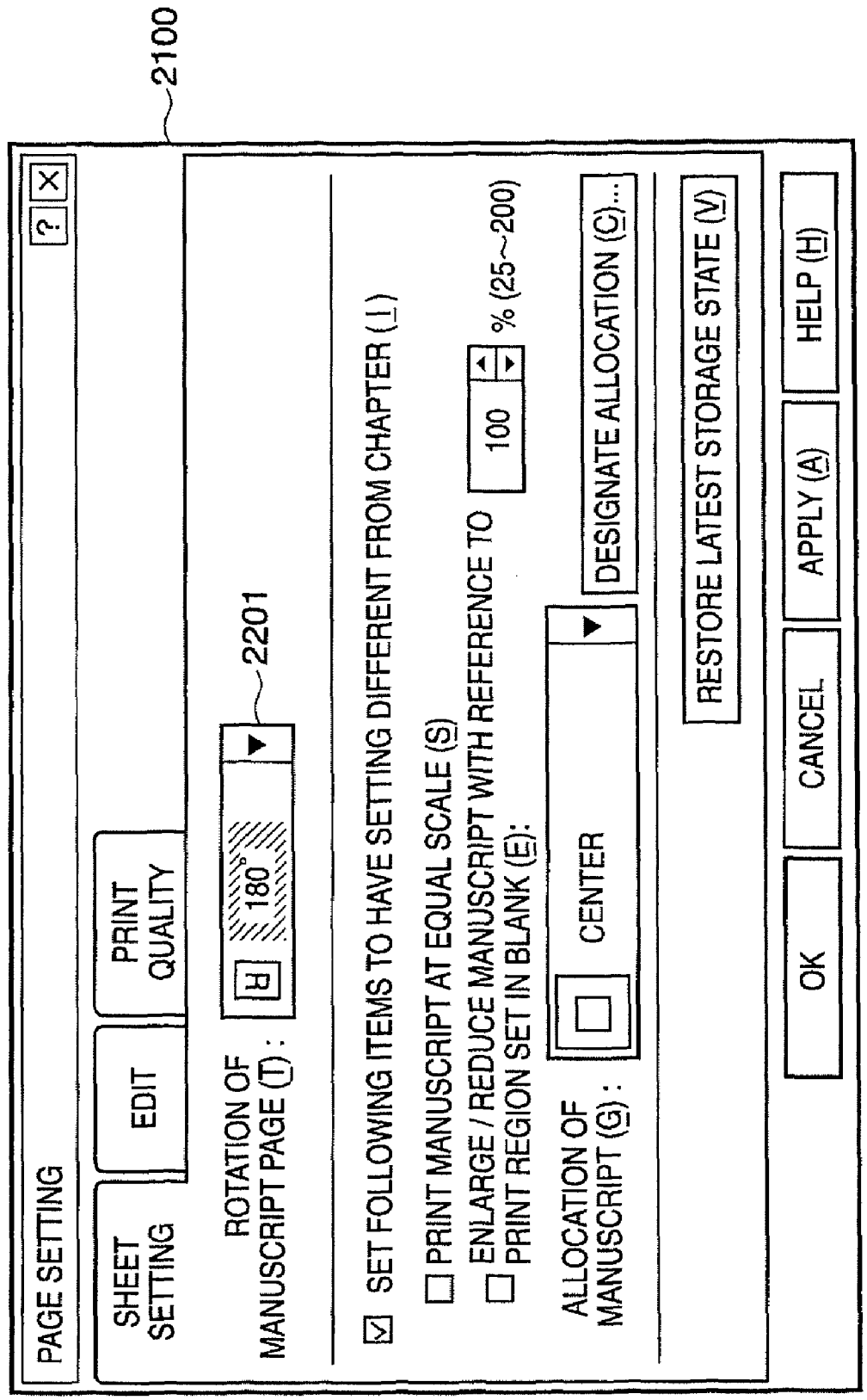

F I G. 29
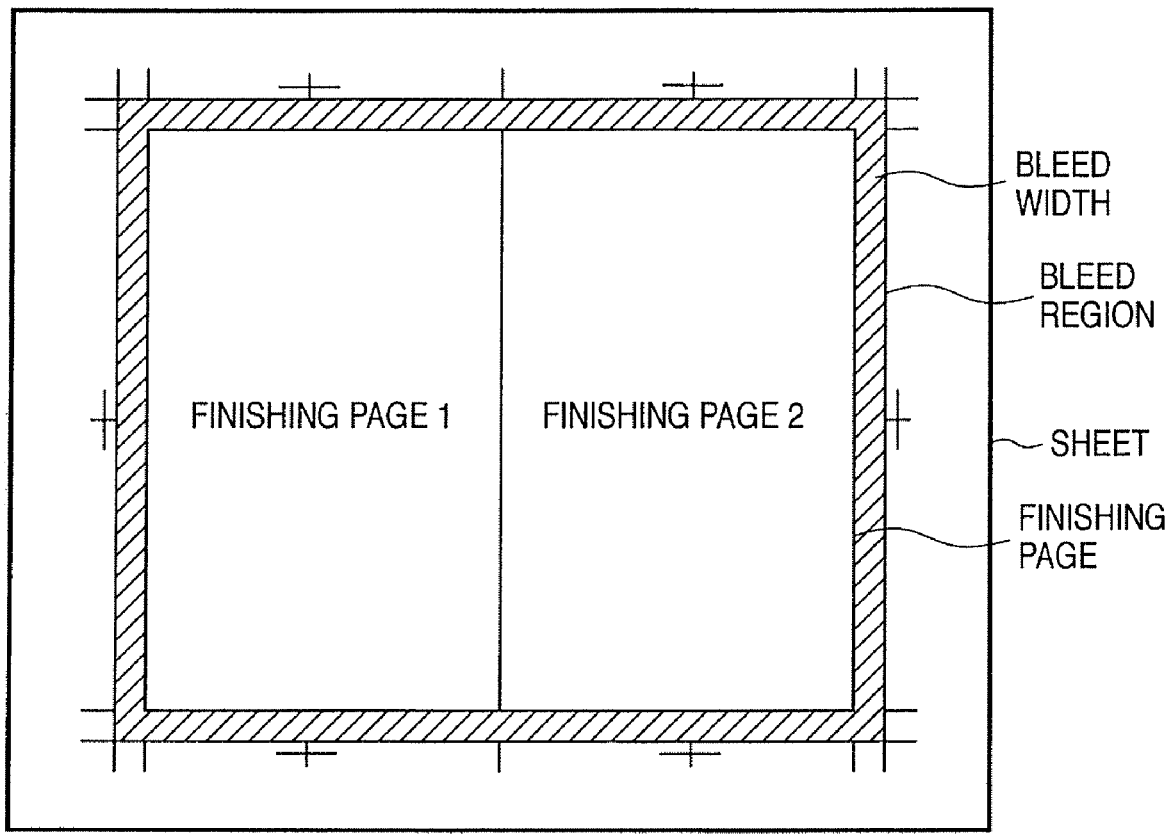

FIG. 30
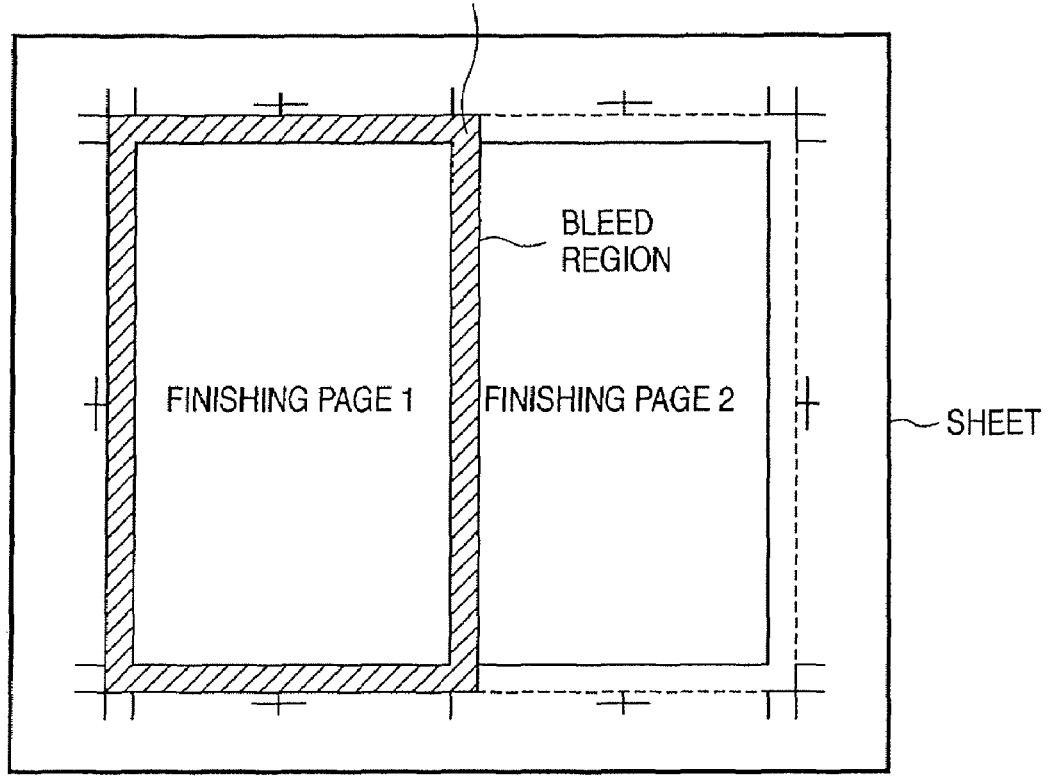
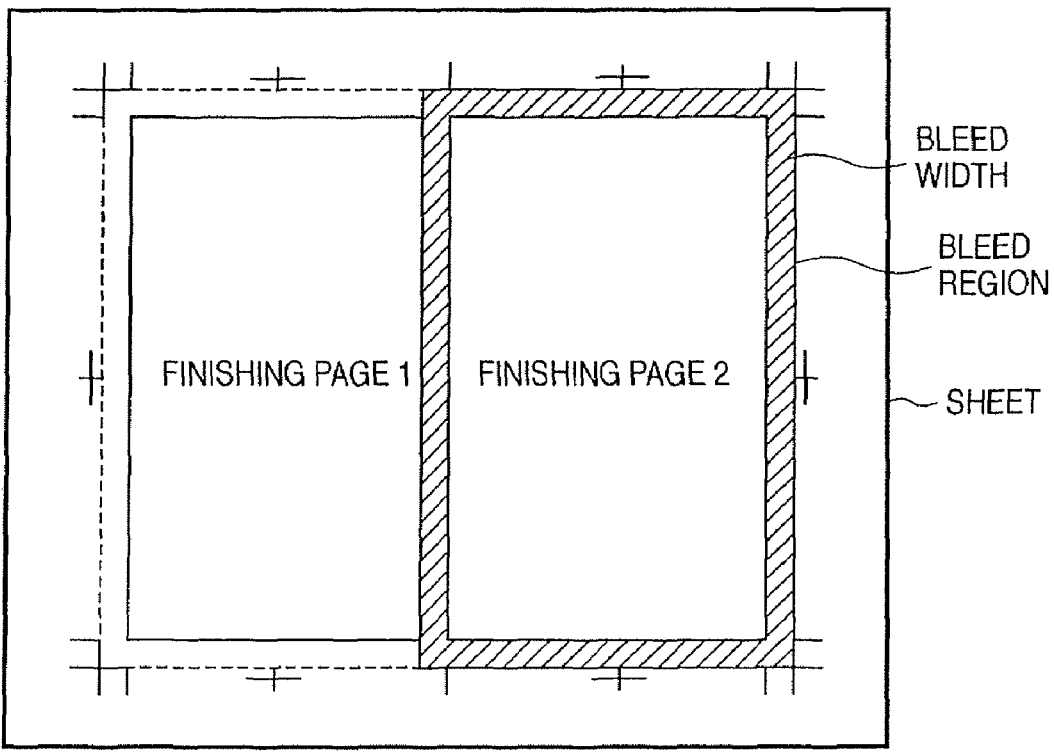

FIG. 31
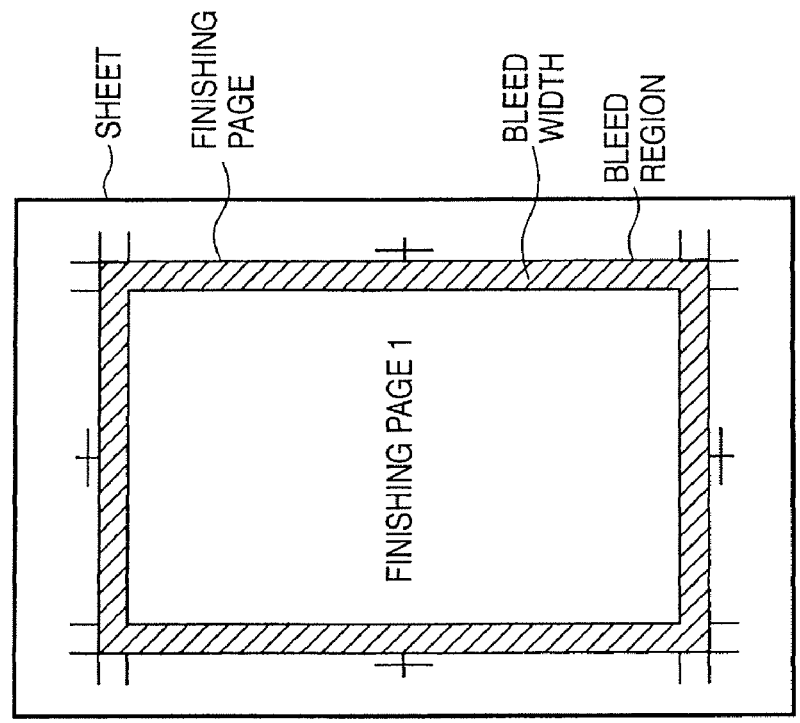
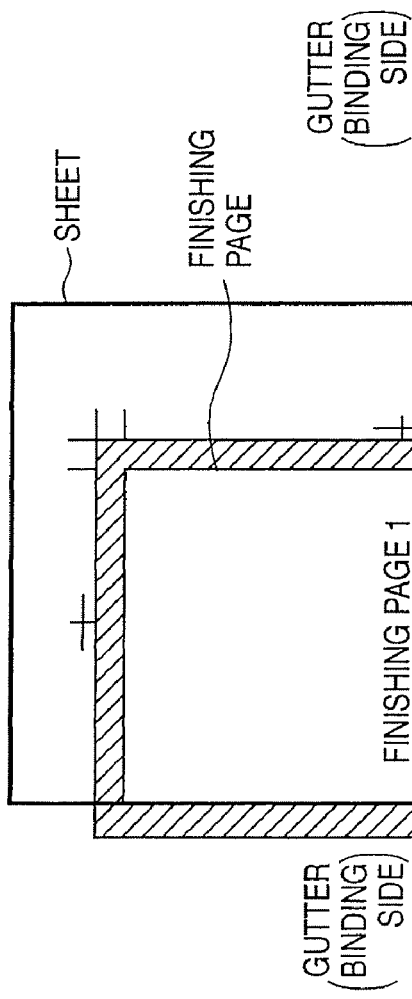

FIG. 33
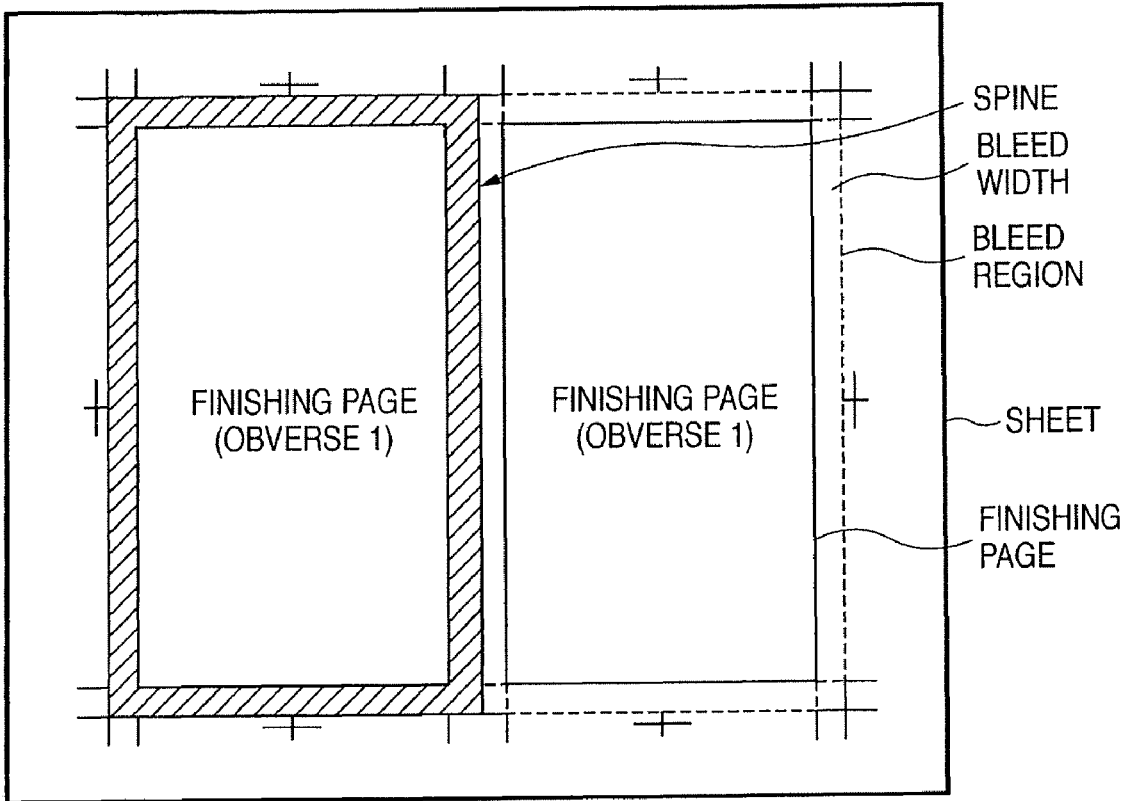
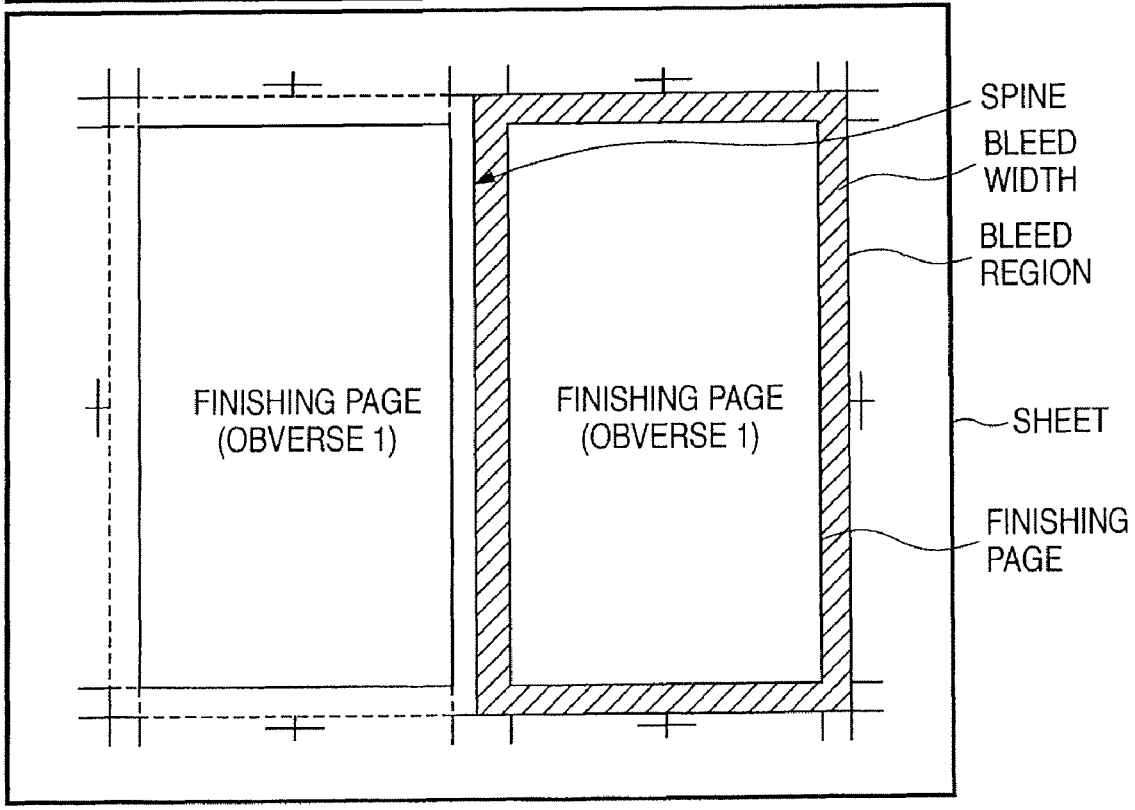

FIG. 41
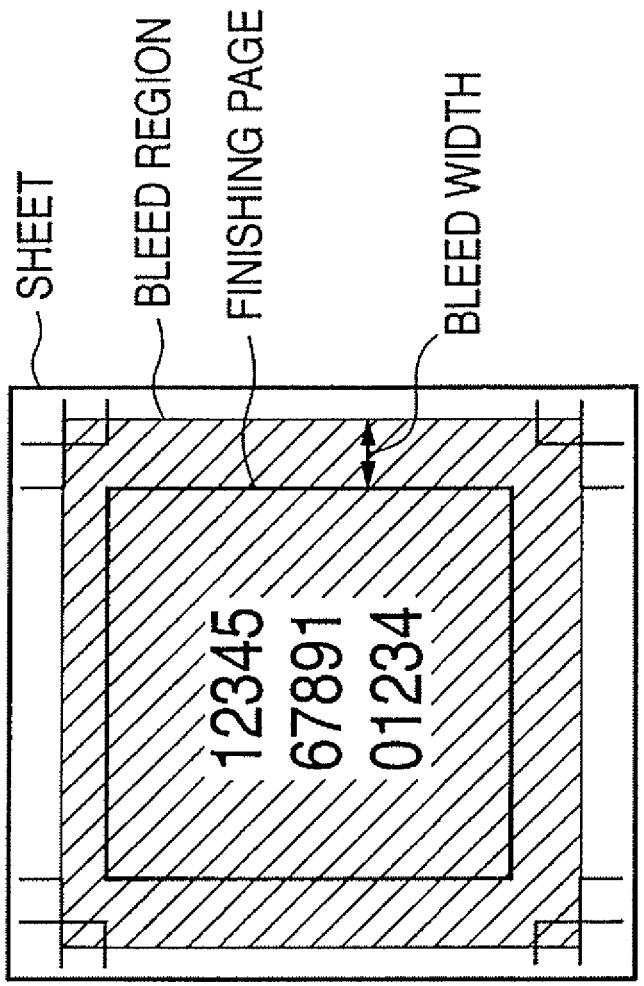
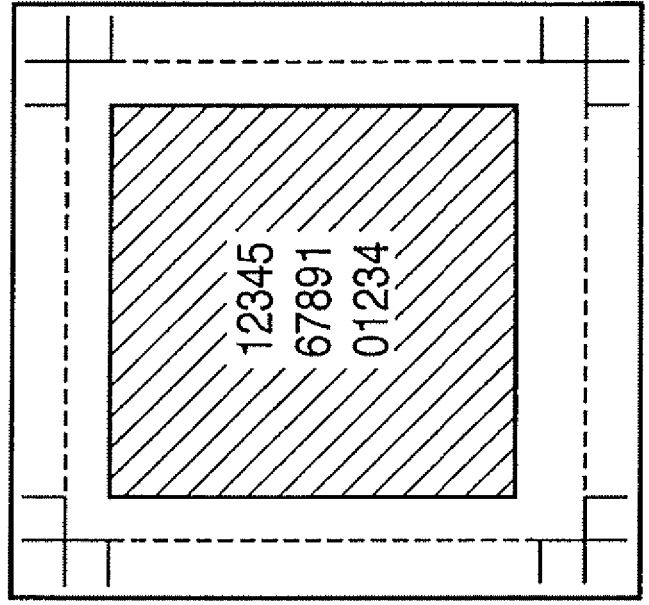

EXAMPLE OF RECEIVED MANUSCRIPT

INFORMATION PROCESSING APPARATUS AND CONTROL METHOD THEREOF, AND PROGRAM

BACKGROUND OF THE INVENTION

1. Field of the Invention

The present invention relates to an information processing apparatus and control method thereof, and a program, which execute imposition processing for laying out a plurality of finishing pages on a paper sheet, and laying out manuscript data on the respective finishing pages.

2. Description of the Related Art

A commercial printing business receives an order of a creation request of printed materials (magazine, newspaper, brochure, advertisement, gravure, etc.) from a third party (customer, client), creates printed materials desired by the client, and delivers them to the client so as to get a reward. The commercial printing business still prevalently uses a large-scale printing device such as an offset prepress & printing press even today.

Such printing business proceeds with operations via various processes. Such processes include, for example, manuscript reception, design & layout, comprehensive layout (presentation by means of printer output), proofing (layout correction & color correction), proof print, artwork preparation, print, post-process, shipping, and the like. Artwork preparation is mandatory for use of the aforementioned printing press, and once an artwork is prepared, it is not easy and is disadvantageous in terms of cost to correct it. Hence, elaborate proofing, i.e., layout checking and color confirmation operations are indispensable.

In this manner, such printing business requires a large-scale device, and takes considerable time to create printed materials desired by clients. However, these operations require expert knowledge, i.e., know-how of experts called craftsmen. For example, Japanese Patent Laid-Open No. 11-110535 discloses a technique for receiving a manuscript or its part data, settling a design and layout, and making proof printing.

Meanwhile, in recent years, along with the advent of high-speed, high image quality electrophotographic printing devices and ink-jet printing devices, a so-called print-on-demand market prevails as competition with the aforementioned printing business. Print-on-demand will be abbreviated as POD hereinafter.

The POD aims at handling print processing within a short delivery period by dividing a job to be handled by a printing device into those of relatively smaller lots without using any large-scale device or system. Especially, this POD implements digital prints using digital data by fully utilizing a digital image forming device such as a digital copying machine, digital multi-function peripheral, and the like in place of the large-scale printing press and printing scheme. A POD market as a POD-based business category has been developed. Such POD market merges digitalization compared to the conventional printing business, effectively utilizes computerized management and control, and makes an attempt to reach the printing business level using computers.

In such situation, PFP (Print For Pay) as a print service of a copy/print shop, CRD (Centralized Reproduction Department) as an in-house print service, and the like are known in the POD market. Note that PFP is a short for Print For Pay, and CRD is a short for Centralized Reproduction Department.

Japanese Patent Laid-Open No. 2004-310746 describes, e.g., a scheme for implementing POD using electrophotographic and ink-jet printers without using any physical plates for printing, and managing respective operation processes.

In case of the POD business field, unlike offset printing, clients who bring manuscripts into printing companies include not only DTP (desktop publishing) designers but also many office workers, students, and the like. For this reason, various manuscript forms are brought into printing companies, which cannot suppose them. For example, when a client desires borderless finishing, there are no margins or there are unnecessary printer's marks or margins, or the finishing size often does not match that he or she wants.

In such case, since the printing company cannot receive such manuscript in an imposition application intact, a skilled operator of the printing company masks unnecessary printer's marks or margins which are originally added by a DTP application in advance, or forms a margin, thus requiring a pre-process.

Furthermore, a general imposition application does not often consider margins, printer's marks, blanks, and the like on a source manuscript. For this reason, if the right and left/top and bottom margins do not have uniform widths, the center of the finish that the client intended does not match the center of the finish of the imposition application. In such case, the operator must finely adjust the center by manually shift the manuscript.

Normally, in the case of offset printing, post-processing (finishing processing) such as trimming, saddle stitching, case binding, sheet folding, punching, and the like is executed using an offline finisher. In the case of on-demand printing, on the other hand, an inline finisher and offline finisher connected to a digital MFP (multi-function peripheral) are normally used.

For example, even when printing the same contents, if a delivery period is short and the number of copies is small, the inline finisher is often used; if the number of copies is large, the offline finisher is often used. However, a print company must attain consistent finished results demanded by their clients using either means.

For this reason, the print company often must change the imposition method depending on the inline or offline finisher. For example, in case of case binding using the inline finisher, because the inline finisher trims only three sides (i.e., "top, bottom, and edge"), a finishing page must be aligned with the "binding" side of a sheet. In contrast, in the case of the offline finisher, print processing and post-processing are executed in different procedures, and the offline finisher trims four sides (i.e., "top, bottom, edge, and gutter"), and a finishing page must be rendered at the center of a sheet. For this reason, the print company must manually change the imposition method depending upon whether the inline or offline finisher is used in post-processing.

Also, manuscript data must also be changed depending upon the post-processing. For example, since the inline finisher does not trim the "gutter" side, if the four sides of a manuscript similarly have margins, the margin at the "gutter" side is impeditive. However, if the offline finisher is used, since it also trims the "gutter" side, the margin preferably exists on the "gutter" side. For this reason, the print company must execute pre-processing before imposition to form a manuscript suited to either the inline or offline finisher used in post-processing.

SUMMARY OF THE INVENTION

The present invention has been made to solve the aforementioned problems, and has as its object to provide an information processing apparatus and control method thereof, and a program, which can execute imposition processing of manuscript data more efficiently.

According to one aspect of the present invention, an information processing apparatus which executes imposition processing for laying out a finishing page on a sheet to print manuscript data on the sheet, comprises:

first setting means for setting a bleed width for the finishing page;

second setting means for setting an imposition method that requires to execute binding processing of the sheet;

determination means for determining a bleed region including the finishing page based on the bleed width for the finishing page, which is set by the first setting means, and a size of the finishing page; and allocation means for determining an allocation of the manuscript data so as to align an inner side of a bleed region on a side to undergo the binding processing of the bleed region determined by the determination means to a binding side on the sheet based on setting contents by the second setting means.

In a preferred embodiment, when the second setting means sets saddle stitching as an imposition method, the allocation means determines the allocation of the manuscript data so as to align the inner side of the bleed region on the side to undergo the binding processing of the bleed region determined by the determination means to the binding side on the sheet.

In a preferred embodiment, the apparatus further comprises third setting means for, when the second setting means sets case binding as an imposition method, setting whether or not the sheet is trimmed using an inline finisher attached to a printing device, wherein when the third setting means sets to trim the sheet using the inline finisher attached to the printing device, the allocation means determines the allocation of manuscript data for an inner sheet of casing-in so as to align the inner side of the bleed region on the side to undergo the binding processing of the bleed region determined by the determination means to the binding side on the sheet, and when the third setting means sets not to trim the sheet using the inline finisher attached to the printing device, the allocation means determines the allocation of manuscript data for an inner sheet of case binding so as to leave the bleed region on the side to undergo the binding processing of the bleed region determined by the determination means.

In a preferred embodiment, the allocation means determines allocations of manuscript data on a front cover and a back cover of case binding so as to align an inner side of a bleed region on the side to undergo binding processing to a spine side of bleed regions on each of the front cover and the back cover with respect to a sheet for cover of case binding to a binding side on the spine side on the sheet independently of a determination result of the third setting means.

In a preferred embodiment, the allocation means determines the allocation of manuscript data with respect to the finishing page to align a center of the manuscript data to be allocated to a center of the bleed region determined by the determination means.

In a preferred embodiment, the apparatus further comprises generation means for generating print data required to print the manuscript data in accordance with the allocation determined by the allocation means.

According to another aspect of the present invention, a method of controlling an information processing apparatus which executes imposition processing for laying out a finishing page on a sheet to print manuscript data on the sheet, comprises:

an bleed width setting step of setting a bleed width for the finishing page;

an imposition method setting step of setting an imposition method that requires to execute binding processing of the sheet;

a determination step of determining bleed region including the finishing page based on the bleed width for the finishing page, which is set in the bleed width setting step, and a size of the finishing page; and allocation step of determining an allocation of the manuscript data so as to align an inner side of a bleed region on a side to undergo the binding processing of the bleed region determined in the determination step to a binding side on the sheet based on setting contents in the imposition method setting step.

According to still another the present invention, a program, stored in a computer readable medium, for making a computer execute control of an information processing apparatus which executes imposition processing for laying out a finishing page on a sheet to print manuscript data on the sheet, the program makes the computer execute:

an bleed width setting step of setting a bleed width for the finishing page;

an imposition method setting step of setting an imposition method that requires to execute binding processing of the sheet;

a determination step of determining a bleed region including the finishing page based on the bleed width for the finishing page, which is set in the bleed width setting step, and a size of the finishing page; and allocation step of determining an allocation of the manuscript data so as to align an inner side of a bleed region on a side to undergo the binding processing of the bleed region determined in the determination step to a binding side on the sheet based on setting contents in the imposition method setting step.

Further features of the present invention will become apparent from the following description of exemplary embodiments with reference to the attached drawings.

BRIEF DESCRIPTION OF THE DRAWINGS

FIG. 4A shows an example of book attributes (document setting information 403) according to the embodiment of the present invention;

FIG. 4B shows an example of book attributes (document setting information 403) according to the embodiment of the present invention;

FIG. 5 shows an example of chapter attributes according to the embodiment of the present invention;

FIG. 6 shows an example of page attributes according to the embodiment of the present invention;

FIG. 14 shows an example of a "document style setting" window of the bookbinding application according to the embodiment of the present invention;

FIG. 16 shows an example of a "printer's mark & bleed setting" window according to the embodiment of the present invention;

FIG. 17 shows an example of a "document style setting" window of the bookbinding application according to the embodiment of the present invention;

FIG. 19 shows an example of a "chapter style setting" window of the bookbinding application according to the embodiment of the present invention;

FIG. 21 shows an example of a "page detail setting" window of the bookbinding application according to the embodiment of the present invention;

FIG. 22 shows an example of a "page detail setting" window of the bookbinding application according to the embodiment of the present invention;

FIG. 29 shows an example of a page layout generated by the bookbinding application according to the embodiment of the present invention;

FIG. 30 shows an example of a page layout generated by the bookbinding application according to the embodiment of the present invention;

FIG. 31 shows an example of a page layout generated by the bookbinding application according to the embodiment of the present invention;

FIG. 33 shows an example of a page layout generated by the bookbinding application according to the embodiment of the present invention;

FIG. 41 shows an example of the output result of a manuscript according to the embodiment of the present invention;

DESCRIPTION OF THE EMBODIMENTS

Figure 1:
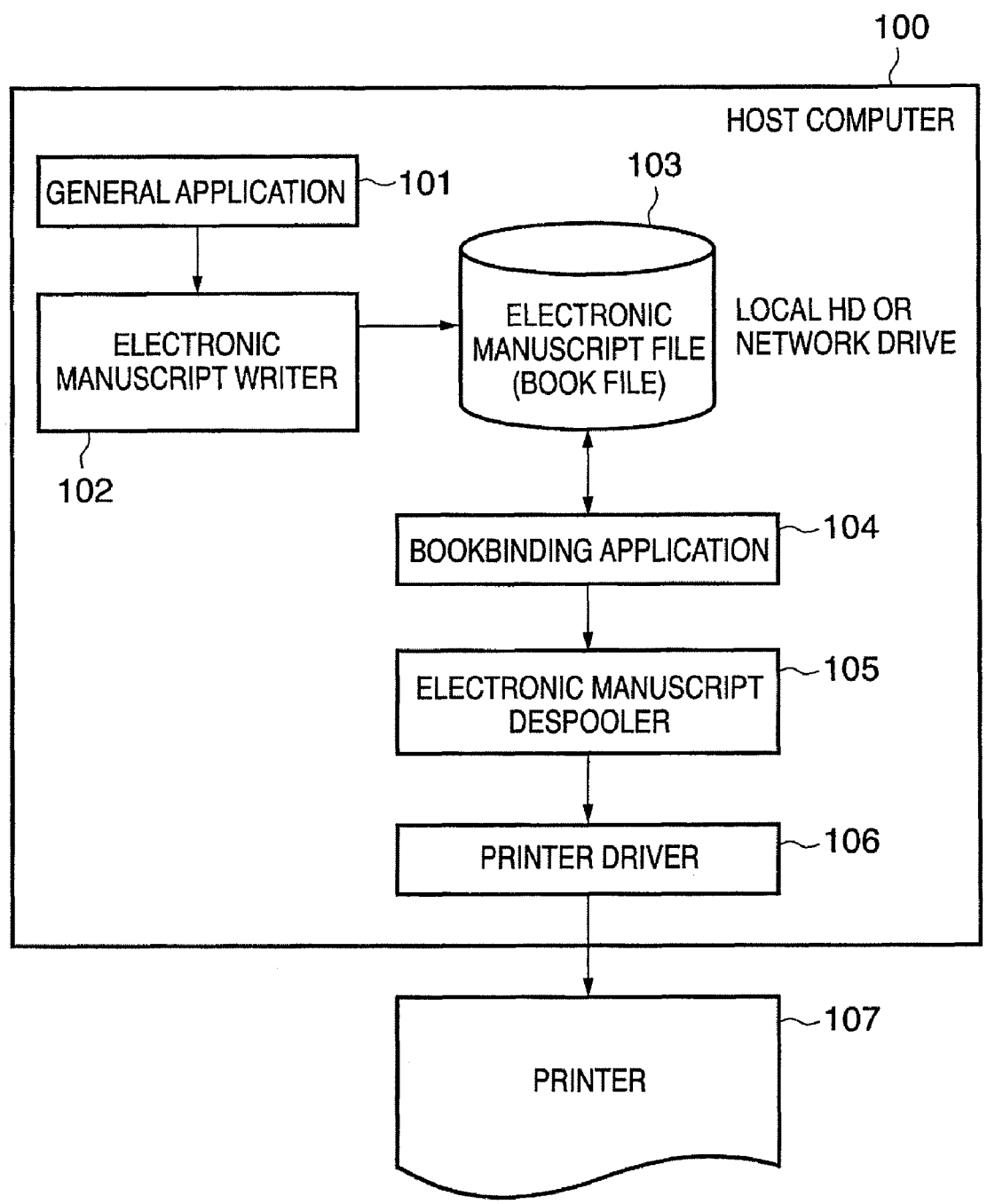
FIG. 1 is a block diagram showing the software configuration of a document processing system according to an embodiment of the present invention.

Preferred embodiments of the present invention will now be described in detail with reference to the drawings. It should be noted that the relative arrangement of the components, the numeral expressions and numerical values set forth in these embodiments do not limit the scope of the present invention unless it is specifically stated otherwise.

The present invention relates to a document processing system which has an imposition function which can lay out a plurality of finishing pages on a paper sheet, and can lay out and print one or a plurality of manuscript data on each finishing page. The finishing page (the size of the finishing page will be referred to as a finishing size hereinafter) is a page (size) which is obtained by trimming unnecessary regions of a print paper sheet, and becomes a final printed material. However, in case of pages including a front cover, spine, and back cover like a cover sheet of case binding, the finishing page (size) indicates a page (size) including those of a final printed material.

This document processing system is comprising a designation unit for designating bleed widths (bleeds) on respective sides of a finishing page, the finishing page size, output sheet size, and the like, wherein the layout of manuscript data is determined by aligning the center of the manuscript data to that of a region (to be referred to as a bleed region) to which bleed widths (bleeds) are added to the respective sides of the finishing page.

Also, this document processing system is wherein when manuscript data is embedded with manuscript setting information such as page box information or the like of a PDF (Portable Document Format) document, that page box information is automatically set in parameters of the document processing system. In this way, the need for user's designations of the bleed widths, finishing page size, output sheet size, and the like can be obviated.

When manuscript data protrudes from the bleed region, the protruding region is masked so as to prevent printer's marks (also called offset position marks or register marks) printed outside the bleed region from being overwritten.

When manuscript data has a size different from a desired finishing size, the manuscript data can be enlarged or reduced to have a fixed pattern to fall within the finishing size according to an operator's designation.

Furthermore, when manuscript data has no margins, the manuscript data can be enlarged or reduced to have a fixed pattern according to an operator's designation until all the margins desired by the user are filled.

In this way, manuscript data of an arbitrary format can undergo imposition intact without any pre-processing, and the finish of user's ideals can be attained by simple operations.

This document processing system comprises a post-processing designation unit which designates whether to execute post-processing using an offline finisher or inline finisher upon designation of booklet imposition. With this designation, the rendering method of the finishing page can be dynamically switched between the offline finisher designation and inline finisher designation.

In this way, the need for selective generation of manuscript data for the inline finisher and offline finisher by the user can be obviated, and the same finish can be obtained using the same manuscript data in both the inline finisher and offline finisher.

[Overview of Document Processing System]

In the document processing system according to an embodiment of the present invention, a data file created by a general application is converted into an electronic manuscript file by an electronic manuscript writer. A bookbinding application provides a function of editing that electronic manuscript file.

Note that in this example, the functions of the general application, the electronic manuscript writer, the bookbinding application, an electronic manuscript despooler, and the like are separated to clarify various functions implemented by the document processing system. However, a package provided to the user is not limited to these. For example, these functions may be provided as an application or graphic engine which combines them.

<Example of Software Configuration of Document Processing System>

FIG. 1 is a block diagram showing the software configuration of the document processing system according to the embodiment of the present invention.

The document processing system is implemented by a computer 100 (to be also referred to as a host computer hereinafter) as a preferred embodiment of a document processing apparatus (information processing apparatus) of the present invention.

A general application 101 is an application program which provides various functions such as wordprocessing, spreadsheet, photo retouch, draw or paint, presentation, text edit, and the like. This general application 101 has a print function for an OS (operating system) which runs on the computer 100. Such general application 101 uses a predetermined interface (called a GDI: Graphic Device Interface in general) which is provided by the OS upon printing application data such as created document data, image data, and the like.

That is, an arbitrary general application 101 sends output commands (called GDI functions) of a predetermined format depending on the OS to an output module (not shown) of the OS that provides a predetermined interface so as to print created data. Upon reception of the output commands, the output module converts the output commands into a format that can be processed by an output device such as a printer and the like, and outputs the converted commands (called DDI: Device Driver Interface functions).

Since the format that can be processed by the output device differs depending on the types and vendors, models, and the like of devices, a device driver for controlling a device is provided for each device. The OS generates print data by converting the commands using that device driver, and bundles it with a JL (Job Language), thus generating a print job. When Microsoft Windows is used as the OS, a module called GDI (Graphic Device Interface) corresponds to the aforementioned output module.

An electronic manuscript writer 102 is a software module which is prepared by improving the aforementioned device driver, and is provided to implement the document processing system of the present invention. However, the electronic manuscript writer 102 does not intend to any specific output device, and converts the output commands into a format that can be processed by a bookbinding application 104 and a printer driver 106 (to be described later).

The format after conversion by the electronic manuscript writer 102 (to be referred to as an "electronic manuscript format" hereinafter) is not particularly limited as long as it can express a manuscript for each page using a detailed form. Of practical standard formats, for example, a PDF format of Adobe Systems, U.S.A., an SVG (Scalable Vector Graphics) format published by W3C, U.S.A., and the like can be adopted as the electronic manuscript format.

When the general application 101 uses the electronic manuscript writer 102, it designates the electronic manuscript writer 102 as a device driver used in output, and then executes printing. However, an electronic manuscript file itself generated by the electronic manuscript writer 102 does not have a perfect format as an electronic manuscript file.

For this reason, the bookbinding application 104 designates the electronic manuscript writer 102 as a device driver, and application data is converted into an electronic manuscript file under the control of the bookbinding application 104. The bookbinding application 104 completes a new, imperfect electronic manuscript file generated by the electronic manuscript writer 102 as an electronic manuscript file having a format to be described later.

In the following description, when this difference must be clearly identified, a file created by the electronic manuscript writer 102 will be referred to as an electronic manuscript file, and an electronic manuscript file to which a structure is given by the bookbinding application 104 will be referred to as a book file. Also, when these files need not be especially distinguished from each other, all of a document file, electronic manuscript file, and book file generated by the application will be referred to as a document file (or document data).

In this way, the general application 101 prints its application data by designating the electronic manuscript writer 102 as a device driver. As a result, the application data is converted into an electronic manuscript format which includes pages (to be referred to as "logical pages" or "manuscript pages" hereinafter) defined by the general application 101 as a unit. The application data in this electronic manuscript format is stored in a storage medium such as a hard disk or the like as an electronic manuscript file 103.

Note that the hard disk may be a local drive of a computer which implements the document processing system of this embodiment, or may be a drive provided on a network when the system is connected to the network.

When the general application 101 itself has a capability of generating data in the electronic manuscript format, it need not execute printing by designating the electronic manuscript writer 102. In this case, the application data of the electronic manuscript format generated by the general application 101 itself can be converted into an electronic manuscript file under the control of the bookbinding application 104.

The bookbinding application 104 provides functions of loading the electronic manuscript file or book file 103, and allowing the user to edit the loaded file to the user.

Upon printing the book file 103 edited by the bookbinding application 104, the bookbinding application 104 launches an electronic manuscript despooler 105. The electronic manuscript despooler 105 is a program module installed in the computer together with the bookbinding application 104. The electronic manuscript despooler 105 is a module used to output rendering data to the printer driver 106 upon printing a document (book file) used by the bookbinding application 104.

The electronic manuscript despooler 105 reads out the designated book file 103 from the hard disk, generates output commands suited to the output module of the OS so as to print respective pages in a format described in the book file 103, and outputs the generated commands to the output module. In this case, the electronic manuscript despooler 105 designates, as a device driver, the printer driver 106 of a printer 107 used as the output device. The output module converts the received output commands into device commands that can be interpreted by the printer 107 using the printer driver 106 of the designated printer 107. The device commands are sent to the printer 107, which prints images according to the device commands on print sheets.

<Example of Hardware Arrangement of Document Processing System>

Figure 2A:
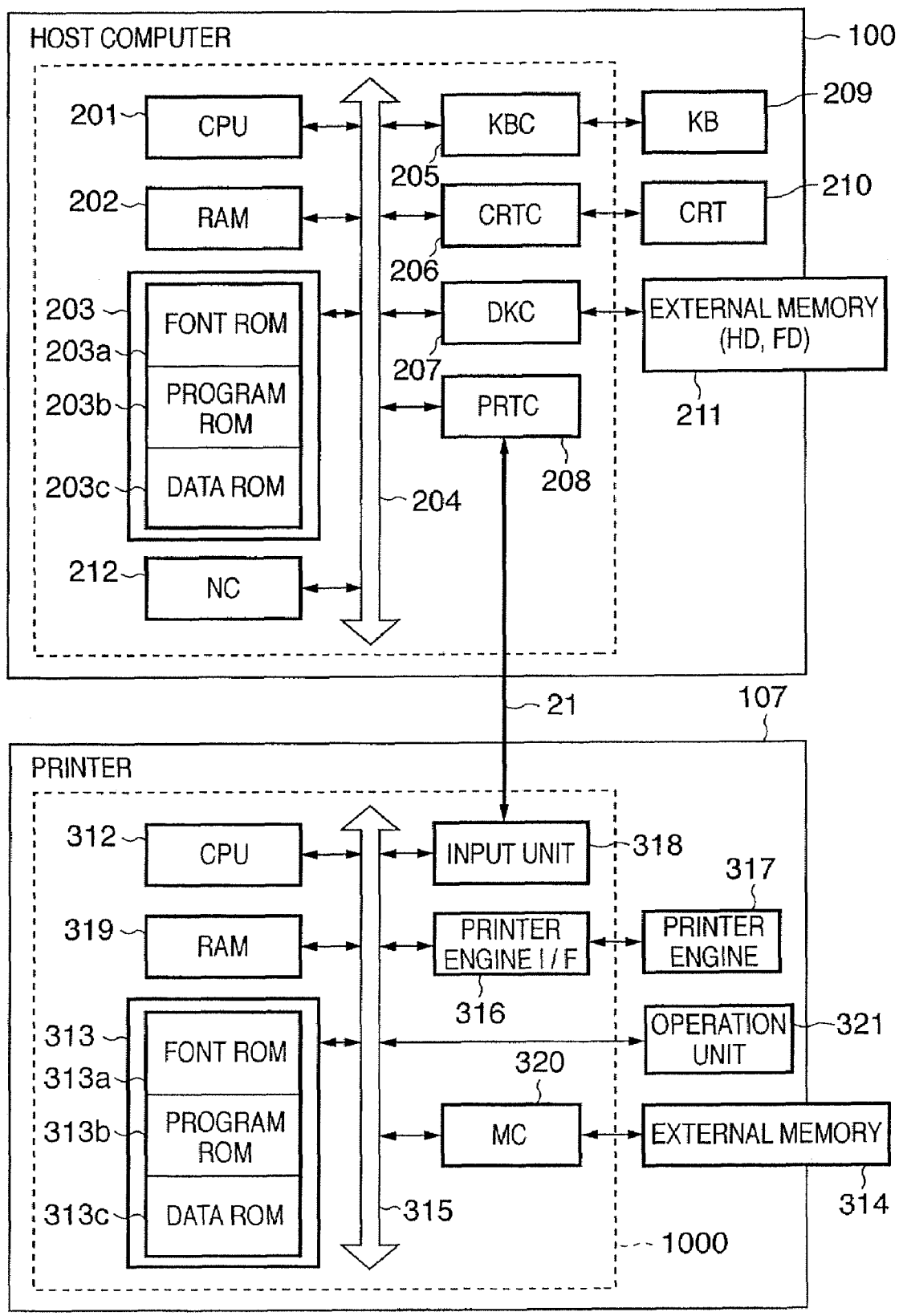
FIG. 2A is a block diagram showing the hardware arrangement of the document processing system according to the embodiment of the present invention.

FIG. 2A is a block diagram showing the hardware arrangement of the document processing system according to the embodiment of the present invention.

Referring to FIG. 2A, reference numeral 100 denotes a host computer, which comprises a CPU 201. The CPU 201 executes processing based on programs such as a document processing program (application program), print processing related program, and the like stored in a program ROM 203b of a ROM 203 or an external memory 211. This processing includes document processing that includes any combinations of components such as graphics data, image data, text data, table data (including a spreadsheet), and the like. Furthermore the CPU 201 systematically controls respective devices connected to a system bus 204 in the host computer 100.

The program ROM 203b of the ROM 203 or the external memory 211 also stores programs such as an operating system program (to be referred to as an OS hereinafter) and the like as a control program of the CPU 201. A font ROM 203a of the ROM 203 or the external memory 211 stores data such as font data and the like used in the document processing. A data ROM 203c of the ROM 203 or the external memory 211 stores various data used upon executing various kinds of processing such as the document processing and the like.

Reference numeral 202 denotes a RAM which serves as a main memory, work area, and the like of the CPU 201. Reference numeral 205 denotes a keyboard controller (KBC), which controls key inputs from a keyboard (KB) 209 and command inputs from a pointing device (not shown). Reference numeral 206 denotes a CRT controller (CRTC), which displays display on a CRT display (CRT) 210. Note that an LCD controller and LCD may be used in place of the CRT controller 206 and CRT display 210.

Reference numeral 207 denotes a disk controller (DKC) which controls access to the external memory 211 such as a hard disk (HD), Floppy® disk (FD), and the like. The external memory 211 stores various data such as a boot program, various applications, font data, user files, edit files, a print control command generation program (to be referred to as a printer driver hereinafter), and the like.

Reference numeral 208 denotes a printer controller (PRTC), which is connected to the printer 107 via a predetermined two-way interface (interface) 21, and executes communication control processing with the printer 107. Examples of the two-way interface include a USB interface, IEEE1394 interface, wireless LAN interface, and the like.

Note that the CPU 201 executes rasterize processing of outline font data onto a display information RAM assured on, e.g., the RAM 202, thus allowing WYSIWYG on the CRT 210. Also, the CPU 201 opens various registered windows on the basis of commands designated by a mouse cursor (not shown) or the like on the CRT 210, and executes various kinds of data processing. Upon executing print processing, the user opens a window (operation window) that pertains to print settings, and can make settings of a print method for the printer driver, which includes printer settings and print mode selection.

In the printer (printing device) 107, reference numeral 312 denotes a printer CPU. The printer CPU 312 systematically controls respective devices connected to a system bus 315 in a printer controller 1000. The printer CPU 312 outputs an image signal as output information to a printer engine 317 via a printer engine interface (I/F) 316. Note that this output is based on a program such as a control program or the like, which is stored in a program ROM 313b of a ROM 313 or an external memory 314.

The program ROM 313b of the ROM 313 stores programs such as the control program of the printer CPU 312 and the like. A font ROM 313a of the ROM 313 stores data such as font data and the like used upon generating the output information. In case of a printer to which no external memory 314 such as a hard disk (HD), IC card, or the like is connected, a data ROM 313c of the ROM 313 stores information and the like used on the host computer 100.

The printer CPU 312 can execute communication processing with the host computer 100 via an input unit 318, and can notify the host computer 100 of various kinds of information such as status information and the like in the printer 107. Reference numeral 319 denotes a RAM which serves as a main memory, work area, and the like of the printer CPU 312. This RAM 319 can expand its memory capacity by an optional RAM connected to an expansion port (not shown).

Note that the RAM 319 can also be used as an output information rasterize area, environmental data storage area, NVRAM, and the like. A memory controller (MC) 320 controls access to the external memory 314 such as a hard disk (HD), IC card, or the like. The external memory 314 is connected as an option, and stores font data, emulation programs, form data, and the like. Reference numeral 321 denotes an operation unit on which an operation panel, switches, LED indicators, and the like required to implement various operations for the printer 107 are arranged.

The number of external memories 314 is not limited to one, and at least one external memory 314 may be connected. Also, a plurality of external memories including an optional font card in addition to built-in font data, an external memory which stores a program that interprets a printer control language of a different language system, and the like may be connected. Furthermore, the printer may comprise an NVRAM (not shown), and may store printer mode setting information from the operation unit 321.

The functional arrangement of the host computer 100 will be described below using FIG. 2B.

Figure 2B:
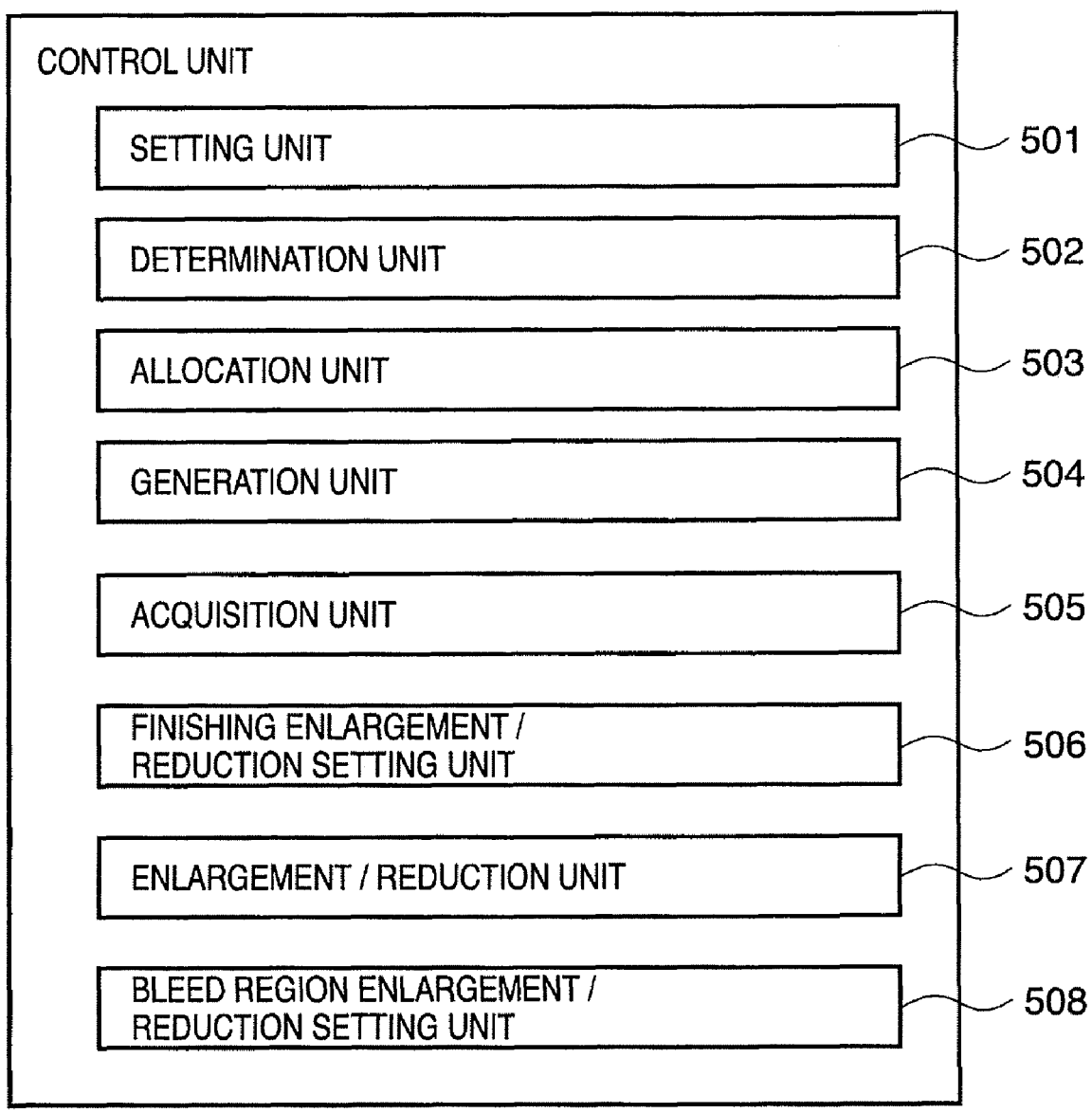
FIG. 2B is a block diagram showing the functional arrangement of a host computer according to the embodiment of the present invention.

FIG. 2B is a block diagram showing the functional arrangement of a host computer according to the embodiment of the present invention.

A control unit 500 implemented by the CPU of the host computer 100 controls a setting unit 501, determination unit 502, allocation unit 503, generation unit 504, acquisition unit 505, finishing enlargement/reduction setting unit 506, enlargement/reduction unit 507, and bleed region enlargement/reduction setting unit 508, and executes various kinds of processing (e.g., processing shown in the flowcharts of FIGS. 10, 11, 26, and 27) implemented by various programs.

Note that the control unit 500 executes imposition processing by laying out finishing pages on a paper sheet so as to print manuscript data on the paper sheet.

The setting unit 501 sets bleed widths for each finishing page. The determination unit 502 determines a bleed region including the finishing pages based on the bleed widths set on each finishing page, and the size of the finishing page. The allocation unit 503 determines the allocation of the manuscript data to align the center of the manuscript data to be allocated to that of the determined bleed region.

The generation unit 504 generates print data required to print the manuscript data in accordance with the determined allocation. The acquisition unit 505 acquires the manuscript data.

The finishing enlargement/reduction setting unit 506 sets to enlarge or reduce the manuscript data to fit the finishing size of each finishing page. The enlargement/reduction unit 507 enlarges or reduces the manuscript data to match with the finishing size when it is set to enlarge or reduce the manuscript data to fit the finishing size of each finishing page.

The bleed region enlargement/reduction setting unit 508 sets to enlarge or reduce the manuscript data to fit the size of the bleed region. The enlargement/reduction unit 507 enlarges or reduces the manuscript data to match with the size of the bleed region when it is set to enlarge or reduce the manuscript data to fit the size of the bleed region.

<Example of Format of Electronic Manuscript Data>

Prior to a description of details of the bookbinding application 104, the data format of a book file will be described.

The book file has a three-layered structure which simulates a book of paper media. An upper layer is called "book", simulates one book, and defines attributes associated with the whole document. An intermediate layer below the upper layer corresponds to chapters in a book, and is also called "chapter". As for each chapter, attributes for that chapter can be defined. A lower layer is "page", and corresponds to respective pages defined by the application program. For each page, attributes for that page can be defined. One book can include a plurality of chapters, each of which can include a plurality of pages.

Figure 3:
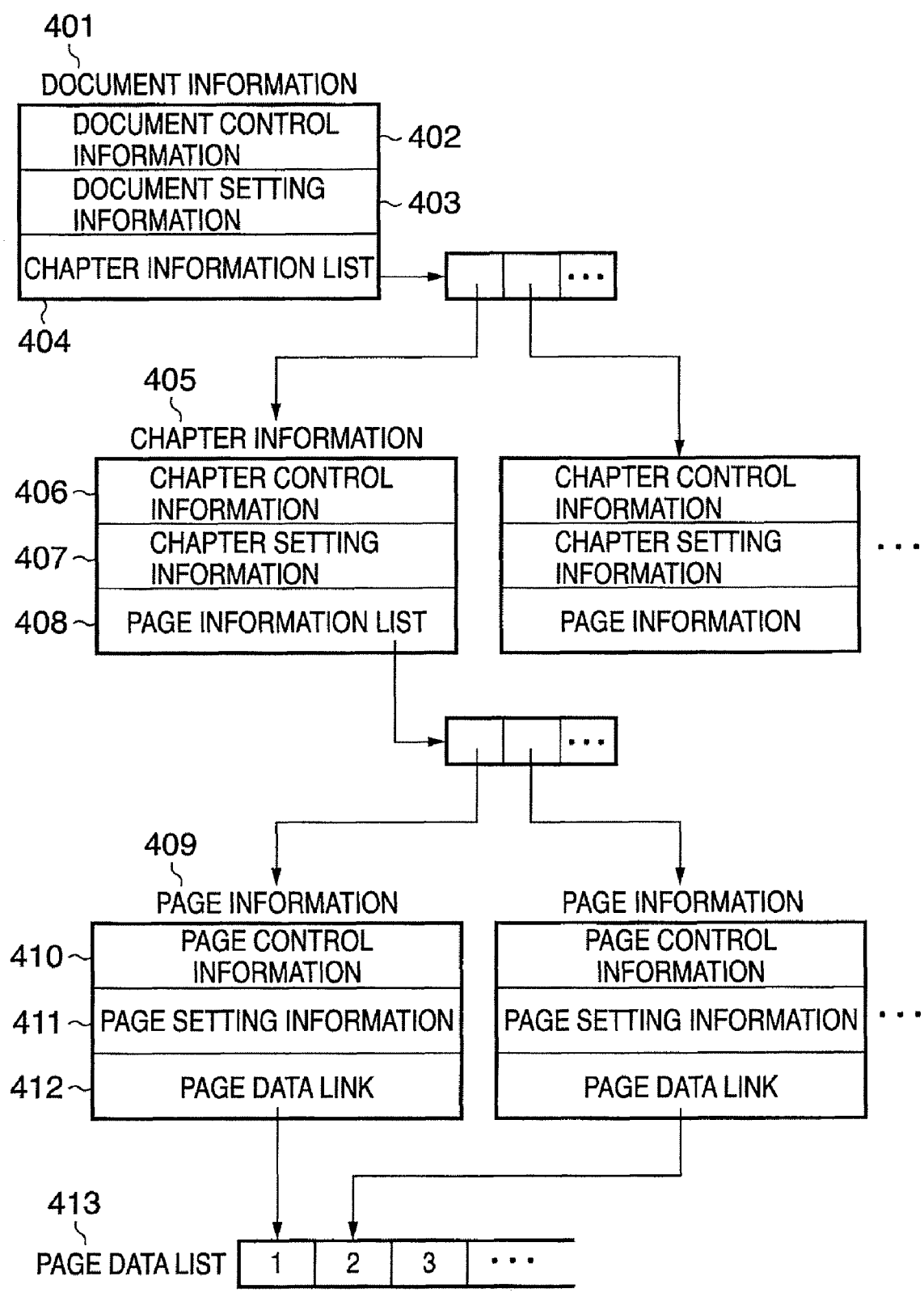
FIG. 3 shows an example of the data format of a book file according to the embodiment of the present invention.

FIG. 3 shows an example of the data format of the book file according to the embodiment of the present invention.

A book, chapters, and pages in the book file of this example are respectively indicated by corresponding nodes. One book file includes one book. The book and chapters include defined attribute values and links to lower layers as their entities since they are concepts for defining the structure as a book. Pages have, as entities, data for respective pages, which are output by the application program. For this purpose, respective pages include entities of manuscript pages (manuscript page data or manuscript data) and links to respective manuscript page data.

Note that a print page to be output onto a print sheet such as a paper medium often includes a plurality of manuscript pages. This structure is not indicated by links but is indicated by attributes in the book, chapter, and page layers.

In FIG. 3, since the book file need not always be one complete book, "book" is generalized as "document".

The document has document information 401 at an uppermost position. The document information 401 can be roughly classified into three parts 402 to 404. Document control information 402 holds information such as a path name and the like of a document file in a file system. Document setting information 403 holds layout information such as a page layout and the like, and function setting information of a printing device such as stapling, and the like, and corresponds to the attributes of the book. A chapter information list 404 holds a set of chapters which form the document in the form of a list, which holds chapter information 405.

The chapter information 405 can also be roughly classified into three parts 406 to 408. Chapter setting information 407 holds information of a page layout and stapling unique to that chapter, and corresponds to attributes of each chapter. By preparing setting information for each chapter, a document having complicated layouts like that the first chapter has a 2-UP layout, other chapters have 4-UP layouts, and so forth can be created. A page information list 408 holds a set of manuscript pages which form each chapter in the form of a list. The page information list 408 designates page information data 409.

The page information data 409 is also roughly classified into three parts 410 to 412. The page control information 410 holds information such as a page number and the like to be displayed on a tree. The page setting information 411 holds information such as a page rotation angle, page allocation position information, and the like, and corresponds to attributes of each manuscript page. The page data link information 412 is manuscript data corresponding to a page. In this example, the page information 409 does not directly have manuscript data, but it has only the page data link information 412, and actual manuscript data is held by the page data list 413.

FIGS. 4A and 4B show an example of the book attributes (document setting information 403) according to the embodiment of the present invention.

Normally, as for items which can be defined to overlap those of lower layers, attribute values of lower layers are preferentially adopted. For this reason, as for items included in only the book attributes, the values defined in the book attributes are effective values throughout the book. However, as for items which overlap those of lower layers, these values mean prescribed values if they are not defined in lower layers. However, in this embodiment, whether or not attribute values of lower layers are preferentially used can be selected, as will be described later. Note that each item shown in FIGS. 4A and 4B does not always correspond to one item in practice, but may often include a plurality of related items.

Items unique to the book attributes are 14 items: a print method, finishing size, imposition method, printer's mark/bleed, binding margin/binding direction, bookbinding details, front/back cover, index sheet, Interleaf, chapter division, finishing, glued-on cover size, finishing enlargement/reduction, and bleed enlargement/reduction. These items are defined throughout the book.

As print method attributes, three values, i.e., single-sided printing, double-sided printing, and booklet printing, can be designated. As finishing size attributes, two values, i.e., a fixed size and user designated size, can be designated.

A finishing size attribute indicates a size of a final printed material which is left after a print sheet indicated by the paper size is trimmed. In the present invention, the finishing size can be set independently of the paper size, and is set to be equal to or smaller than the paper size. Also, in case of a specific print method upon setting the finishing size, the paper size is defined by only the book attributes, but cannot be set by chapter attributes to be described later.

Imposition method attributes are items required to designate an imposition method used when a plurality of print pages are to be imposed and printed on one output sheet under the condition that output sheets are trimmed and bound by an inline finisher or offline finisher. Imposition methods that can be designated include "leaflet, saddle stitching, casing-in, quarto", and the like.

Note that "leaflet" is a method of imposing print pages on each sheet in a format that can bind sheets without folding them upon finishing. "Saddle stitching" is a method of imposing print pages on each sheet in a layout suited to a format which allows bookbinding by folding, into two, a bundle of sheets, the number of which is to be designated independently, and binding that bundle together.

Also, "casing-in (case binding)" is a method of imposing print pages on a glued-on cover and inner sheets in a format that allows casing-in by the inline finisher or offline finisher. In this method, printed inner sheets are then bound in such a manner that they are glued at a binding position, are wrapped by the glued-on cover, and are trimmed at three sides as needed.

Furthermore, "quarto" is a method of imposing print pages in a format that allows perfect binding when output sheets are folded into four to form a bundle. Note that perfect binding is realized by three- or four-side trimming by the offline finisher.

The printer's mark/bleed attribute includes items to be designated when printing of printer's marks and bleeds (offsets) are to be designated on each print page upon printing an electronic manuscript file.

The bleeds (bleed widths) can be assigned to respective sides of each finishing page, and indicate widths to be trimmed upon trimming print sheets. The printer's marks (offset position marks) are marks indicating positions when the user trims sheets using the offline finisher.

Of the binding margin/binding direction attributes, the direction to bind a document can be selected from long-side binding (left), long-side binding (right), short-side binding (top), and short-side binding (bottom) when the orientation of a sheet is portrait, and from long-side binding (top), long-side binding (bottom), short-side binding (left), and short-side binding (right) when the orientation of a sheet is landscape. The binding margin indicates the width of a margin region to be assigned to the binding direction side.

The bookbinding details attribute allows to designate an opening direction, the number of sheets which form a bundle, binding margin (width), gutter shift, and the like, when the imposition method such as "saddle stitching", "casing-in", "quarto", or the like is designated.

The front cover/back cover attribute includes designation of addition of a sheet used as a front cover and back cover, and designation of print contents on the added sheet upon printing an electronic manuscript file bound as a book.

The index sheet attribute includes designation of insertion of index sheets with index parts, which are prepared separately in a printing device as divisions of chapters, and designation of print contents on the index parts. This attribute becomes valid when the printing device comprises an inserter which has an insert function of inserting sheets prepared independently of print sheets to desired positions, or when a plurality of paper cassettes are available. The same applies to an interleaf attribute.

The interleaf attribute includes designation of insertion of sheets to be supplied from an inserter or paper cassette as divisions of chapters, designation of a paper source upon inserting interleaves, and the like.

The chapter division attribute includes designation of use of a new sheet, use of a new print page, do-nothing, or the like at the divisions of chapters. In a single-sided print mode, use of a new sheet and that of a new print page have the same meaning. In a double-sided print mode, if "use of new sheet" is designated, successive chapters are never printed on one sheet. However, if "use of new print page" is designated, successive chapters may be printed on the obverse and reverse sides of one sheet.

The finishing attribute includes an item used to designate whether or not discharged sheets are to undergo processing such as saddle stitching, casing-in (binding), three-side trimming, and the like. The validity of this attribute depends on whether or not a printing device used has the corresponding function.

The glued-on cover sheet size is a sheet size that can be set when "casing-in (case binding)" is selected as the imposition method, and indicates a sheet size of a sheet used to wrap inner sheets. Note that the aforementioned finishing size indicates that of inner sheets, and the finishing size of the glued-on cover can be calculated from that of inner sheets. Therefore, in this embodiment the finishing size of the glued-on cover is not held as an attribute.

As in inner sheets, the glued-on cover sheet size assumes a value larger than the glued-on cover finishing size. The glued-on cover finishing size is calculated by "finishing size of inner sheets×2+spine width". This is because the glued-on cover finishing size is the sum of the front cover size, spine size, and back cover size, and the front and back cover sizes are equal to the finishing size of inner sheets in this embodiment. Note that the spine width is calculated by the product of the thickness of an inner sheet determined by its media type, and the number of inner sheets.

If the finishing enlargement/reduction attribute is ON, an input manuscript page can be enlarged or reduced to fit the finishing sheet size.

If the bleed enlargement/reduction attribute is ON, an input manuscript page can be enlarged or reduced to fit a size including bleeds set on four sides of the finishing sheet size.

FIG. 5 shows an example of the chapter attributes (chapter setting information 407) according to the embodiment of the present invention. FIG. 6 shows an example of the page attributes (page setting information 411) according to the embodiment of the present invention. The relationship between the chapter attributes and page attributes is the same as that between the book attributes and those of lower layers.

As for the chapter attributes, there are no items unique to chapters, and all items overlap those of the book attributes. Therefore, normally, if definitions in the chapter attributes are different from those in the book attributes, values defined in the chapter attributes are used preferentially. However, in this embodiment, whether or not the attribute values of lower layers are used preferentially can be selected, as will be described later.

Items common to only the book attributes and chapter attributes are five items: a sheet size, sheet orientation, N-up print designation, enlargement/reduction, and discharge method. Of these items, the sheet size indicates the size of a print sheet, as described above. The sheet size can be switched for each chapter when casing-in or folio bookbinding (corresponding to the above booklet printing) is not selected.

The sheet orientation indicates portrait or landscape.

The N-up print designation attribute is an item used to designate the number of manuscript pages included per print page. As layouts that can be designated, 1×1, 1×2, 2×2, 3×3, 4×4, and the like are available. If the enlargement/reduction attribute is ON, an input manuscript page can be enlarged or reduced to fit the output sheet size.

The discharge method attribute is an item used to designate whether or not stapling processing is applied to discharged sheets. The validity of this attribute depends on whether or not a printing device used has a stapling function.

Items unique to the page attributes include: page rotation designation, zoom, allocation position, annotation, page division, and the like. The page rotation designation attribute is an item used to designate a rotation angle upon allocating manuscript pages on a print page. The zoom attribute is an item used to designate a scale of manuscript pages. The scale is designated to have the size of a virtual logical page as 100%. The virtual logical page region is a region occupied by one manuscript page when manuscript pages are allocated in accordance with N-up designation and the like. For example, in case of 1×1, the virtual logical page region corresponds to one print page. Also, in case of 1×2, the virtual logical page region corresponds to a region obtained by reducing each side of one print page to about 70%.

As attributes common to the book attributes, chapter attributes, and page attributes, a watermark attribute and header/footer attribute are available. A watermark is information of an image, character string, or the like, which is designated independently, and is printed to be superposed on data created by the application. A header and footer are information printed on a top margin and bottom margin of each page. Note that as the header and footer, items which are information of page numbers, dates and times, and the like, and can be designated as variables are prepared.

Note that the contents which can be designated in the watermark attribute and header/footer attribute are common in the chapter and page attributes but are different in the book attributes from those in the chapter and page attributes. In the book attributes, the contents of a watermark and header/footer can be designated. Also, how to print a watermark and header/footer throughout the book can be designated. On the other hand, in the chapter and page attributes, whether or not to print the watermark and header/footer designated in the book attributes in a chapter and page of interest can be designated.

<Example of Operation Sequence of Document Processing System>

(Example of Generation Sequence of Book File)

The book file has the aforementioned structure and contents. The sequence for creating a book file by the bookbinding application 104 and electronic manuscript writer 102 will be described below. Creation of a book file is implemented as a part of the book file edit operation.

Figure 7:
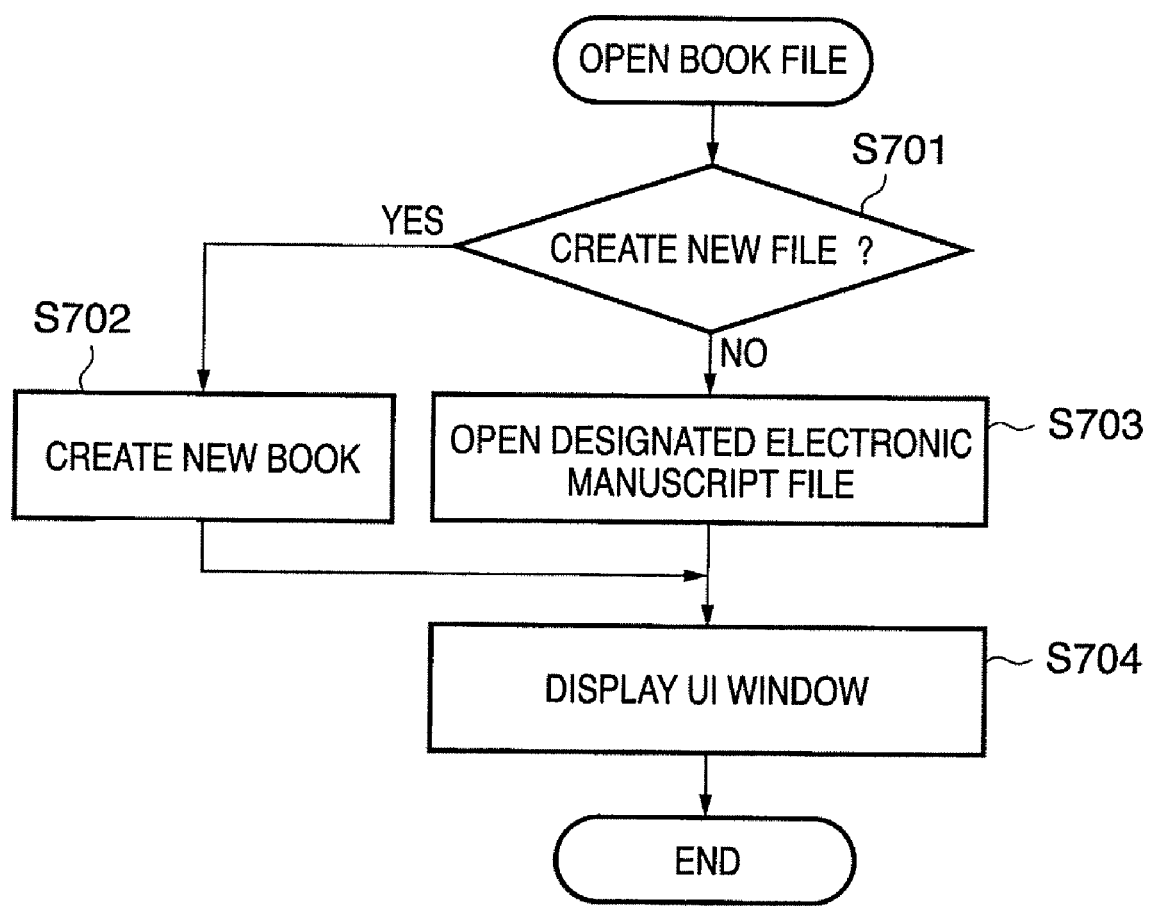
FIG. 7 is a flowchart showing the generation sequence of a book file by a bookbinding application according to the embodiment of the present invention.

FIG. 7 is a flowchart showing the generation sequence of a book file by the bookbinding application according to the embodiment of the present invention.

The bookbinding application 104 checks if a book file to be opened is a new file to be created or an existing file (step S701). In case of a new book file to be created (YES in step S701), the bookbinding application 104 crates a new book file including no chapter (step S702).

Figure 8:
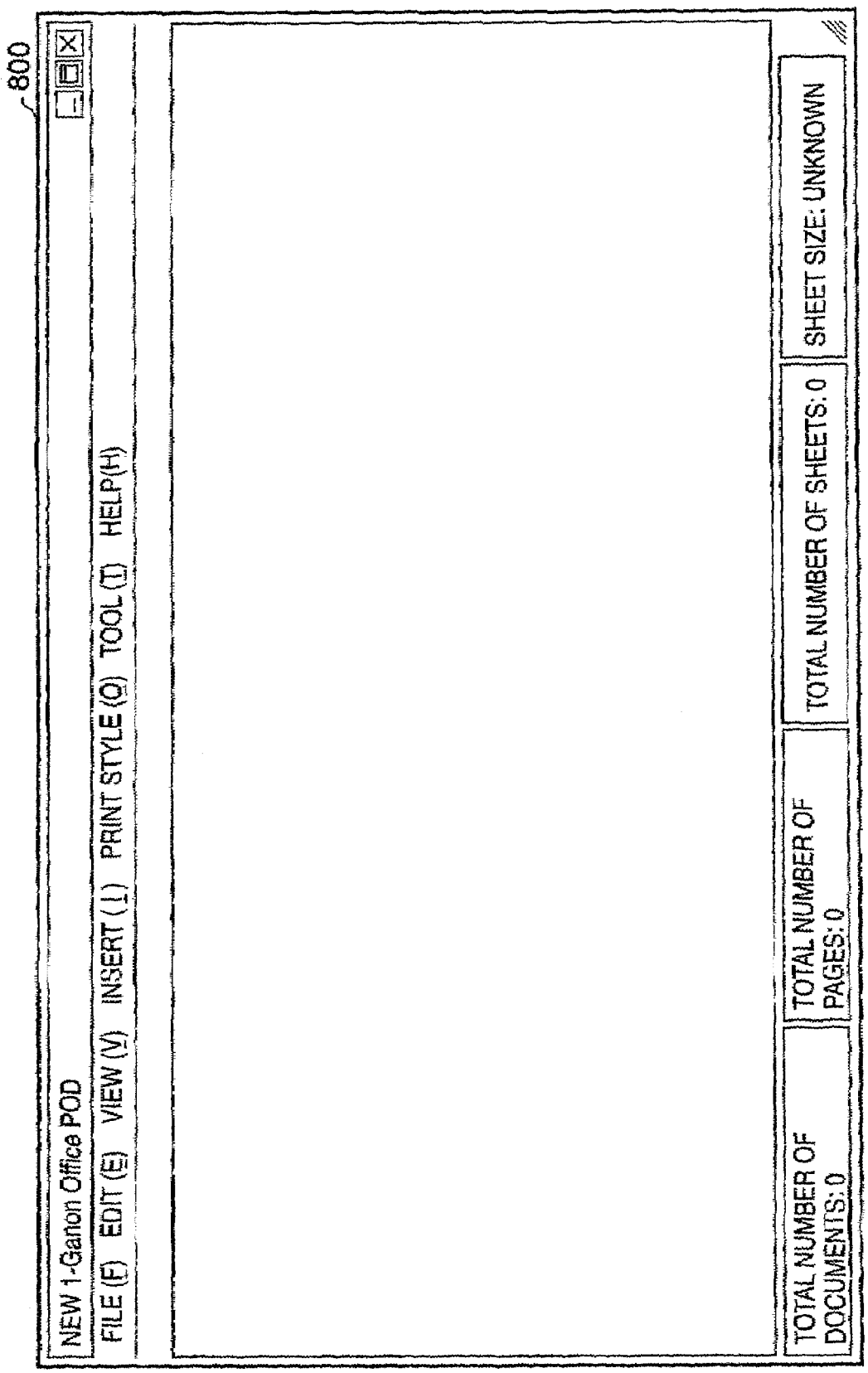
FIG. 8 shows an example of a user interface window upon opening a new book file according to the embodiment of the present invention.

In the example of FIG. 3, the new book file to be created has only document information 401, and is a node of a book which has no links to nodes of chapters. As book attributes (document setting information 403), a set of attributes prepared in advance for a new file to be created are applied. Then, the bookbinding application 104 displays a user interface (UI) window used to edit the new book file (step S704). FIG. 8 shows an example of a UI window 800 used upon creating a new book file. In this case, since the book file does not have any practical contents, nothing is displayed on the UI window 800.

Figure 9:
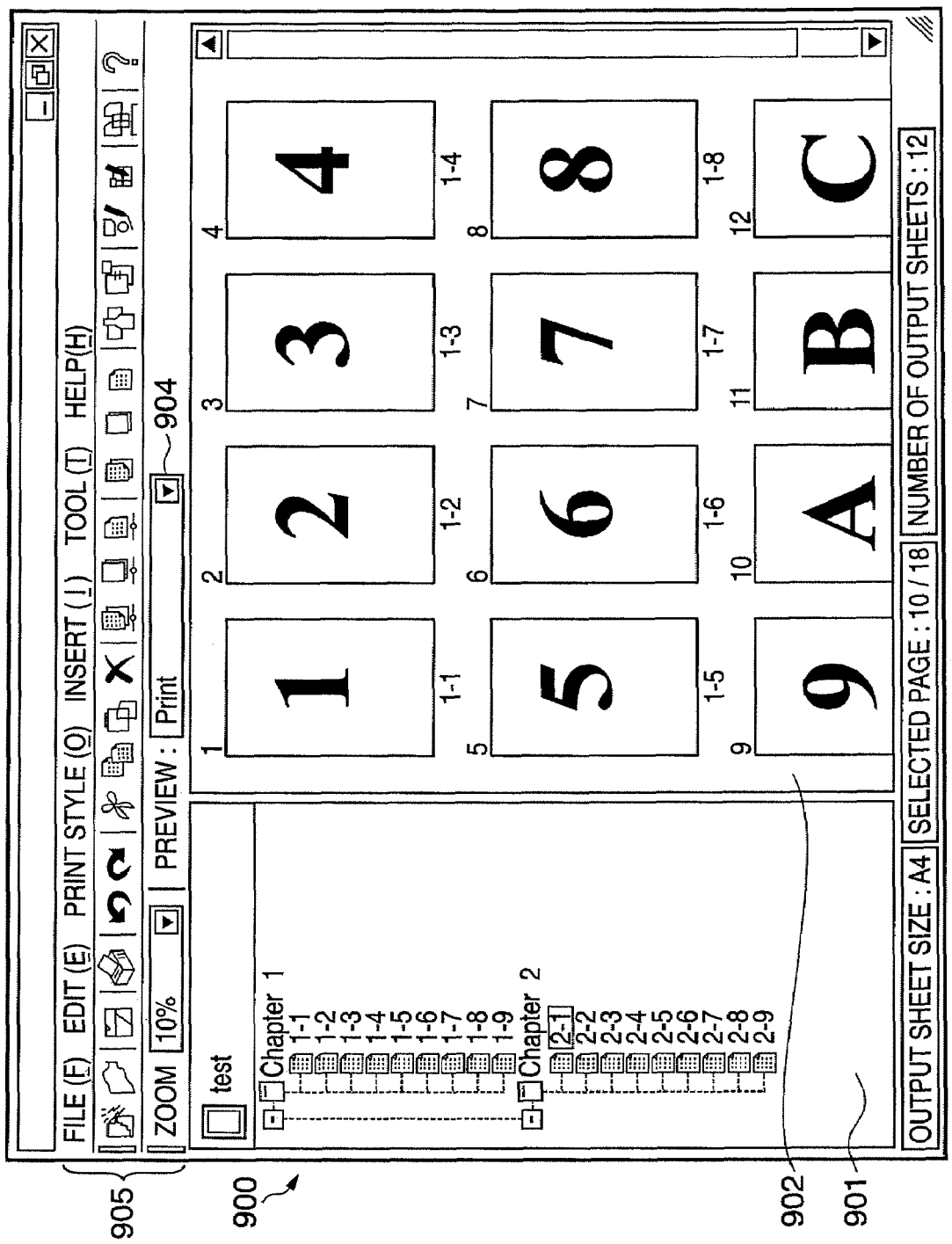
FIG. 9 shows an example of a user interface window upon opening an existing book file according to the embodiment of the present invention.

On the other hand, if the book file to be opened is an existing book file (NO in step S701), the bookbinding application 104 opens the designated book file (step S703). The bookbinding application 104 displays a user interface (UI) window according to the structure, attributes, and contents of that book file. FIG. 9 shows an example of this UI window 900.

Details of the UI window 900 will be described below using FIG. 9.

FIG. 9 shows an example of the UI window by the bookbinding application according to the embodiment of the present invention.

The UI window 900 comprises a tree area 901 which indicates the structure of the book, and a preview area 902 which displays a printed state. The tree area 901 displays chapters included in the book, and pages included in the chapters to clarify the tree structure shown in FIG. 3. Pages displayed on the tree area 901 are manuscript pages. The preview area 902 displays the contents of print pages in a reduced scale (thumbnail display). The display order reflects the structure of the book.

To the opened book file, application data which is converted into an electronic manuscript file by the electronic manuscript writer 102 can be added as a new chapter. This function will be referred to as an electronic manuscript import function hereinafter. By importing an electronic manuscript file to a new book file created in the sequence shown in FIG. 7, an entity can be given to that book file. This function is launched by dragging and dropping application data on the window shown in FIG. 8 or 9.

The processing sequence of this electronic manuscript import function will be described below using FIG. 10.

Figure 10:
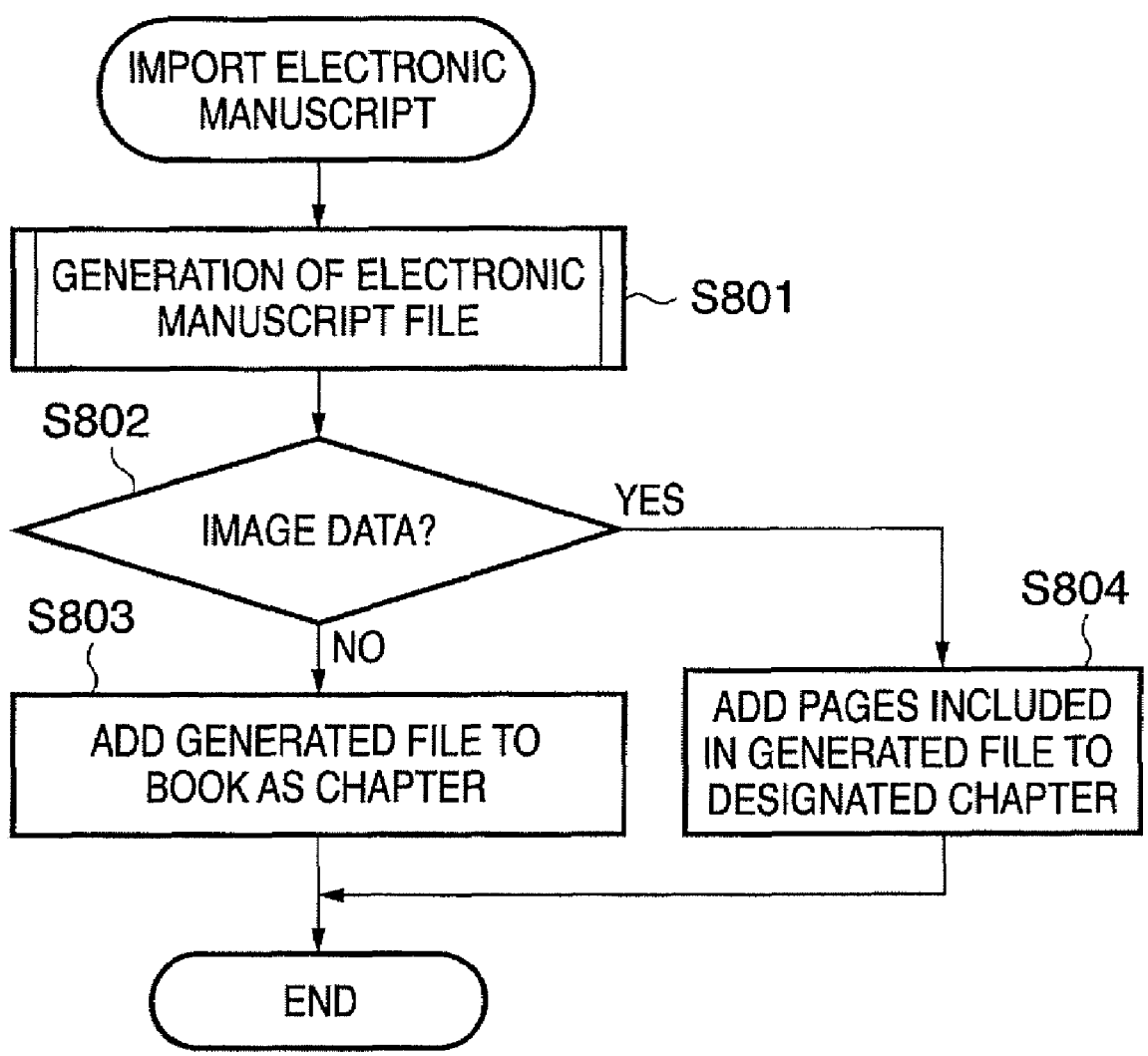
FIG. 10 is a flowchart showing the processing sequence of an electronic manuscript import function according to the embodiment of the present invention.

FIG. 10 is a flowchart showing the processing sequence of the electronic manuscript import function according to the embodiment of the present invention.

An application program which generated the designated application data is launched, and the electronic manuscript writer 102 is designated as a device driver to print out the application data, thus converting the application data into electronic manuscript data (step S801).

Upon completion of conversion, it is checked if the converted electronic manuscript data is image data (step S802). This checking processing can be attained based on the file extension of the application data if it is done under the Windows OS.

For example, if the extension is "bmp", the application data is determined as bitmap data; if the extension is "jpg", it is determined as JPEG image data; or if the extension is "tiff", it is determined as tiff image data. In case of such image data, since an electronic manuscript file can be directly generated from the image data without launching the application program, the processing in step S801 can also be skipped.

If the converted data is not image data (NO in step S802), the generated electronic manuscript file is added to the book of the currently opened book file as a new chapter (step S803). Normally, as the chapter attributes, those common to the book attributes are set by copying the values of the book attributes, and the remaining attributes are set as prescribed values prepared in advance. However, in this embodiment, whether or not the attribute values of lower layers are preferentially used can be selected, as will be described later.

On the other hand, if the converted data is image data (YES in step S802), no new chapter is added as a general rule, and respective manuscript pages included in the generated electronic manuscript file are added to the designated chapter (step S804).

However, if the book file is a newly created file, a new chapter is created, and respective pages of the electronic manuscript file are added as those which belong to the new chapter. Normally, as the page attributes common to those of the upper layers, these attribute values are given, and as attributes of the electronic manuscript file which are inherited from those defined in the application data, these values are given.

For example, when N-up designation is designated in the application data, that attribute value is inherited. In this manner, a new book file is created, or a new chapter is added. However, in this embodiment, whether or not attribute values of lower layers are preferentially used can be selected, as will be described later.

Details of step S801 will be described below using FIG. 11.

Figure 11:
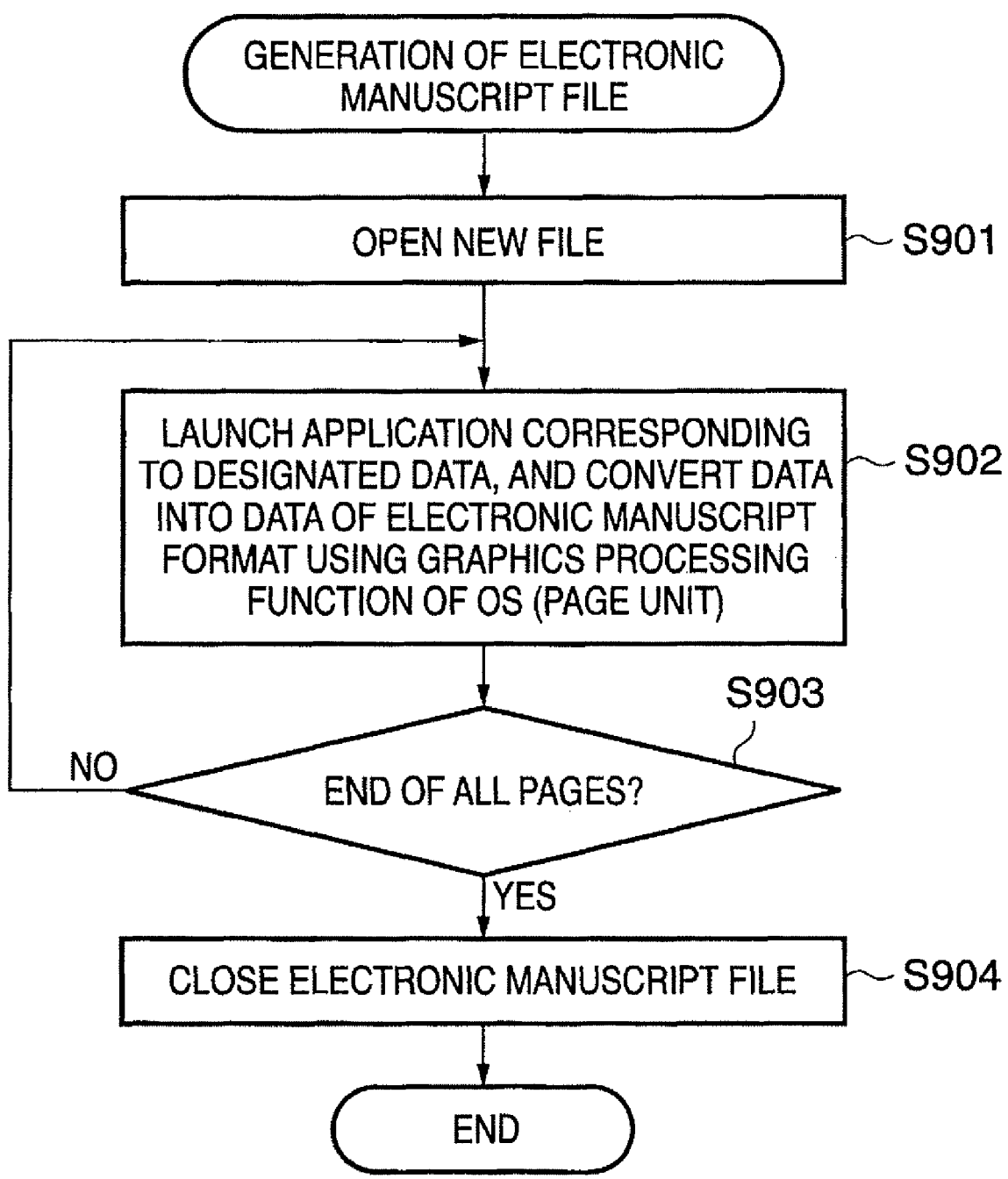
FIG. 11 is a flowchart showing details of the generation sequence of an electronic manuscript file in step S801 according to the embodiment of the present invention.

FIG. 11 is a flowchart showing details of the generation sequence of an electronic manuscript file in step S801 according to the embodiment of the present invention.

A new electronic manuscript file is created and opened (step S901). An application program corresponding to the designated application data is launched, and the electronic manuscript writer 102 is designated as a device driver to send output commands to the output module of the OS. The output module converts the received output commands into data in the electronic manuscript format by the electronic manuscript writer 102, and outputs the converted data (step S902). The output destination is the electronic manuscript file opened in step S901.

It is checked if all the designated data have been converted (step S903). If the data to be converted still remain (NO in step S903), the process returns to step S902. On the other hand, if all the designated data have been converted (YES in step S903), the electronic manuscript file is closed (step S904). The electronic manuscript file generated by the electronic manuscript writer 102 is a file which includes the entities of the manuscript page data shown in FIG. 3.

(Edit Example of Book File)

In this way, the book file can be created from the application data. As for the generated book file, the following edit operations can be made for chapters and pages.

(1) New addition
(2) Delete
(3) Copy
(4) Cut
(5) Paste
(6) Move
(7) Change chapter name
(8) Re-assign page number name
(9) Insert cover
(10) Insert interleaf
(11) Insert index sheet
(12) Page layout for each manuscript page In addition, an operation for canceling the edit operation that was made once, and an operation for redoing the canceled operation can be made. These edit functions allow edit operations such as integration of a plurality of book files, re-allocation of chapters and pages in a book file, deletion of chapters and pages in a book file, change layouts of manuscript pages, insertion of interleaves and index sheets, and so forth.

Upon making these edit operations, the operation results are reflected in the attributes shown in FIGS. 4A to 6, or in the structure of the book file. For example, if a new addition operation of a blank page is made, a blank page is inserted at a designated position. This blank page is handled as a manuscript page. If the layouts of manuscript pages are changed, the change contents are reflected in the attributes of the print method, N-up print, front cover/spine/back cover, index sheet, interleaf, chapter division, and the like.

Display and operation example upon editing in this embodiment will be described in detail later.

(Output Example of Book File)

The end goal of the book file which is created and edited as described above is to be printed out. When the user selects a file menu from the UI (user interface) window (operation window: FIG. 9) of the bookbinding application, and then selects "print" from that menu, the book file is printed out by the designated output device.

In this case, the bookbinding application 104 creates a job ticket from the currently opened book file, and passes it to the electronic manuscript despooler 105. The electronic manuscript despooler 105 converts the job ticket into output commands of the OS (e.g., GDI commands of Windows), and sends the converted commands to the output module (e.g., GDI). The output module generates commands suited to a device using the designated printer driver 106, and sends the commands to that device.

More specifically, a graphic engine of the output module loads the printer driver 106 prepared for each printing device from the external memory 211 onto the RAM 202, and sets the printer driver 106 as an output destination. The output module converts the received GDI (Graphic Device Interface) functions into DDI (Device Driver Interface) functions, and outputs the DDI functions to the printer driver 106.

The printer driver 106 converts, based on the DDI functions received from the output module, these functions into control commands (e.g., PDL (Page Description Language) commands) that can be interpreted by the printer. The converted printer control commands are output as print data to the printer 107 via a system spooler loaded onto the RAM 202 by the OS and the interface 21.

Note that the job ticket is data which has a structure including a manuscript page as a minimum unit. The structure in the job ticket defines the layout of manuscript pages on each sheet. One job ticket is issued per job.

For this purpose, the structure includes an uppermost node named "document", which defines attributes of the whole document (e.g., attributes of double-sided printing/single-sided printing, and the like). To the document node, paper nodes belong, and include attributes such as identifiers of paper sheets to be used, designation of a paper feed port in the printer, and the like.

To each paper node, a node of a sheet to be printed using that paper sheet belongs. One sheet corresponds to one paper sheet. To each sheet, a print page (physical page) belongs. In case of single-sided printing, one physical page belongs to one sheet. In case of double-sided printing, two physical pages belong to one sheet. To each physical page, manuscript pages to be allocated on that physical page belong. As attributes of physical pages, the layout of manuscript pages is included.

An example of the data structure of the job ticket will be described below using FIG. 12.

Figure 12:
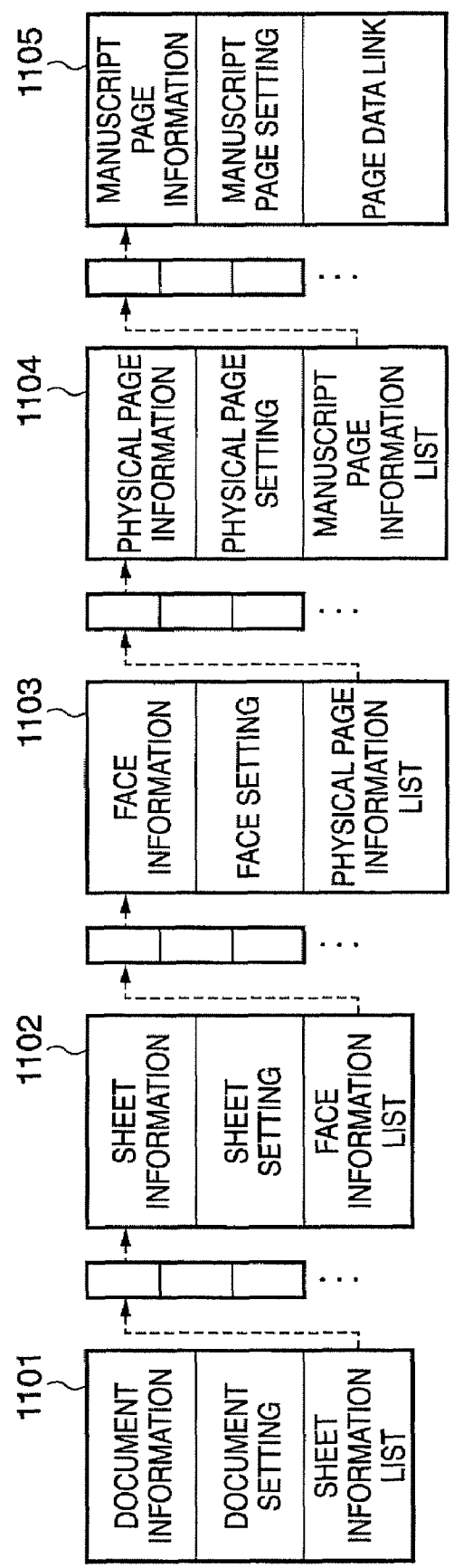
FIG. 12 shows an example of the data structure of a job ticket according to the embodiment of the present invention.

FIG. 12 shows an example of the data structure of the job ticket according to the embodiment of the present invention.

In print data, a document includes a set of paper sheets, and each paper sheets include two faces, i.e., obverse and reverse faces. Each of the obverse and reverse faces has a region (physical page) on which manuscripts are to be laid out, and each physical page includes a set of manuscript pages as minimum units.

In FIG. 12, document information 1101 is data corresponding to a document, and includes information (document settings) that pertains to the whole document, and a list of sheet information which forms the document. Sheet information 1102 includes information (sheet settings) associated with a sheet such as a sheet size and the like, and a list of face information allocated on the sheet.

Face information 1103 includes information (face settings) unique to a face, and a list of physical page information associated with a physical page allocated on the face. Physical page information 1104 includes information (physical page settings) such as the size of a physical page, header/footer, and the like, and a list of manuscript page information associated with manuscript pages which form the physical page. Manuscript page information 1105 includes information (manuscript page settings) associated with a manuscript page, and a link to manuscript page data.

The electronic manuscript despooler 105 converts this job ticket into output commands to the output module.

(Example of Preview Display Contents)

As has already been described above, when the book file is opened by the bookbinding application 104, the UI window 900 shown in FIG. 9 is displayed.

On the UI window 900, the tree area 901 displays a tree indicating the structure of the opened book (to be referred to as "book of interest" hereinafter). On the preview area 902, three ways of display methods are prepared according to user's designations.

The first display method is a manuscript view mode which directly displays manuscript pages. In the manuscript view mode, the contents of manuscript pages which belong to the book of interest are displayed on the preview area 902 in a reduced scale. In this manuscript view mode, the layouts are not reflected in display on the preview area 902.

The second display method is a print view mode. In the print view mode, manuscript pages are displayed on the preview area 902 while reflecting their layouts.

The third display method is a simple print view mode. In the simple print view mode, the contents of manuscript pages are not reflected in display on the preview area 902, and only their layouts are reflected.

Note that these modes can be switched by manipulating a mode switching field 904. The mode switching field 904 adopts a pull-down menu. The user selects an arbitrary one of modes registered in this pull-down menu, thereby switching to the mode that he or she intended.

<Example of Arrangement of Another Document Processing System>

The document processing system shown in FIG. 1 is a standalone system. Also, a server-client system which expands the system shown in FIG. 1 can create and edit a book file by nearly the same arrangement and sequence. In this case, a server manages book files and print processing.

Figure 13:
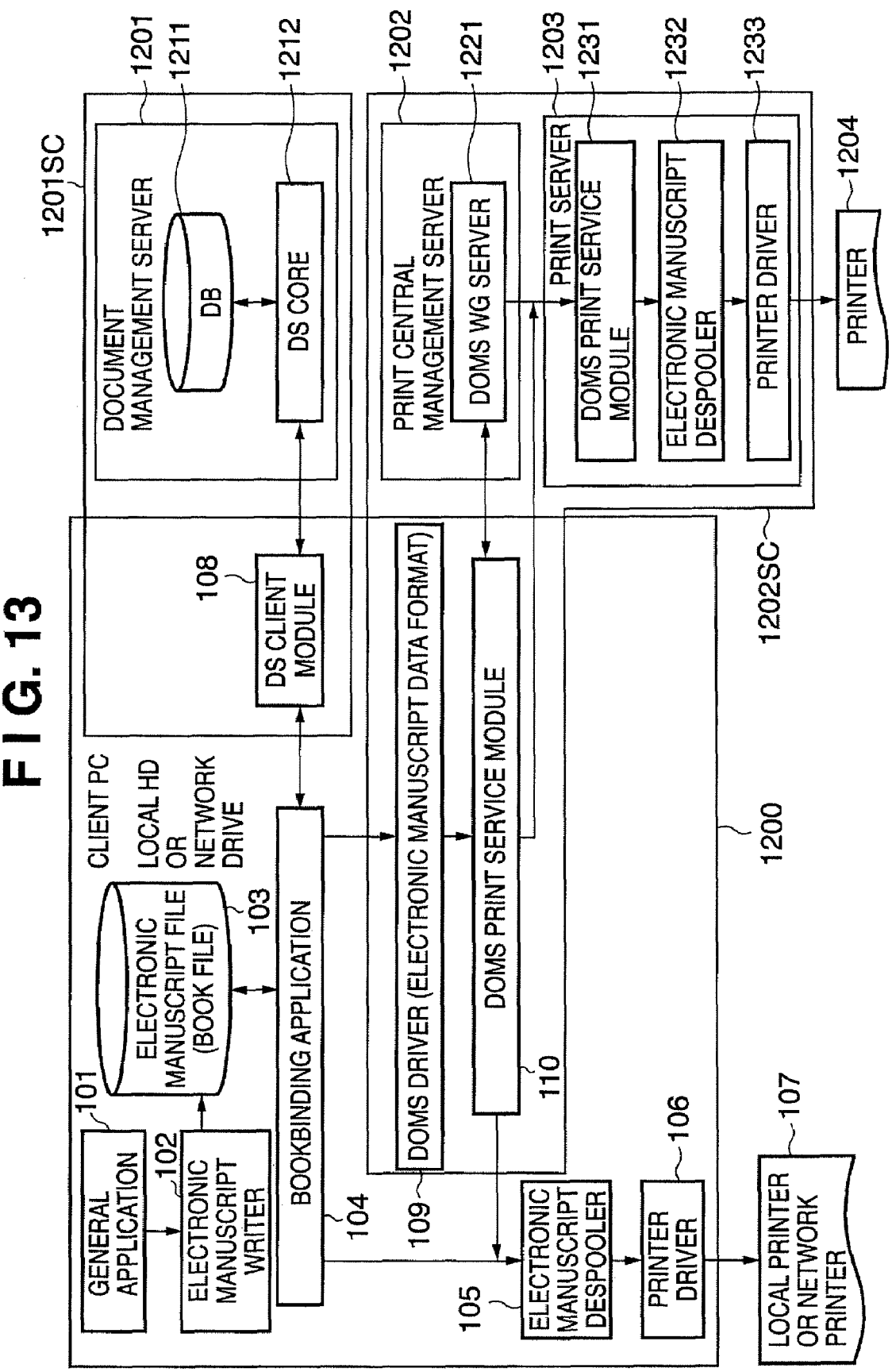
FIG. 13 is a block diagram showing the arrangement of a client-server document processing system according to the embodiment of the present invention.

FIG. 13 is a block diagram showing the arrangement of a server-client document processing system according to the embodiment of the present invention.

The server-client document processing system has an arrangement in which a DOMS driver 109, DOMS print service module 110, and DS client module 108 are added to a standalone, client document processing system 1200 shown in FIG. 1.

Note that DOMS is a short for Document Output Management Service, and serves as a client module. Also, DS is a short for Document Service. In case of the arrangement shown in FIG. 13, the client document processing system 1200 serves as a client PC for a document management server 1201, print central management server 1202, and print server 1203.

To this document processing system 1200, the document management server 1201, print central management server 1202, and print server 1203 are connected. These servers are normally connected to the client document processing system 1200 via a network. When these servers also serve as clients, they are connected via inter-process communications that simulate communications between networks.

In FIG. 13, the two servers, i.e., the document management server 1201 and print central management server 1202 are connected to the client document processing system. Alternatively, one of these servers may be present on the network.

When the server connected is the document management server 1201, a document management server client system 1201SC including its client module is added to the document processing system 1200.

When the server connected is the print central management server 1202, a print management server client system 1202SC including its client module is added to the document processing system 1200.

The document management server 1201 stores book files created and edited by the bookbinding application 104. Upon managing book files by the document management server 1201, the book files are stored in a database (DB) 1211 of the document management server 1201 in place of or in addition to a local HD of the client document processing system 1200. Storage processing and read processing between the bookbinding application 104 and document management server 1201 are implemented via the DS client module 108 and a DS core 1212.

The print central management server 1202 manages printing of book files stored in the client document processing system 1200 or document management server 1201. A print request at a client is sent to a DOMS WG server module 1221 of the print central management server 1202 via the DOMS driver 109 and DOMS print service module 110.

Upon printing by the printer 107 of the client document processing system 1200, the print central management server 1202 passes electronic manuscript data to the electronic manuscript despooler 105 via the DOMS print service module 110. Upon printing by the print server 1203, the print central management server 1202 sends electronic manuscript data to the DOMS print service module 110 of the print server 1203.

The print central management server 1202 performs security check about the authority of a user who issued a print request to the stored book file, and saves logs of print processing. In this way, the document processing system can be implemented as the standalone system and as the server-client system.

[Example of Edit Operation of Document Processing System]

On the UI window (operation window) 900 implemented by the bookbinding application 104, the user can make edit operations such as replacement of the page order of a document, copy, deletion, imposition, addition of printer's marks, and the like. In addition, the user can set functions of the printing device such as stapling, saddle stitching, casing-in, three-side trimming, and the like, and can issue a print request to the designated printing device.

These operations are implemented by commands registered on various menus and a tool bar (including an icon group) 905 on the upper part on the operation window 900 shown in FIG. 9.

The tree area 901 on the left side on the operation window 900 displays a tree view indicating the structure of a document. The document includes a set of chapters (Chapter 1, Chapter 2, . . . ), and each chapter includes a set of manuscript pages 1-1, 1-2, . . . , 2-1, 2-2, . . . .

The preview area 902 on the right side on the operation window 900 displays a preview of respective pages by the designated display method, as described above. When the user selects a page to be edited on the tree area 901 and preview area 902 and makes an operation by a menu operation, the document information 401 shown in FIG. 3 stores information corresponding to that menu operation or is updated.

<Example of Attribute Setting of Document Processing System>

An operation window for setting details of a document will be described below using FIG. 14.

FIG. 14 shows an example of a "document style setting" window provided by the bookbinding application according to the embodiment of the present invention.

This "document style setting" window 1400 allows the user to display/set "document setting information" 403 (FIG. 3). This window 1400 is launched from a "setting of whole document" menu of a print style menu or a "setting of whole document" button on the tool bar on the operation window 900 shown in FIG. 9.

The "document style setting" window 1400 is used to set attributes that influences the style of the whole document. This window 1400 includes six tab sheets "sheet setting", "page setting", "finishing", "edit", "paper source", and "print quality", and FIG. 14 shows a display state of the sheet setting tab sheet.

This sheet setting tab sheet allows to mainly make settings for determining a layout on an output sheet. More specifically, the sheet setting tab sheet allows to designate a sheet size and orientation, a finishing size and orientation, the type of imposition, the imposition count, an imposition method, addition of printer's marks and bleeds, an bleed width, and the like.

Figure 15:
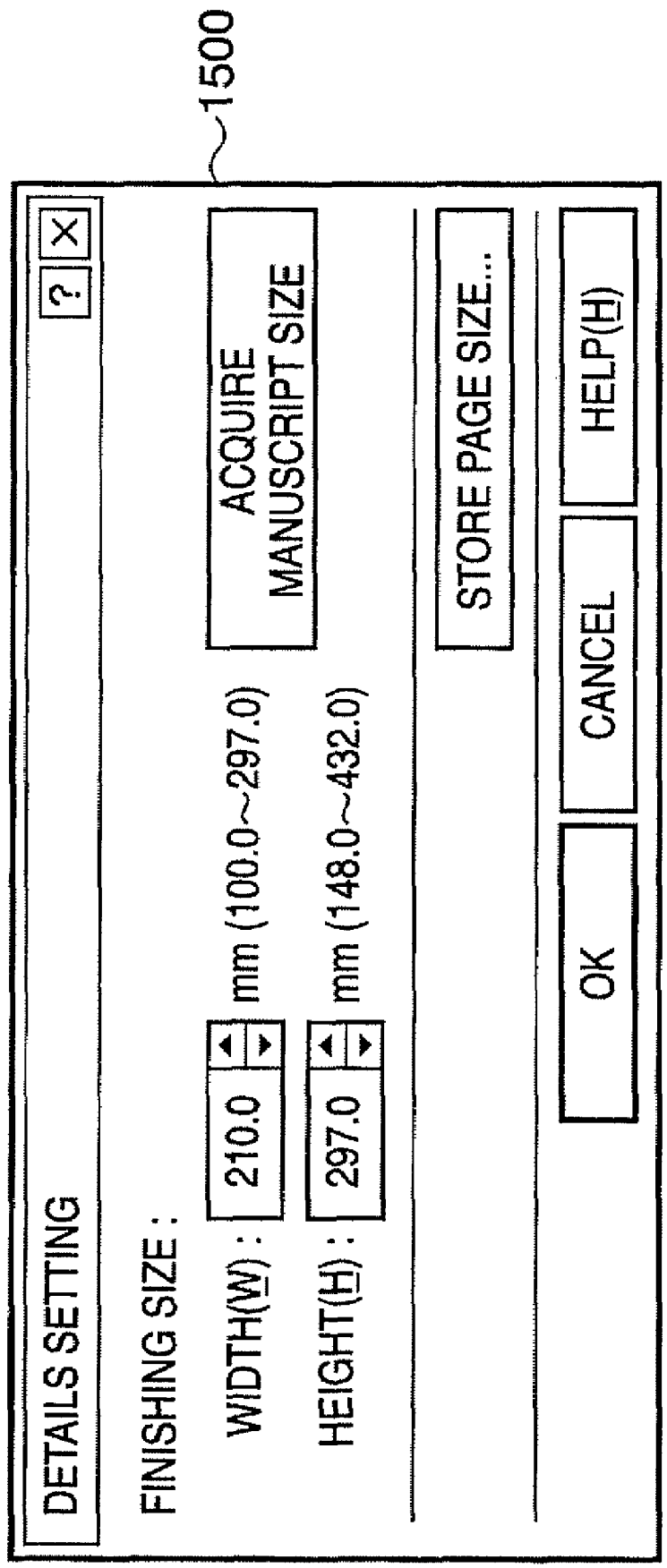
FIG. 15 shows an example of a "finishing size designation" window according to the embodiment of the present invention.

From the sheet setting tab sheet, a "finishing size designation" window 1500 shown in FIG. 15 can be launched by a details setting button 1401. Also, a "printer's mark/bleed setting" window 1600 shown in FIG. 16 can be launched by a printer's mark/bleed setting button 1402.

A check box control 1403 allows to designate to enlarge/reduce manuscript data to fit the finishing page size upon allocating the manuscript data on a finishing page. When the user checks the check box control 1403, the finishing enlargement/reduction attribute flag shown in FIG. 4B is set.

A check box control 1404 allows to designate to print (add) printer's marks and bleeds to a finishing page.

FIG. 15 shows the "finishing size designation" window 1500. The "finishing size designation" window 1500 is used to designate the "finishing page" size, and can designate the final finishing size in X mm (vertical) and Y mm (horizontal) after output sheets are trimmed and bound. The finishing size designated on this window is the size of the finishing pages used in a sheet layout in the bookbinding application 104. The finishing size can be registered in a client PC as a template.

FIG. 16 shows the "printer's mark/bleed setting" window 1600. This window is used to designate details settings (type, width, and display positions) of printer's marks, and the bleed widths on the top side, bottom side, left side, and right side of the finishing page (top side, bottom side, gutter side, and edge side in case of a bookbinding system). "Gutter" as an item of the bleed width indicates the side on the binding position side, and "edge" indicates the side on the book opening side opposite to the binding position. Default bleed widths are 3 mm for respective sides.

For example, when the user wants to print printer's marks on the finishing pages, he or she can designate printer's marks to be printed from corner printer's marks, center printer's marks, fold printer's marks, and the like in a check box control 1601. The corner printer's marks are marks indicating offset positions. The center printer's marks are marks which are used to determine misalignment of printing on a plurality of sheets and indicate the centers of respective sides. The fold printer's marks are marks indicating fold positions.

Furthermore, when the user wants to designate bleed widths (bleeds) for respective sides of the finishing page, he or she can independently designate them for respective sides of the finishing page in a menu 1602.

The present invention allows to set bleeds (bleed widths) using independent values for four sides, and when received manuscripts are added with arbitrary bleeds to the finishing size, the allocation positions of manuscripts can be determined by a simple operation.

A check box control 1603 allows to designate to enlarge/reduce manuscript data and superpose the manuscript data n the bleed widths. Especially, when this check box control 1603 is checked and the bleeds (bleed widths) are set, manuscript data are enlarged/reduced to fit the size of a bleed region. When the check box control 1603 is checked, the bleed enlargement/reduction attribute flag shown in FIG. 4B is set.

On the other hand, when the check box control 1603 is not checked and the bleeds (bleed widths) are set, imposition processing with reference to a bleed region (processing for aligning the center of the bleed region to that of a manuscript page) is executed. Note that details of this processing will be described later.

When both the check box control 1403 in FIG. 14 and the check box control 1603 in FIG. 16 are not checked, and the bleeds for the four sides are "0", imposition processing with reference to the finishing page, i.e. processing for aligning the center of the finishing page to that of a manuscript page is executed.

Note that the check box controls 1403 and 1603 have an exclusive relationship, and when one of these check box controls is selected, the other is grayed out to be unselectable.

FIG. 17 shows a display state of the finishing tab sheet on the "document style setting" window 1400. This finishing tab sheet allows to designate bookbinding details such as a print method, binding margin/direction, opening direction, gutter shift upon saddle stitching, and the like, the size of a cover sheet upon casing-in, a cover designation pattern upon casing-in. Also, this tab sheet allows to make designation for a printing device such as stapling, saddle stitching, casing-in, three-side trimming, and the like.

FIG. 17 shows a state wherein "casing-in (case binding)" is designated as a pull-down menu 1700 used to designate binding. Also, "glue and trim cover" or "not used" can be set as a "finishing setting" 1701. Especially, "glue and trim cover" means use of the inline finisher, and "not used" means use of the offline finisher or a near-line finisher.

When this "casing-in (case binding)" is set, imposition processing contents are changed depending on options of "finishing setting". More specifically, the imposition processing has the following contents:

(1) casing-in+inline finisher=imposition processing by making the bleed on "gutter" bite into the fold position (2) casing-in+offline finisher=imposition processing on a sheet with designated bleeds Details of this processing will be described later.

When "casing-in (case binding)" is designated as the binding designation 1700, a cover sheet size 1702 can be selected from a plurality of sheet sizes. As described above, since a cover sheet of casing-in must include a finishing sheet size including a front cover, spine, and back cover, it must be set independently of the sheet size of inner sheets (body text) upon casing-in designated in FIG. 14.

For example, when A4 is designated as the sheet size of inner sheets, and A4 or less is designated as the finishing sheet size, the sheet size for a cover of casing-in requires A3 wide or larger. As described above, the finishing size of the cover of casing-in can be obtained by a calculation since the spine is calculated from that of inner sheets (body text), the media type of an inner sheet, and the number of inner sheets.

The cover designation pattern 1703 of casing-in can be selected from a plurality of types of cover designation patterns. For example, a plurality of patterns are prepared: a pattern which uses the first page of a manuscript as a front cover, the second page as the reverse side of the front cover, the last page as a back cover, and a page immediately before the last page as the reverse side of the back cover, a pattern that uses the first page as a front cover, and the second page as a back cover, and so forth.

Figure 18:
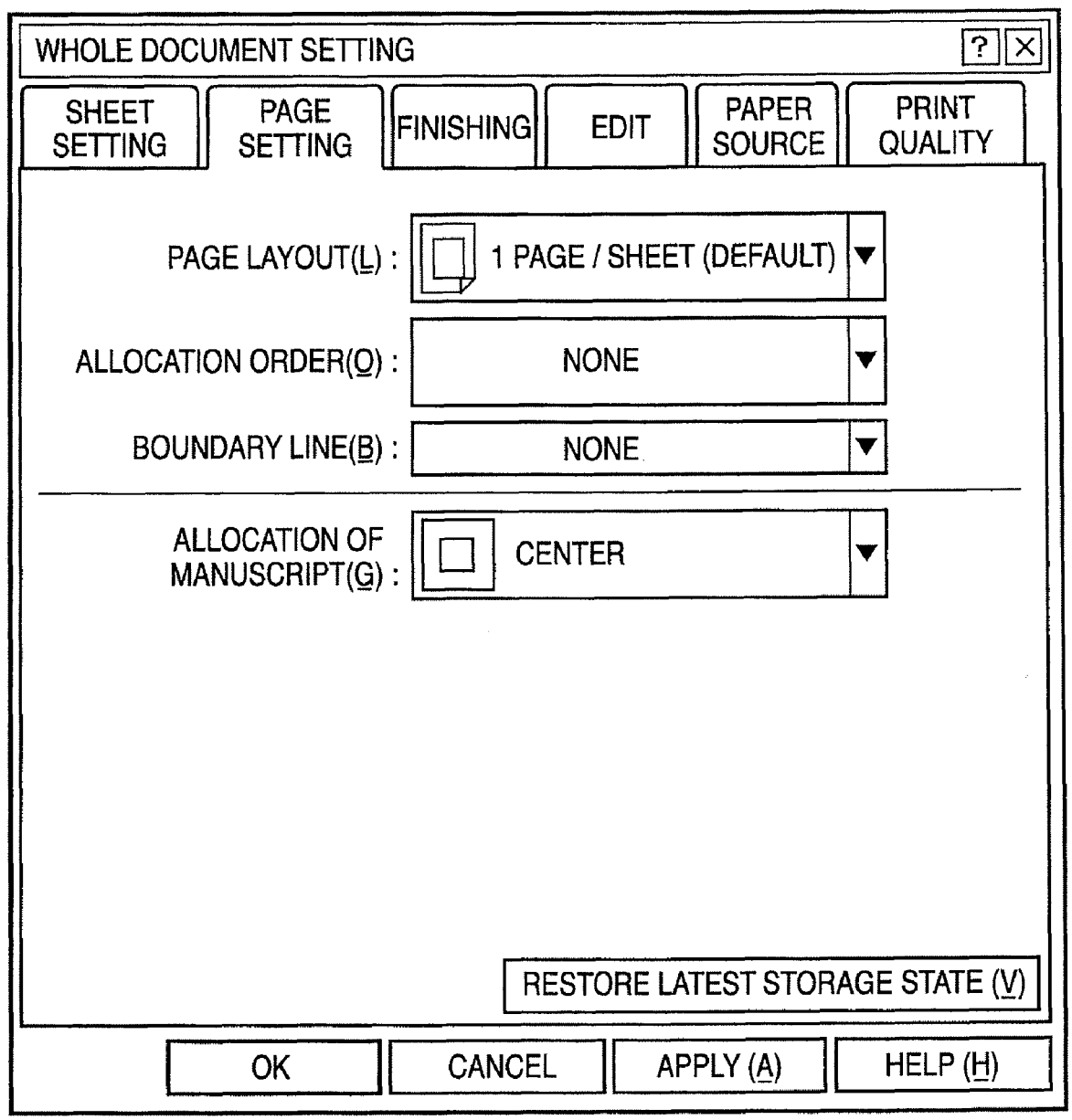
FIG. 18 shows an example of a "document style setting" window of the bookbinding application according to the embodiment of the present invention.

FIG. 18 shows a display state of the page setting tab sheet on the "document style setting" window 1400. The page setting tab sheet allows to mainly make settings about a layout in each finishing page on a sheet, and to designate settings of N-page print, an allocation method of a manuscript, and the like.

An operation window used to make details settings of a chapter will be described below using FIG. 19.

FIG. 19 shows an example of a "chapter style setting" window of the bookbinding application according to the embodiment of the present invention.

This "chapter style setting" window 1900 allows the user to display/set "chapter setting information" 407. This window 1900 is launched from a "chapter setting" menu on the print style menu or a "chapter setting" button on the tool bar on the operation window 900 in FIG. 9.

The "chapter style setting" window 1900 is used to set attributes unique to a chapter. This window 1900 includes six tab sheets "sheet setting", "page setting", "finishing", "edit", "paper source", and "print quality", and FIG. 19 shows a display state of the sheet setting tab sheet.

Figure 20:
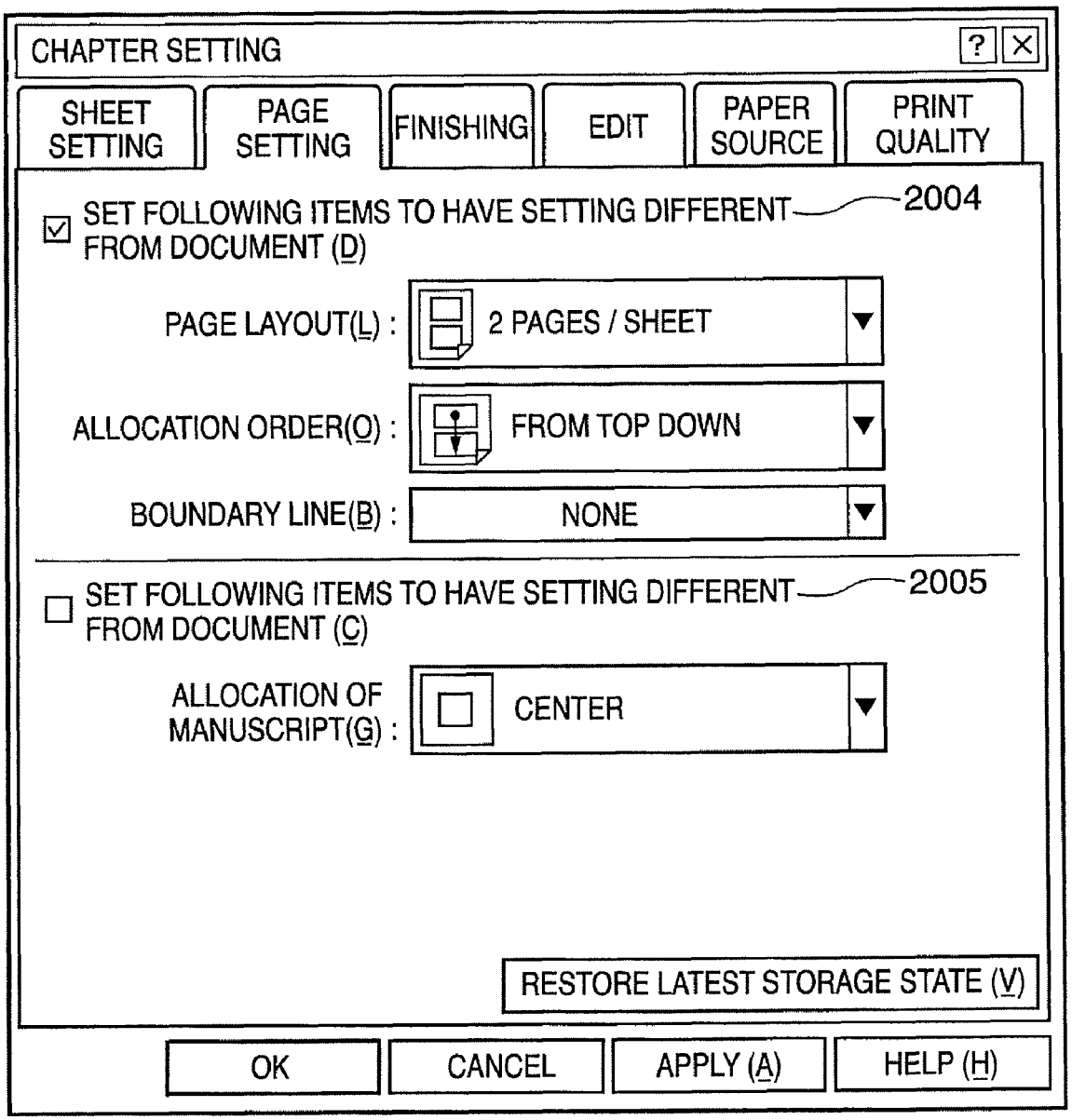
FIG. 20 shows an example of a "chapter style setting" window of the bookbinding application according to the embodiment of the present invention.

FIG. 20 shows a display state of the page setting tab sheet. The sheet setting tab sheet and page setting tab sheet allow to mainly make settings about a layout unique to each chapter, and the sheet setting tab sheet allows to designate settings such as a paper size, orientation, and the like. The page setting tab sheet allows to designate settings of N-page print, and the like.

As overlapping setting items in "document style setting" and "chapter style setting", check box controls 2001, 2002, 2003, and 2004, and 2005 of "set following items to have settings different from document" are arranged. As for unchecked items of these check box controls, the setting values of the document are applied to that chapter. Settings unique to a chapter can be classified into two types. One type corresponds to setting items of only a chapter, and the other type corresponds to a case wherein unique setting values different from a document as an upper layer are held by the layer of a chapter.

FIG. 20 shows a state wherein the check box control 2004 is checked on the page setting tab sheet. In this case, even when the whole document has 1-UP designation, pages which form this chapter have 2-UP designation.

An operation window used to make details settings of a page will be described below using FIG. 21.

FIG. 21 shows an example of a "page details setting" window of the bookbinding application according to the embodiment of the present invention.

This "page details setting" window 2100 allows the user to display/set "page setting information" 411. This window 2100 is launched from a "page setting" menu of the print style menu or a "page setting" button on the tool bar on the operation window 900 in FIG. 9.

The "page details setting" window 2100 is used to set attributes unique to each page. This window 2100 includes three tab sheets "page setting", "edit", and "print setting", and FIG. 21 shows a display state of the page setting tab sheet.

This page setting tab sheet allows to make settings about a layout unique to each page, and to designate settings such as a rotation angle, enlargement/reduction scale, and the like upon allocating a manuscript page. As an overlapping setting items in "chapter style setting" and "page details setting", a check box control 2101 of "set following items to have settings different from chapter" is arranged. As for unchecked items of this check box control, the setting values of a chapter are applied to that page.

FIG. 22 shows a state wherein the check box control 2101 is checked, and the setting of rotation of a manuscript page is changed using a menu control 2201. Especially, in this case, the menu control 2201 is used to set so that the page is allocated to have its top on the left side upon laying out a manuscript page. This item does not have any check box control of "set following items to have settings different from chapter". That is, since there are no overlapping setting items in a chapter and document, the settings displayed on this window always become the setting values of a page.

When the check box control 2101 is checked, for example, since a "manuscript allocation" item has an overlapping setting item in a chapter, the setting value of a chapter is used as that of a page. If the control of "set following items to have settings different from document" is unchecked, the setting value of a chapter for the corresponding item "manuscript allocation" uses that of a document as an upper layer. For this reason, in this case, the setting value of a page consequently uses that of a document. If the corresponding item in a chapter is checked, since the setting value unique to a chapter is set, the setting value of a page uses that unique to a chapter.

Note that information of each check box control set on the operation window may be held in a dedicated area, but may be held as one of attributes in the setting information shown in FIG. 3. In this case, areas for holding information of each check box control are added to FIGS. 5 and 6.

<Display Example of Document Edit of Document Processing System>

Figure 23:
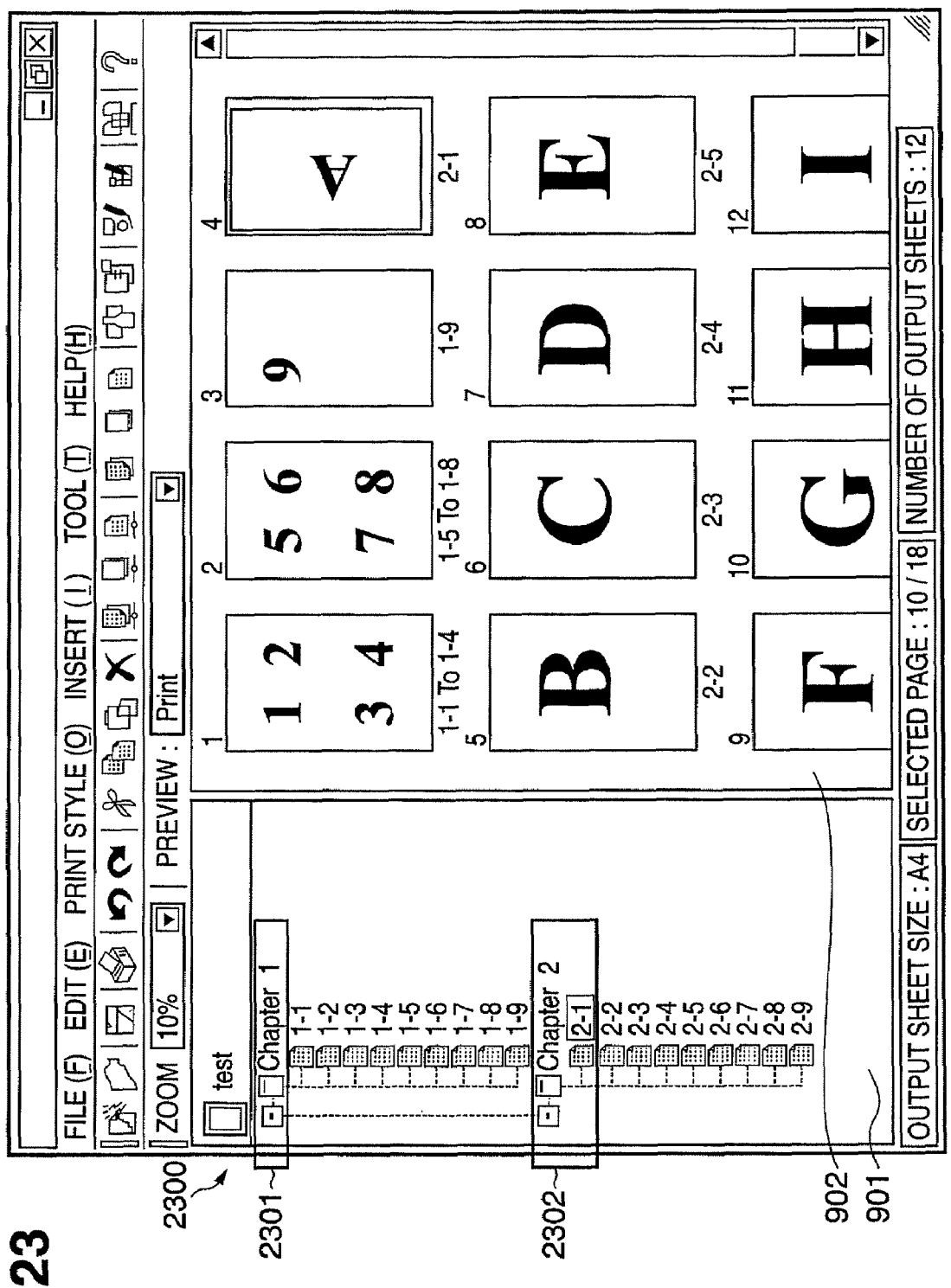
FIG. 23 shows a display example of a document edit window according to the embodiment of the present invention.

FIG. 23 shows the display format of the application when the setting values of the upper layer of setting items which overlap those of the upper layer are not used, i.e., when the check box controls 2001 and 2101 are unchecked.

In the example of FIG. 23, a document includes two chapters, each of which has nine pages of manuscript data. FIG. 23 shows a display example when the layout of the first chapter has designation of 4UP (also described as 4in1), and the first page (10th page in the whole document) of the second chapter is designated with rotation.

The preview area 902 displays a state wherein four manuscripts are allocated per page on the first to third pages. Also, the preview area 902 displays a state wherein letter "A" as data of the fourth page is rotated.

The display format upon making settings unique to a chapter or page on the tree area 901 will be described below. In this case, an icon 2301 corresponding to the first chapter changes to indicate that settings unique to a chapter are made for this chapter. Also, an icon 2302 corresponding to the first page of the second chapter changes to indicate that special settings are made for this page.

Figure 24:
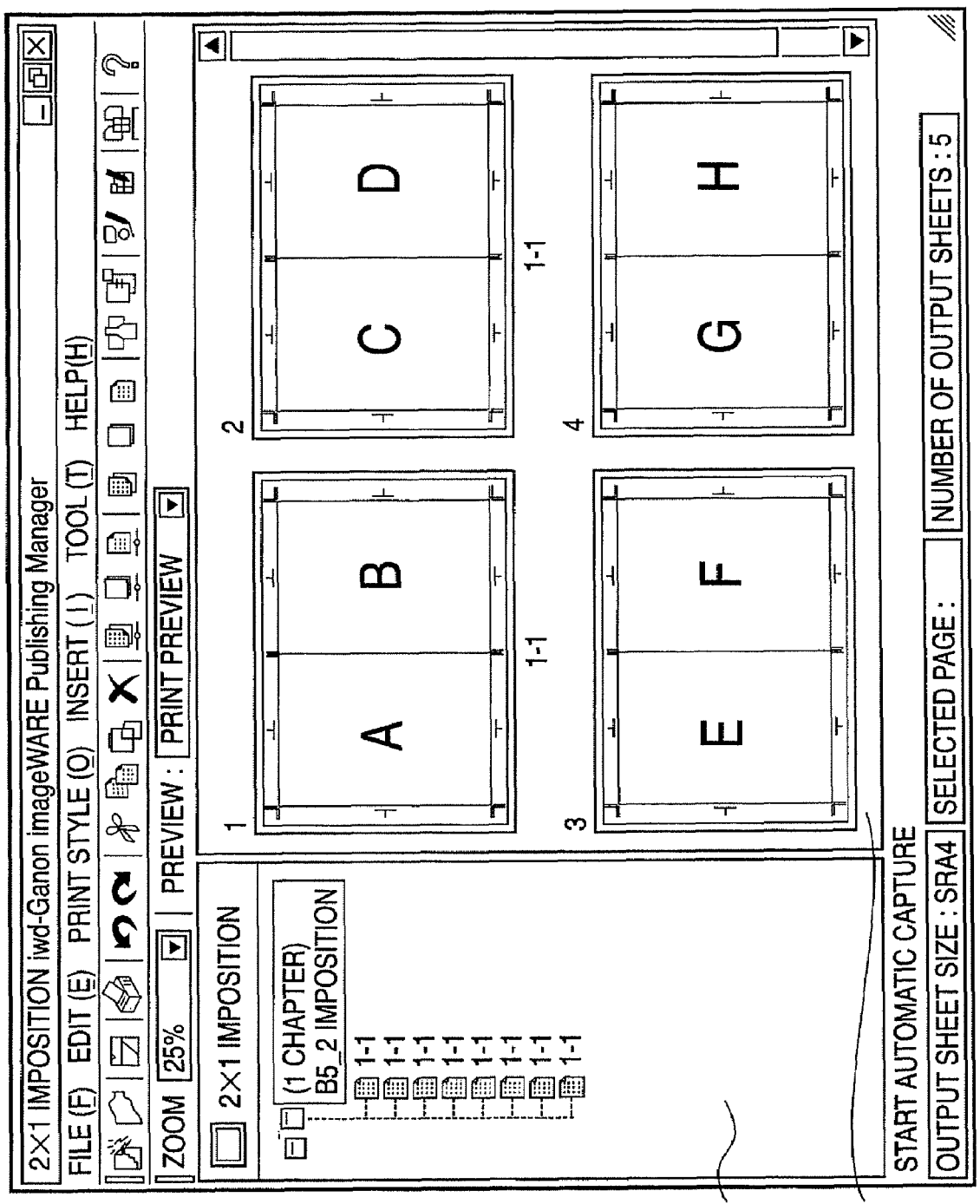
FIG. 24 shows an example of a user interface window upon opening an existing book file according to the embodiment of the present invention.

In an example shown in FIG. 24, a document includes one chapter, which has eight pages of manuscript data. FIG. 24 shows a display example when "leaflet (1 (vertical)×2 (horizontal))" is designated using a "type of imposition" designation combo box on the sheet setting tab sheet in FIG. 14, and designation to print "corner printer's marks" and "center printer's marks" is made on the ""printer's mark/bleed setting" window 1600 in FIG. 16. The preview area 902 displays that printer's marks are drawn on-respective finishing pages.

<Imposition Method in Document Processing System>

Imposition setting processing based on user's operations upon importing manuscript pages with margins, and imposing them in the document processing system according to this embodiment will be described below.

Figure 25:
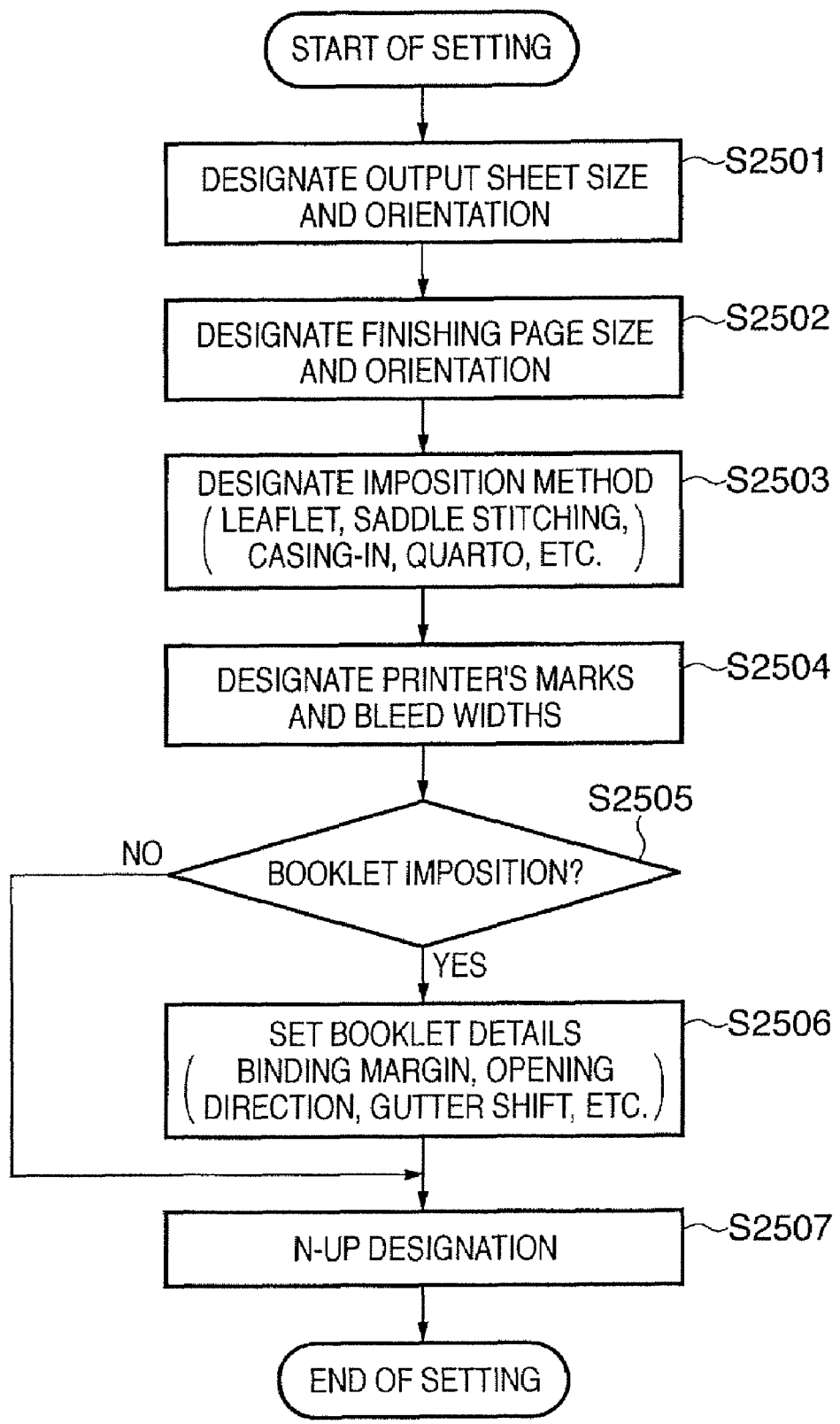
FIG. 25 is a flowchart showing the imposition setting processing by the bookbinding application according to the embodiment of the present invention.

FIG. 25 is a flowchart showing imposition setting processing by the bookbinding application according to the embodiment of the present invention. This operation is implemented when the CPU 201 executes arithmetic processing based on the program of the bookbinding application 104 in practice. However, for the sake of easy understanding, this operation will be described as that of the bookbinding application 104.

Note that this imposition setting processing is executed based on user's operations mainly on the "document style setting" window 1400 shown in FIG. 14.

The bookbinding application 104 designates the output sheet size and its orientation for printed materials based on user's operations input via the document style setting window shown in FIG. 14 (step S2501). Next, the bookbinding application 104 designates the finishing size and its orientation for printed materials in accordance with user's operations via the finishing size setting window (FIG. 15) (step S2502).

The bookbinding application 104 designates an imposition method (X (vertical)×Y (horizontal), imposition for quarto, that for casing-in, that for saddle stitching, and the like) in accordance with user's operations on the binding designation 1700 on the finishing tab sheet shown in FIG. 17 (step S2503).

The bookbinding application 104 then designates printer's marks and bleed widths in accordance with user's operations on the printer's mark/bleed setting window shown in FIG. 16 (step S2504). On this window, whether or not to draw corner printer's marks/center printer's marks/fold printer's marks, and the bleed widths can be designated. When the user designates the same widths as the margins included in manuscript data, the center of the finish that the user intended can be aligned to that of the finishing pages after imposition.

The bookbinding application 104 checks if the imposition method designated in step S2503 is booklet imposition (quarto, casing-in, saddle stitching, or the like) designation (step S2505). If booklet imposition designation is not made (NO in step S2505), the process advances to step S2507. On the other hand, if booklet imposition designation is made (YES in step S2505), the bookbinding application 104 makes bookbinding style settings such as a binding margin, opening direction, gutter shift, and the like (step S2506). Furthermore, upon making N-UP print, the bookbinding application 104 makes N-UP designation (step S2507).

If N-UP print is not made, a default value "1 page/sheet" is designated as N-UP designation.

With the above processing, the imposition setting processing as pre-processing before the beginning of imposition processing ends.

When manuscript data imported to the bookbinding application 104 are data of a PDF/X format, and page box information is embedded in the data, the bookbinding application 104 reflects the page box information in the book attributes upon importing. In this way, the page box information can be automatically set in various setting items of the bookbinding application 104.

Note that PDF/X is a short for Portable Document Format exchange. Also, PDF/X is a document format which is standardized by ISO, and is defined for a print purpose of PDF format documents.

The PDF/X page box information includes document setting information such as a "media box (sheet size)", "bleed box (bleed size)", "trim box (finishing size)", "art box (art size)", and the like. For example, if a manuscript has a "media box" value, it is stored as the sheet size in the book attributes. Also, a "trim box" value is stored as the finishing size in the book attributes. A value obtained by subtracting the "trim box" (finishing size)" value from a "bleed box (bleed size)" value is stored as the "bleed width" attribute.

When manuscript data hold page box information, the bookbinding application 104 can import that page box information. In this case, upon launching various operation windows of the bookbinding application 104, various parameters in the page box information are already set in various controls on the operation windows as default values. In this way, the user is released from most of setting operations of the imposition setting processing shown in the flowchart of FIG. 25.

Next, the imposition processing by the bookbinding application 104 will be described below.

Figure 26:
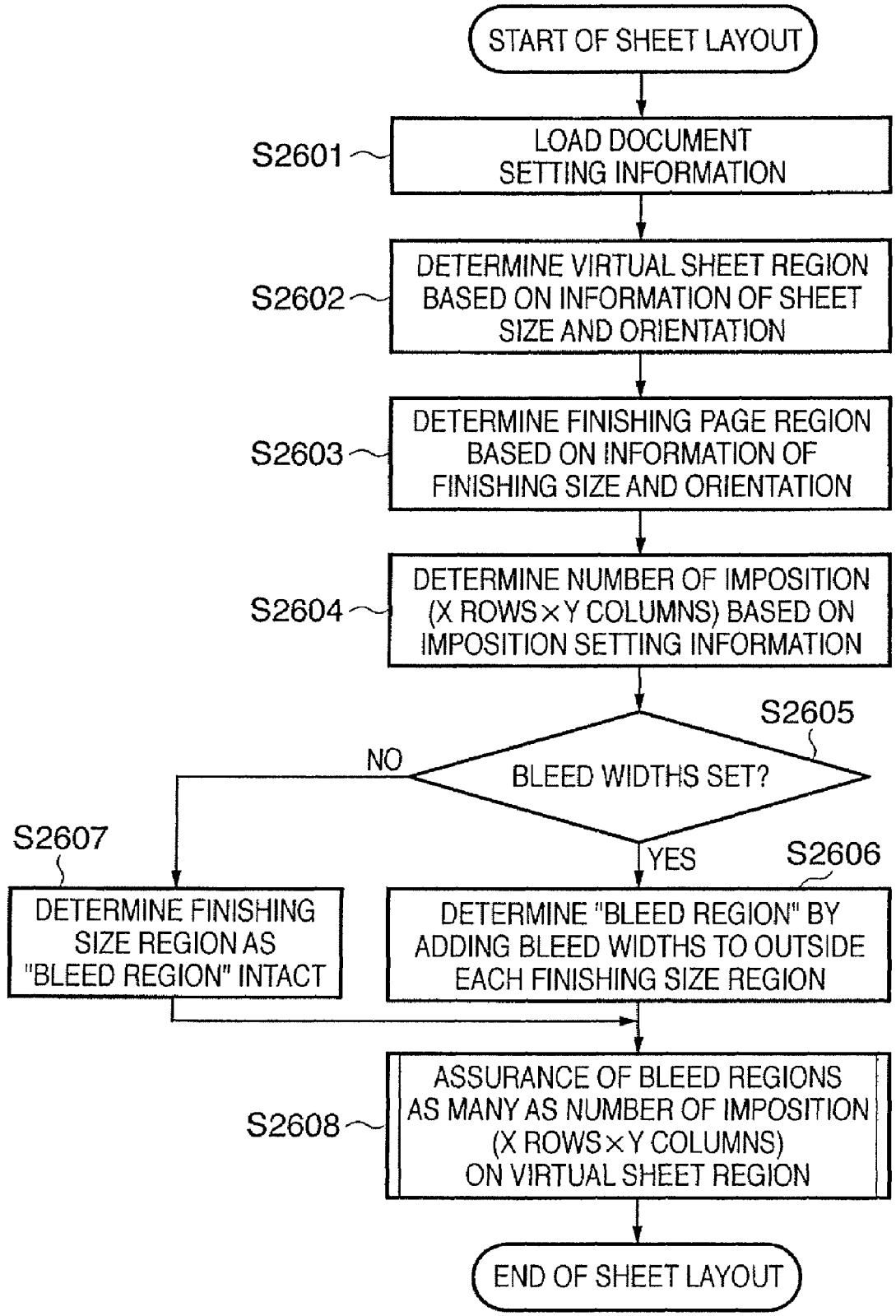
FIG. 26 is a flowchart showing the imposition processing by the bookbinding application according to the embodiment of the present invention.

FIG. 26 is a flowchart showing the imposition processing by the bookbinding application according to the embodiment of the present invention. This operation is implemented when the CPU 201 executes arithmetic processing based on the program of the bookbinding application 104 in practice. However, for the sake of easy understanding, this operation will be described as that of the bookbinding application 104.

FIG. 26 especially shows processing (sheet layout processing) for determining a sheet layout in the imposition processing of the bookbinding application 104.

The bookbinding application 104 loads the document setting information 403 from a book file (step S2601). The bookbinding application 104 then determines a virtual sheet region based on information of the sheet size and orientation in the document setting information 403 (step S2602). The bookbinding application 104 determines a finishing page region based on information of the finishing size and orientation in the document setting information 403 (step S2603).

The bookbinding application 104 determines the number of imposition (X (vertical)×Y (horizontal)) based on the imposition setting information in the document setting information 403 (step S2604).

When "leaflet" is selected as the imposition method, the bookbinding application 104 determines the number of imposition according to the number of pages to be imposed, i.e., X (vertical)×Y (horizontal) designated by the user. If the bookbinding-system (saddle stitching, casing-in, quarto, or the like) imposition is selected as the imposition method, the bookbinding application 104 determines the number of imposition according to a table held by itself. For example, when "saddle stitching" is selected, the number of imposition is determined as "1 (vertical)×2 (horizontal)" is determined. When "casing-in" is selected, the number of imposition is determined as "1 (vertical)×1 (horizontal)". When "quarto" is selected, the number of imposition is determined as "2 (vertical)×2 (horizontal)".

The bookbinding application 104 checks whether or not the bleed widths are set in the document setting information 403 (step S2605). If the bleed widths are set (YES in step S2605), the bookbinding application 104 determines a region obtained by adding the bleed widths to outside the finishing size region as a bleed region (step S2606). On the other hand, if the bleed widths are not set (NO in step S2605), the bookbinding application 104 determines the finishing size region as a bleed region intact (step S2607).

The bookbinding application 104 assures X (vertical)×Y (horizontal) bleed regions determined in step S2606 or S2607 on the virtual sheet region (step S2608), thus ending the sheet layout processing.

If the booklet-based imposition (that for saddle stitching, casing-in, quarto, or the like) is selected as the imposition method in the bookbinding application 104, the processing contents in step S2608 differ. Details of step S2608 upon selection of the booklet-based imposition will be described below using FIG. 27.

Figure 27:
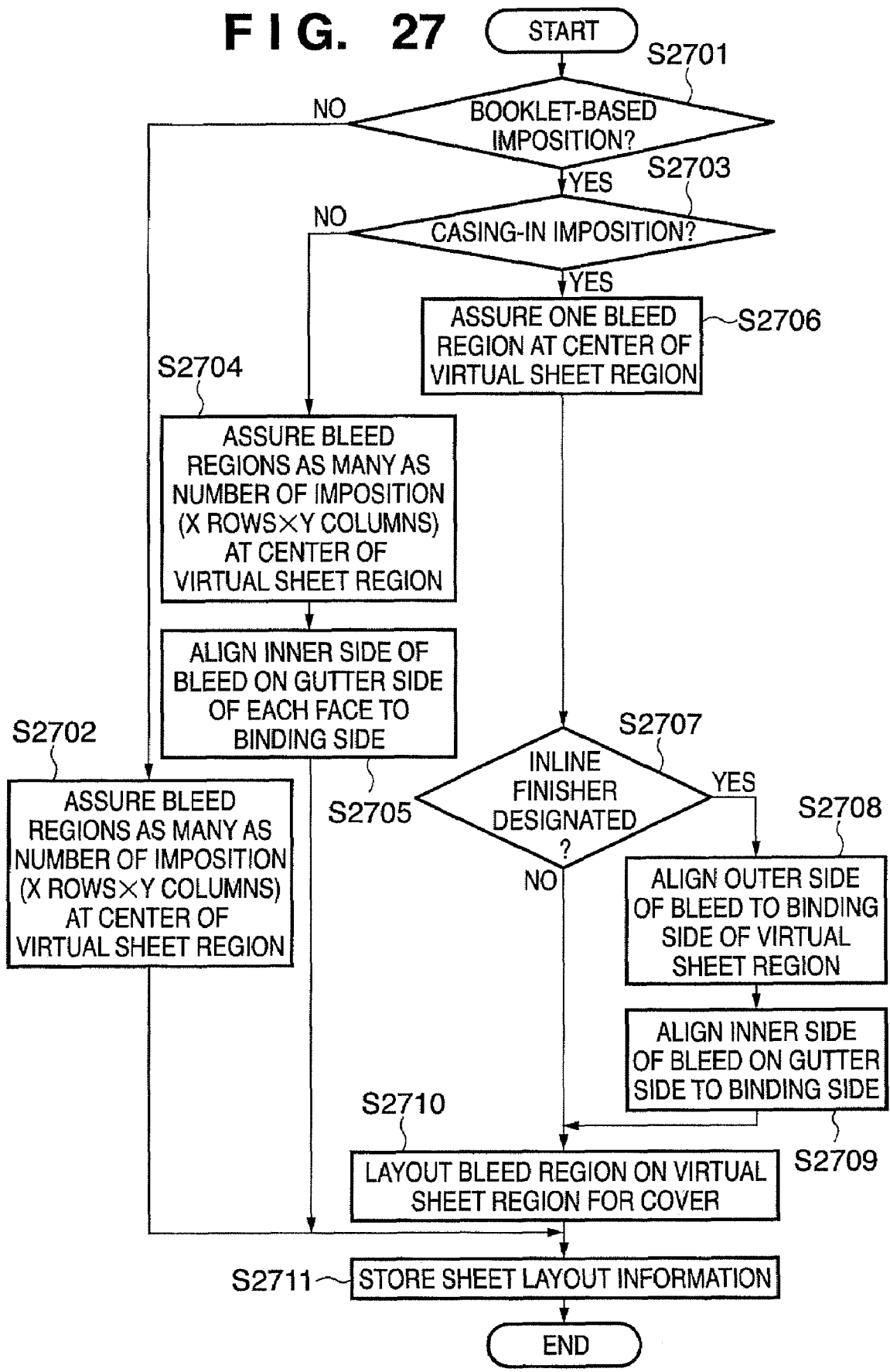
FIG. 27 is a flowchart showing details of step S2608 according to the embodiment of the present invention.

FIG. 27 is a flowchart showing details of step S2608 according to the embodiment of the present invention.

The bookbinding application 104 checks first if the designated imposition method is booklet-based imposition (step S2701). If the designated imposition method is not booklet-based imposition (NO in step S2701), the bookbinding application 104 assures X (vertical)×Y (horizontal) bleed regions determined in step S2606 or S2607 (step S2702).

If the designated imposition method is booklet-based imposition (YES in step S2701), the bookbinding application 104 further checks if that imposition method is "casing-in" (step S2703). If the imposition method is other than "casing-in" ("quarto" or "saddle stitching"), the bookbinding application 104 assures bleed regions determined in step S2606 or S2607 as many as the required number of imposition at the center of the virtual sheet region (step S2704).

This is because when bleed regions are designated in quarto or saddle stitching, the inline finisher does not support such trimming processing. For this reason, such trimming processing is assumed to be executed by the offline finisher.

Of course, if the inline finisher supports three-side trimming processing in "quarto" or "saddle stitching", the process may branch to the same processing as in casing-in. This embodiment is premised on that the inline finisher attached to a device as an output destination supports only a three-side trimming function upon casing-in.

The bookbinding application 104 performs position alignment by shifting the allocation position of a finishing page so that the inner side of the bleed on the "gutter" side matches the position of the side (binding side) on the binding side as for the imposition method ""quarto" or "saddle stitching" (step S2705).

Note that the inner side of the bleed means one which contacts the finishing page region, and the outer side of the bleed means that of an outermost circumscribing region of the bleed region.

On the other hand, if the imposition method is "casing-in (case binding)" (YES in step S2703), bookbinding application 104 assures one bleed region determined in step S2606 or S2607 at the center of the virtual sheet region (step S2706).

Next, the bookbinding application 104 checks if casing-in (gluing, three-side trimming) using the inline finisher is designated (step S2707).

If casing-in using the inline finisher is designated (YES in step S2707), the bookbinding application 104 shifts the outer side of the bleed on the "gutter" side on the virtual sheet region to the side on the binding side (binding side) (step S2708). Furthermore, the bookbinding application 104 aligns the inner side of the bleed (bleed width region) on the "gutter" side to match the position of the binding side (step S2709), thus ending the sheet layout processing for inner sheets of casing-in.

At this time, in case of casing-in, the finishing size of body text as inner sheets is allocated evenly in the up-and-down direction of the print sheet size, and is allocated so that the bleed on the "gutter" side bites into the binding position in the right-and-left direction.

In this way, by evenly allocating the up-and-down direction of the finishing size with respect to the up-and-down direction of the print sheet size, even when the up-and-down direction cannot be independently adjusted upon executing three-side trimming by the inline finisher, the finishing size can be prevented from being erroneously trimmed or sheets can be prevented from being trimmed while leaving the bleeds. Since trimming processing by designating the width of the finishing size from "gutter" to "edge" upon trimming by the inline finisher is a state-of-the-art technique, a detailed description thereof will be omitted.

Since "casing-in (case binding)" requires imposition processing for a glued-on cover in addition to inner sheets as body text, bookbinding application 104 allocates a bleed region (finishing size and bleeds) on a region assured as a virtual sheet region for a cover (step S2710).

Upon executing the sheet layout processing for a cover of casing-in by the inline finisher, position alignment is made until the inner side of the bleed (bleed width region) on the "gutter" side matches the position of the binding side in a spine region (spine width). More specifically, since the bleed on the "gutter" side bites into the spine region, the bleed on the "gutter" side is discarded without generating any rendering data. Note that the finishing size for a cover is allocated evenly in the up-and-down direction of the paper sheet size.

On the other hand, if casing-in by the inline finisher is not designated (NO in step S2707), i.e., if casing-in by the offline finisher or near-line finisher is designated, the bookbinding application 104 executes sheet layout processing for a cover of casing-in (step S2710). In this case, the bleed region is allocated at the center of the virtual sheet region. The imposition processing of inner sheets as body text is executed in step S2705 without any modification. This is because in case of the offline finisher, since the trimming processing for inner sheets and processing for gluing to the inner sheets, and wrapping them by a glued-on cover are independently executed, the trimming processing of the inner sheets does not pose any problem not as three-side trimming but as four-side trimming.

The bookbinding application 104 stores the sheet layout information obtained by the processing result in step S2702, S2705, or S2710 in the RAM 202 (step S2711). In this manner, the sheet layout processing for "imposition of casing-in" ends.

Examples of sheet layouts generated by the processing in FIG. 26 upon designation of various imposition methods will be described below using FIGS. 28 to 35.

Figure 28:
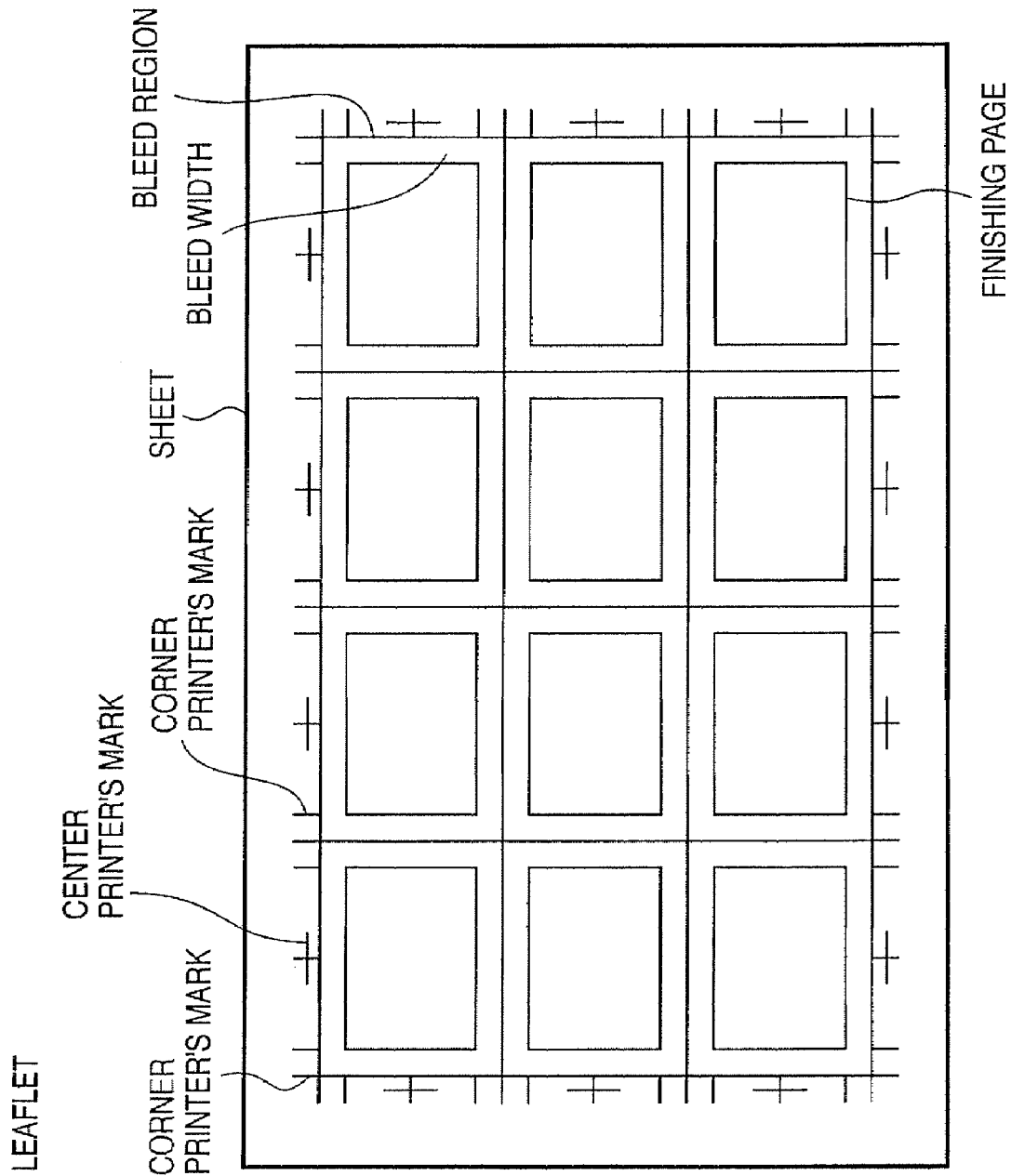
FIG. 28 shows an example of a sheet layout generated by the bookbinding application according to the embodiment of the present invention.

FIG. 28 shows a sheet layout determined by the bookbinding application 104 upon selection of "leaflet (3×4)" as the imposition method.

FIG. 29 shows a sheet layout determined by the bookbinding application 104 upon selection of "saddle stitching" as the imposition method.

FIG. 30 shows how the bookbinding application 104 assures an bleed margin region for each finishing page of FIG. 29. As can be seen from FIG. 30, the bookbinding application 104 assures an bleed width region on the "gutter" side at a position beyond the binding side. Strictly speaking, the inner side of the bleed width region on the "gutter" side is aligned to the binding side.

The bookbinding application 104 prints only up to the bleed region (a region obtained by adding the bleed widths to the finishing page). That is, upon allocating a manuscript page beyond the bleed region, the manuscript page beyond the bleed region is masked upon printing. Also, the bookbinding application 104 does not print the bleed width region on the "gutter" side which extends over the neighboring finishing page region.

FIG. 31 shows a sheet layout determined by the bookbinding application 104 upon selection of "casing-in" as the imposition method.

Upon designation of the inline finisher, the finishing page is allocated against the edge on the binding margin side of a sheet, and bleed widths are set for respective sides. As shown in FIG. 31, an bleed width region on the "gutter" side is assured outside the binding side. The bookbinding application 104 prints only up to the bleed region (a region obtained by adding the bleed widths to the finishing page). Also, the bookbinding application 104 does not print the bleed width region on the "gutter" side which extends over the neighboring finishing page region.

On the other hand, upon designation of the offline finisher, a finishing page region is allocated at the center of a sheet, and bleed widths are set for respective sides. In case of the offline finisher, the bookbinding application 104 lays out a bleed region at the center of a sheet, and prints up to the bleed region on the sheet.

Figure 32:
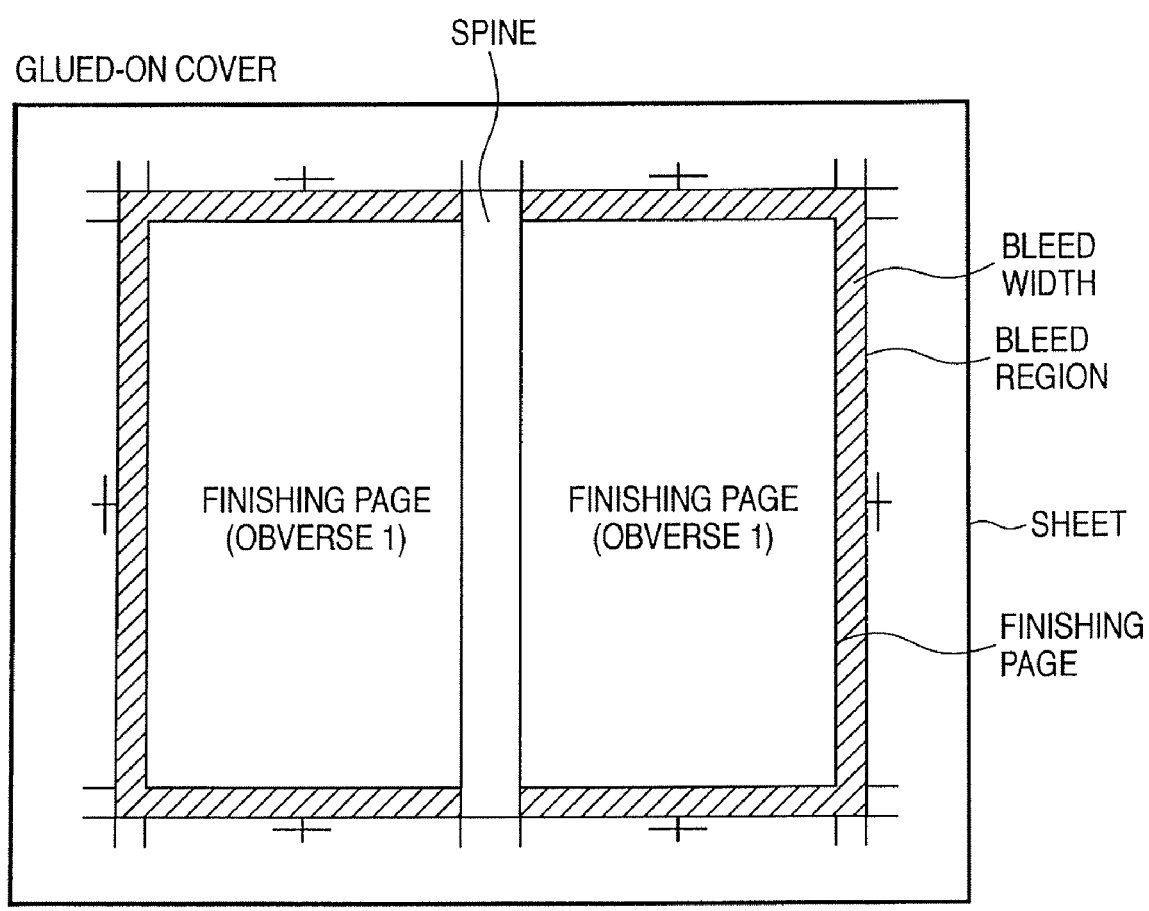
FIG. 32 shows an example of a page layout generated by the bookbinding application according to the embodiment of the present invention.

FIG. 32 shows a sheet layout result for "glued-on cover" upon selection of "casing-in" as the imposition method. FIG. 33 shows how the bookbinding application 104 sets a bleed region on each finishing page in FIG. 32. As shown in FIG. 33, the bleed width region on the "gutter" side exists to erode the spine region. However, the bleed width region on the "gutter" side that erodes the spine region is not printed. In other words, by aligning the inner side of the bleed width region on the "gutter" side to the binding side of the spine region, the bleed width region on the "gutter" side is consequently not printed.

Figure 34:
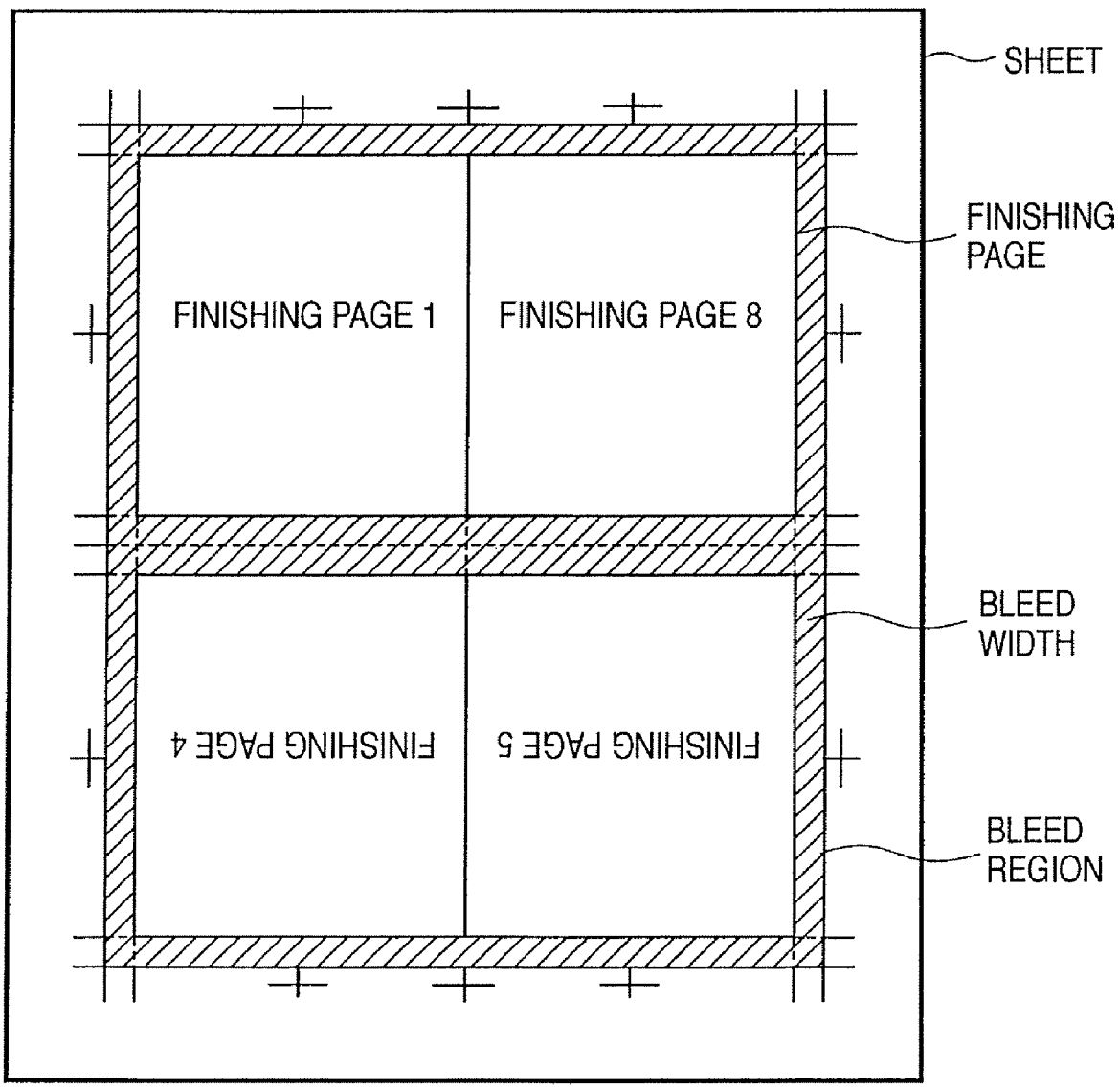
FIG. 34 shows an example of a page layout generated by the bookbinding application according to the embodiment of the present invention.
Figure 35:
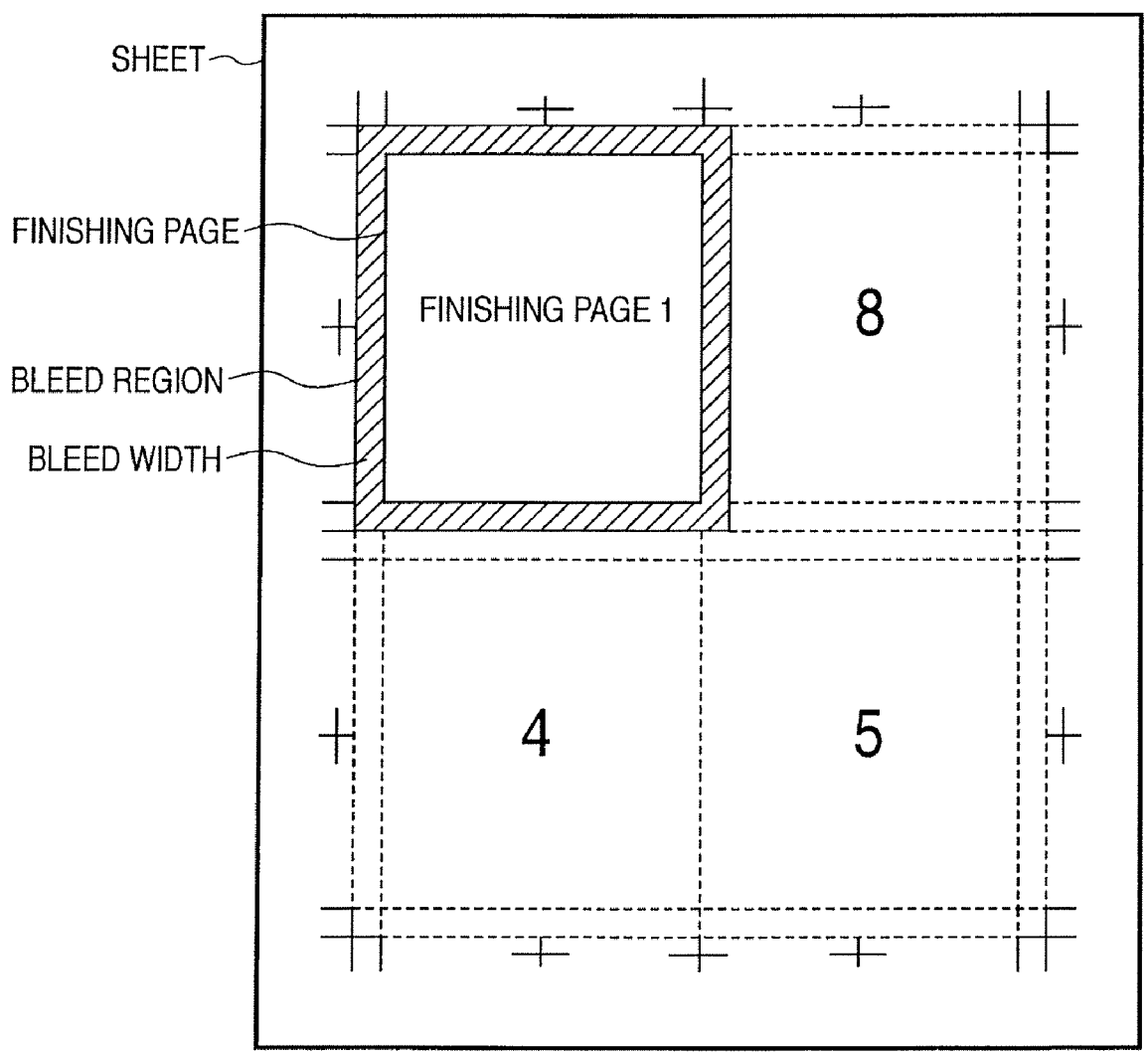
FIG. 35 shows an example of a page layout generated by the bookbinding application according to the embodiment of the present invention.

FIG. 34 shows a sheet layout determined by the bookbinding application 104 upon selection of "quarto" as the imposition method. FIG. 35 shows how the bookbinding application 104 sets a bleed region on each finishing page in FIG. 34. In case of "quarto" as well, the inner side of the bleed on the gutter side at the center of a sheet is aligned to the binding side. In this way, the bleed on the "gutter" side is not printed. In this case as well, a region outside the bleed region is not printed.

Processing for allocating manuscript data on finishing pages on a sheet layout generated by the imposition processing of the bookbinding application 104 will be described below using FIG. 36.

Figure 36:
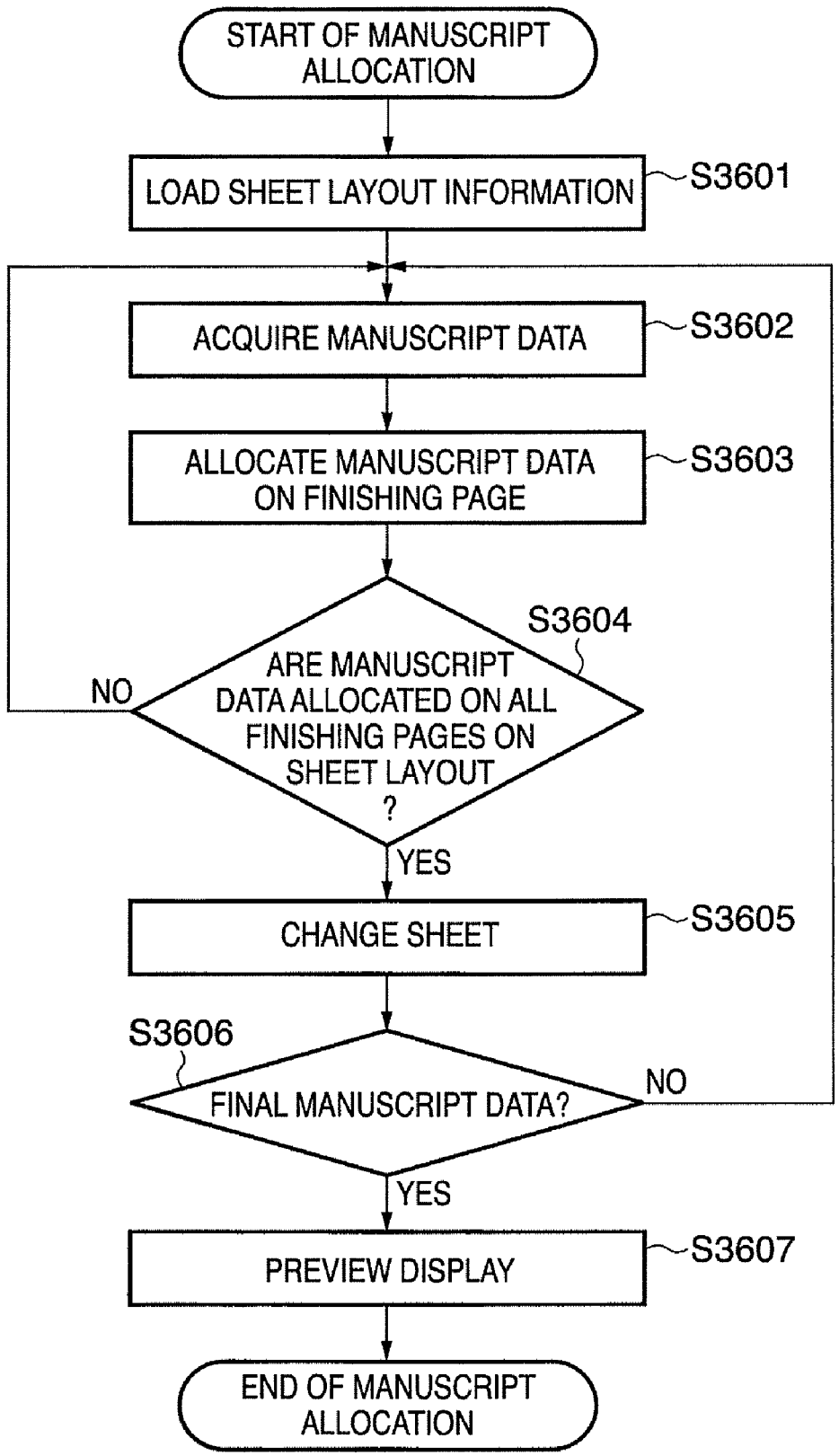
FIG. 36 is a flowchart showing the manuscript data allocation processing by the bookbinding application according to the embodiment of the present invention.

FIG. 36 is a flowchart showing the manuscript data allocation processing by the bookbinding application according to the embodiment of the present invention.

The bookbinding application 104 loads the sheet layout information generated in FIG. 27 from the RAM 202 (step S3601). Next, the bookbinding application 104 acquires manuscript page data of the first page (step S3602). The bookbinding application 104 then allocates manuscript data on the first finishing page on the sheet layout (step S3606).

The allocation processing in step S3606 will be described in detail below. The bookbinding application 104 checks if the check box control 1603 in FIG. 16 is designated, the check box control 1403 is designated, or neither of the check box controls are designated is set.

If the check box control 1603 is checked, and the bleeds (bleed widths) are set in the item 1602, the bookbinding application 104 enlarges/reduces manuscript data to fit the size which is set as the finishing sheet size and is obtained by adding the bleed widths. In this way, the center of the bleed region matches that of the manuscript page. This imposition pattern is called bleed enlargement/reduction.

If neither the check box control 1603 nor the check box control 1403 are checked, and the bleeds (bleed widths) are set in the item 1602, the bookbinding application 104 executes imposition processing with reference to the bleed region by aligning the center of the bleed region to that of the manuscript page without enlarging or reducing the manuscript data. With this processing, the center of the bleed region matches that of the manuscript page. This imposition pattern is called bleed region alignment.

If neither the check box control 1603 nor the check box control 1403 are checked, and the bleeds (bleed widths) are set to be "0" for four sides in the item 1602, the bookbinding application 104 imposition processing with reference to the finishing page by aligning the center of the finishing page to that of the manuscript page without enlarging or reducing the manuscript data. With this processing, the center of the finishing size matches that of the manuscript page. This imposition pattern is called finishing alignment.

If the check box control 1403 is checked, the bookbinding application 104 enlarges/reduces the manuscript data to match with the finishing sheet size. With this processing, the center of the finishing size matches that of the manuscript page. This imposition pattern is called finishing enlargement/reduction.

In this way, the operator can designate the four imposition patterns by a basic simple operation. Note that the center of the bleed region means an intersection of two diagonal lines of a circumscribing rectangle of the bleed region.

With the patterns that do not undergo enlargement/reduction processing, when manuscript data protrudes from the bleed region, the protruded manuscript data part is masked. Therefore, data is printed up to the bleed region. If the received manuscript data includes unnecessary printer's marks, blank areas, and the like outside the margins, data outside the bleeds in the manuscript data is not printed to print printer's marks added by the bookbinding application.

Since the manuscript data itself is not clipped, data outside the bleed region remains. Hence, the data outside the margins of the manuscript data can be printed when it is shifted to fall within the bleed region using the manuscript shift function of the bookbinding application 104.

Even when the margin widths at the left, right, top, and bottom sides of manuscript data have different values, the same values as those of the margin widths are set as the bleed widths of the left, right, top, and bottom sides of the bookbinding application 104, the center of the finish that the user intended is allocated at that of the finishing page on the bookbinding application 104.

The bookbinding application 104 checks if finishing pages on which no manuscript data is allocated still remain on the sheet layout. If such finishing pages still remain (NO in step S3604), the process returns to step S3602. On the other hand, if finishing pages to be processed do not remain (YES in step S3604), since the manuscript data allocation processing of the first sheet is complete, the bookbinding application 104 selects the second sheet, and starts the manuscript data allocation processing of the second sheet (step S3605).

The bookbinding application 104 repeats the aforementioned operations until the allocation processing on the finishing pages of all manuscript data of the book file is completed. Upon completion of the manuscript data allocation processing (YES in step S3606), the bookbinding application 104 preview-displays the imposition processing result as the allocation processing result of manuscript data on the CRT display 210.

With the flows shown in FIGS. 26 and 36, the imposition processing of the bookbinding application 104 is complete.

An execution example of the imposition processing by the bookbinding application 104 of this embodiment using an example of typical manuscript data to be imported to a general imposition application, and its output result will be described below.

Figure 37:
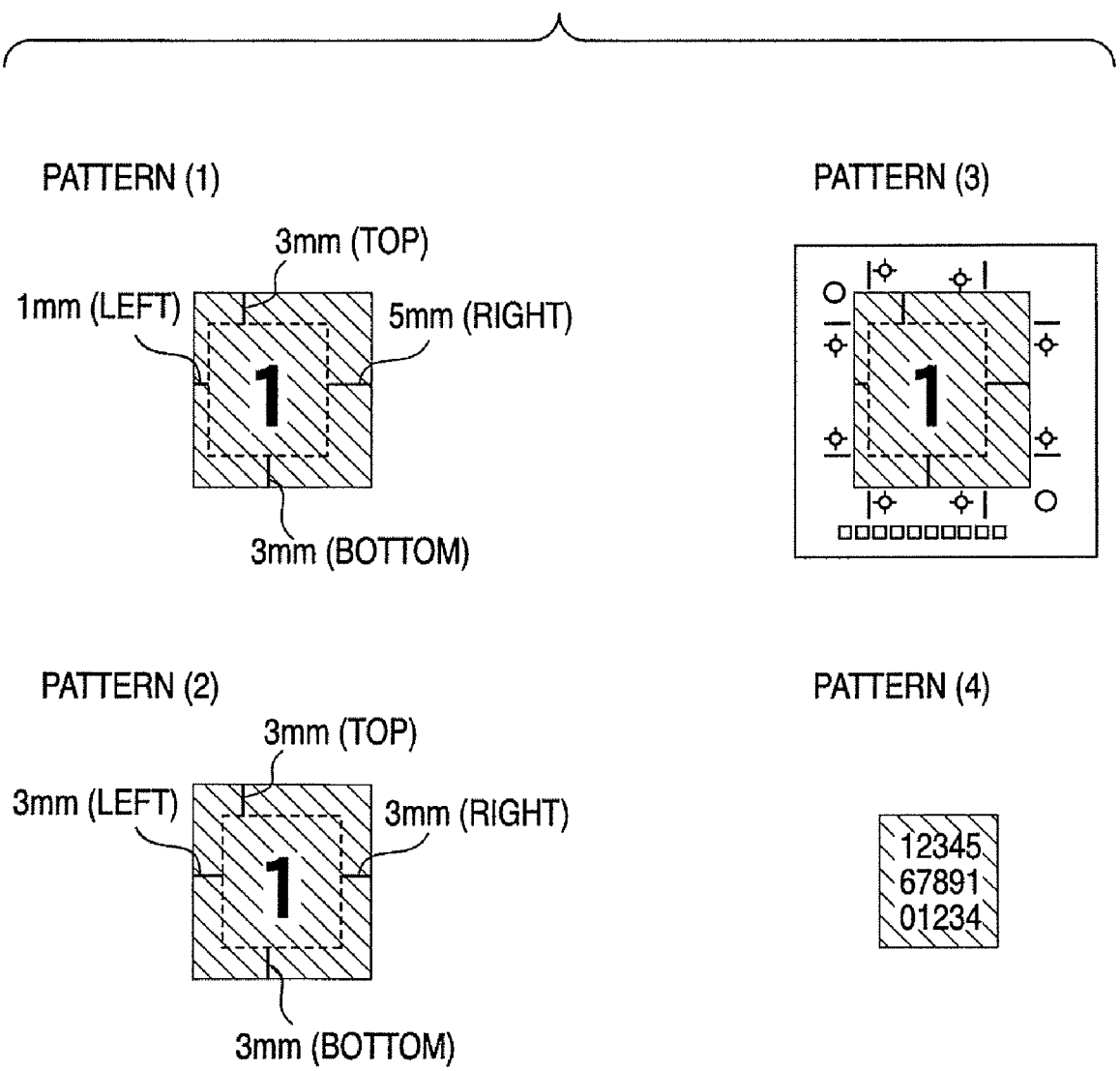
FIG. 37 shows an example of manuscript data according to the embodiment of the present invention.

FIG. 37 shows an example of manuscript data according to the embodiment of the present invention.

This manuscript data is also an example of typical manuscript data to be imported to a general imposition application.

Pattern (1) is an example which has margins of arbitrary widths on the four sides of manuscript data.

Pattern (2) is an example which has margins of the same width on the four sides of manuscript data.

Pattern (3) is an example which has the same margins as those of pattern (1), and is added with information such as printer's marks, a color chart, color balls, and the like as post-processing reference indices, which are added outside the margins by a DTP application upon creation of the manuscript data, and are not required for imposition.

Note that the margin means a region that fills a region between manuscript data and a finishing size region when the manuscript data is smaller than the finishing size.

Pattern (4) is an example in which manuscript data has no margins, and has the same size as the finishing size.

Figure 38A:
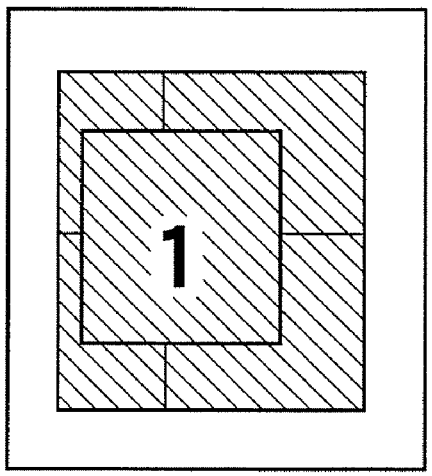
FIG. 38A shows an example of the output result of a manuscript according to the embodiment of the present invention.

FIG. 38A shows the output result when the user imports manuscript data like patterns (1), (2), and (3) and designates "leaflet (1 (vertical)×1 (horizontal)" using the bookbinding application 104.

The manuscript data of pattern (1) is added with the margins of 3 mm (top side), 3 mm (bottom side), 1 mm (left side), and 5 mm (right side), and is created to be larger than the finishing size on the premise of offsetting.

The user designates the size of a finishing page ("finishing size") and its orientation using the bookbinding application 104, and designates the same margin width values (3 mm (top side), 3 mm (bottom side), 1 mm (left side), and 5 mm (right side)) as those of the manuscript data using the menu 1602 on the "printer's mark/bleed setting" window 1600 (FIG. 16) of the bookbinding application 104. In this case, the margin widths and bleed widths (bleeds) have the same meaning.

As a result, when the imposition pattern is bleed region alignment, the bookbinding application 104 allocates the manuscript data to align the center of the manuscript data to that of a "bleed region" obtained by adding the margin widths to the finishing size designated by the user by the processing shown in FIG. 36. As a result, as shown in FIG. 38A, the center of the manuscript data is allocated at that of the finishing page, thus attaining the finish of user's ideals.

Also, in case of pattern (3), the user designates the same margin width values (3 mm (top side), 3 mm (bottom side), 1 mm (left side), and 5 mm (right side)) as those of the manuscript data using the menu 1602 on the "printer's mark/bleed setting" window 1600 (FIG. 16). As a result, in case of bleed region alignment, since enlargement/reduction processing of the manuscript data is skipped, the same finish as in FIG. 38A is attained.

Even when printer's marks, a color bar, and the like are added outside the margin region of the manuscript data, since the bookbinding application 104 prints only a region inside the bleed region, it does not print the originally added printer's marks. If the user designates printer's marks using the bookbinding application 104, the bookbinding application 104 can draw inner and outer printer's marks at the position of the finishing page and those of the margin widths.

In case of the manuscript data of pattern (2) as well, when the user designates the same margin width values (3 mm (top side), 3 mm (bottom side), 1 mm (left side), and 5 mm (right side)) as those of the manuscript data, the bookbinding application 104 allocates the manuscript data to align the center of the manuscript data to that of the bleed region. In this manner, the finish of user's ideals shown in FIG. 38A is attained.

Figure 38B:
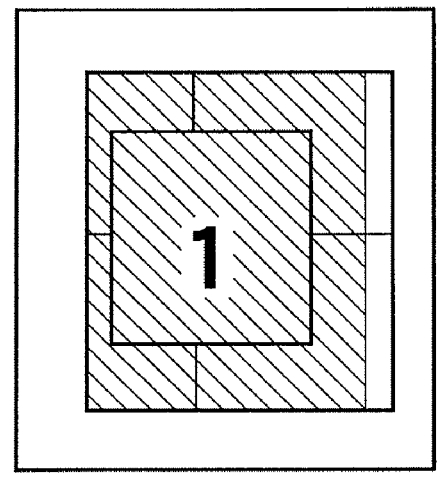
FIG. 38B shows an example of the output result of a manuscript according to the embodiment of the present invention.

By contrast, FIG. 38B shows an example in which centering of manuscript data has failed since the manuscript data of pattern (1) or (3) is allocated based on finishing page reference as in a general imposition application. As can be seen from FIG. 38B, since the manuscript data is simply allocated at the center of the finishing page regardless of the margins of the source manuscript data, the allocation that the user intended cannot be obtained.

Figure 39:
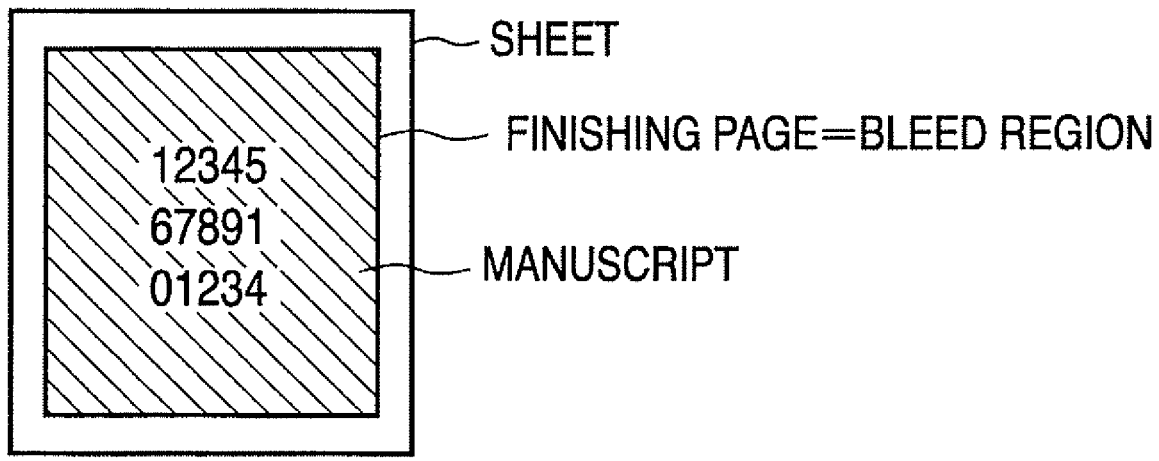
FIG. 39 shows an example of the output result of a manuscript according to the embodiment of the present invention.

In case of the manuscript data without any margins like pattern (4), the finish of user's ideals can be attained if the user sets the margin widths=0 mm using the bookbinding application 104. When the margin widths are set to be 0 mm, since the bleed region=finishing page region, the bookbinding application 104 allocates the manuscript data at the center of the finishing page. As a result, the finish that the user intended can be attained, as shown in FIG. 39.

Figure 40A:
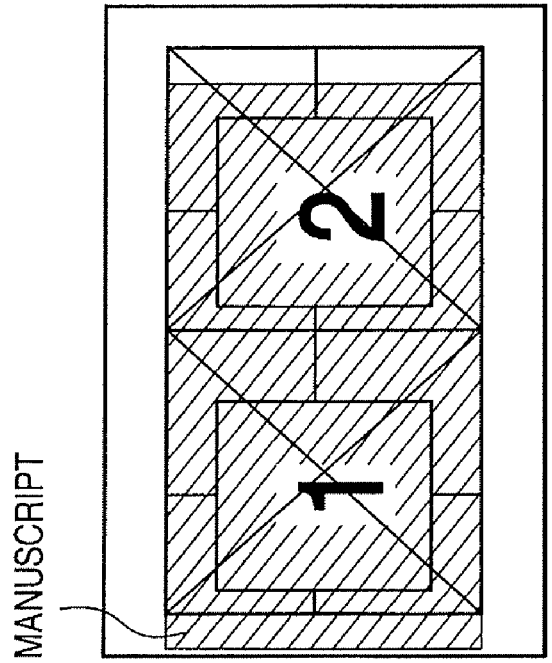
FIG. 40A shows an example of the output result of a manuscript according to the embodiment of the present invention.

FIG. 40A shows the output result when the bookbinding application 104 imposes the manuscript data of patterns (1) to (3) in FIG. 37 using a 1 (vertical)×2 (horizontal) layout. In case of bleed region alignment as in the above case, the bookbinding application 104 allocates the manuscript data at the center of the bleed region. Therefore, the user designates the same margin widths as those of the source manuscript data using the menu 1602 on the "printer's mark/bleed setting" window 1600 (FIG. 16) of the bookbinding application 104. As a result, the finish of user's ideals shown in FIG. 40A can be attained.

Figure 40B:
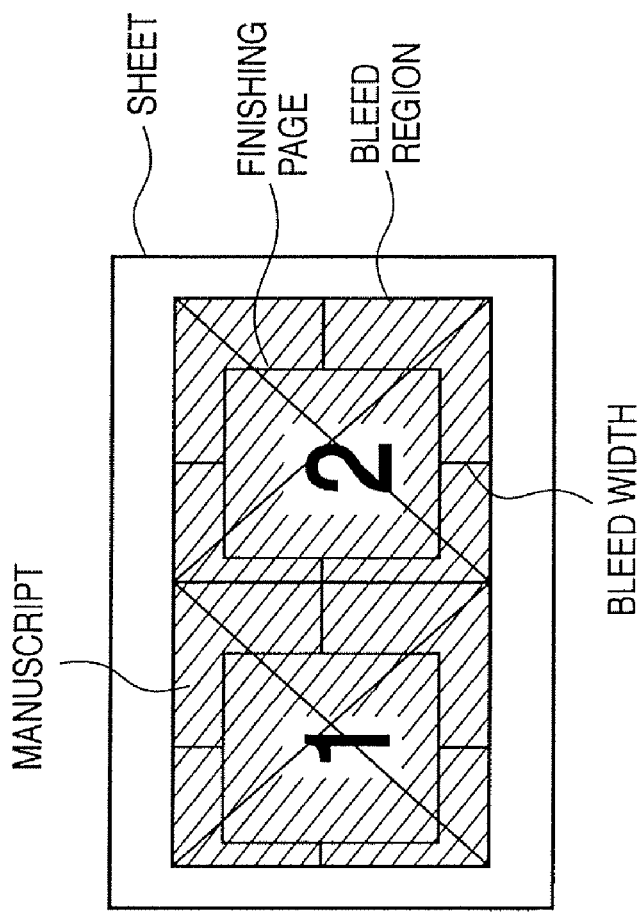
FIG. 40B shows an example of the output result of a manuscript according to the embodiment of the present invention.

On the other hand, FIG. 40B shows an example in which centering of manuscript data has failed since the manuscript data of pattern (1) or (3) is allocated based on finishing page reference as in a general imposition application.

Furthermore, the bookbinding application 104 has a function of creating margins by enlarging manuscript data when the manuscript data has no margins. When the manuscript data does not reach bleed width regions designated by the user, the bookbinding application 104 enlarges/reduces the manuscript data to have a fixed pattern until all the bleed width regions are reached. FIG. 41 shows an example in which the bookbinding application 104 enlarges/reduces manuscript data until the bleed width regions are reached.

The processing shown in FIG. 41 is executed when the check box control 1603 on the "printer's mark/bleed setting"

window 1600 in FIG. 16 is checked (bleed region enlargement/reduction (to enlarge/reduce manuscript data to fit the bleed region).

Figure 42:
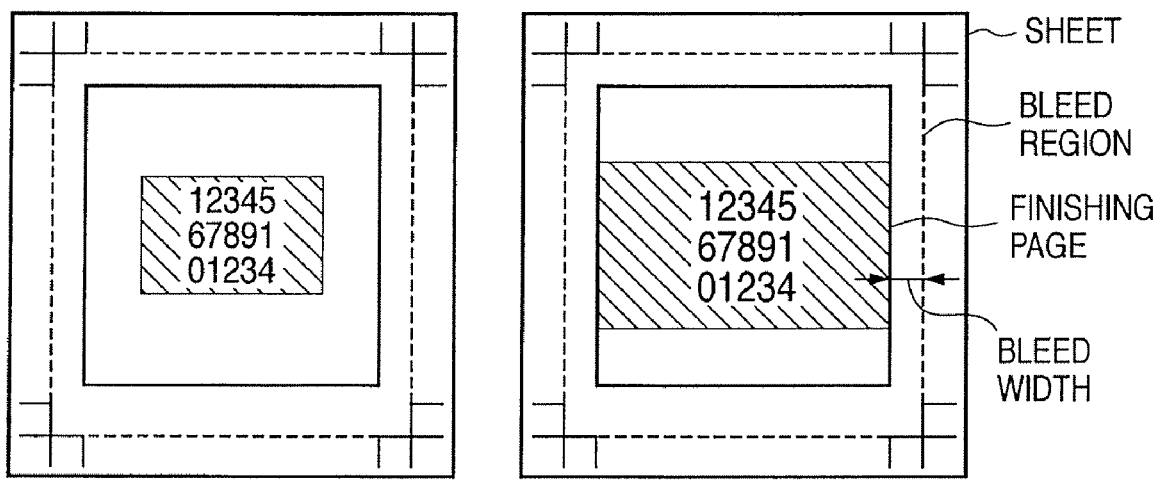
FIG. 42 shows an example of the output result of a manuscript according to the embodiment of the present invention.

The bookbinding application 104 has a function of enlarging/reducing manuscript data to fit the finishing page when the manuscript data is smaller or larger than the size of the finishing page. When the user designates this function, the bookbinding application 104 enlarges/reduces the manuscript data in a fixed pattern to fit (or reach) the finishing size. FIG. 42 shows an example in which the bookbinding application 104 enlarges/reduces, in a fixed pattern, manuscript data to fit the finishing page.

The processing shown in FIG. 42 is executed when the check box control 1403 on the "document style setting" window 1400 in FIG. 14 is checked (finishing enlargement/reduction (to enlarge/reduce manuscript data to fit the finishing page).

Figure 43:
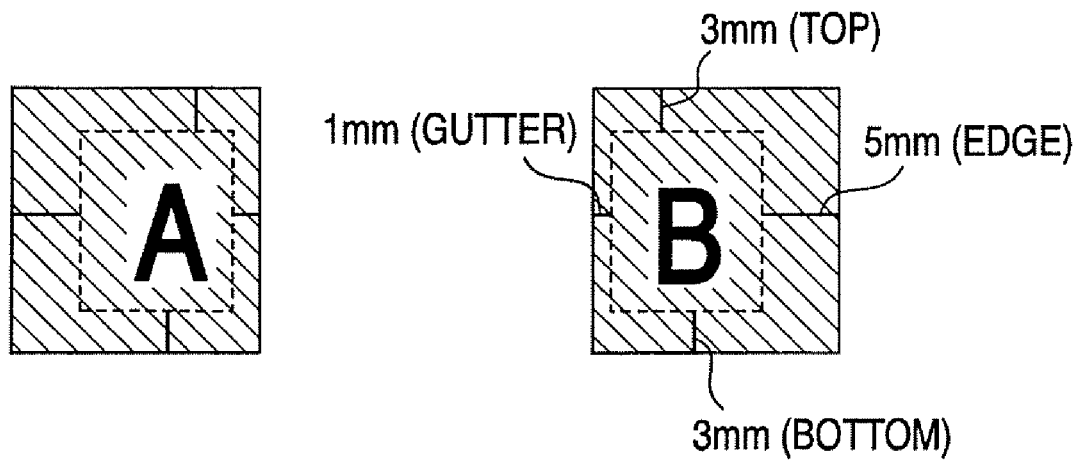
FIG. 43 shows an example of a typical received manuscript according to the embodiment of the present invention.

FIG. 43 shows an example of typical manuscript data for bookbinding, which is imported to an imposition application. In this case, assume that manuscript data has margins of 3 mm (top side), 3 mm (bottom side), 1 mm (gutter), and 5 mm (edge).

FIGS. 44 to 47 show the output results obtained when the user imports the manuscript data shown in FIG. 43, and designates "quarto", "saddle stitching", and "casing-in" using the bookbinding application 104.

The user designates the "finishing size" and its orientation, and the same margin width values as the source manuscript data using the menu 1602 on the "printer's mark/bleed setting" window 1600 (FIG. 16) of the bookbinding application 104. As a result, finishes shown in FIGS. 44 to 47 can be obtained.

Figure 44:
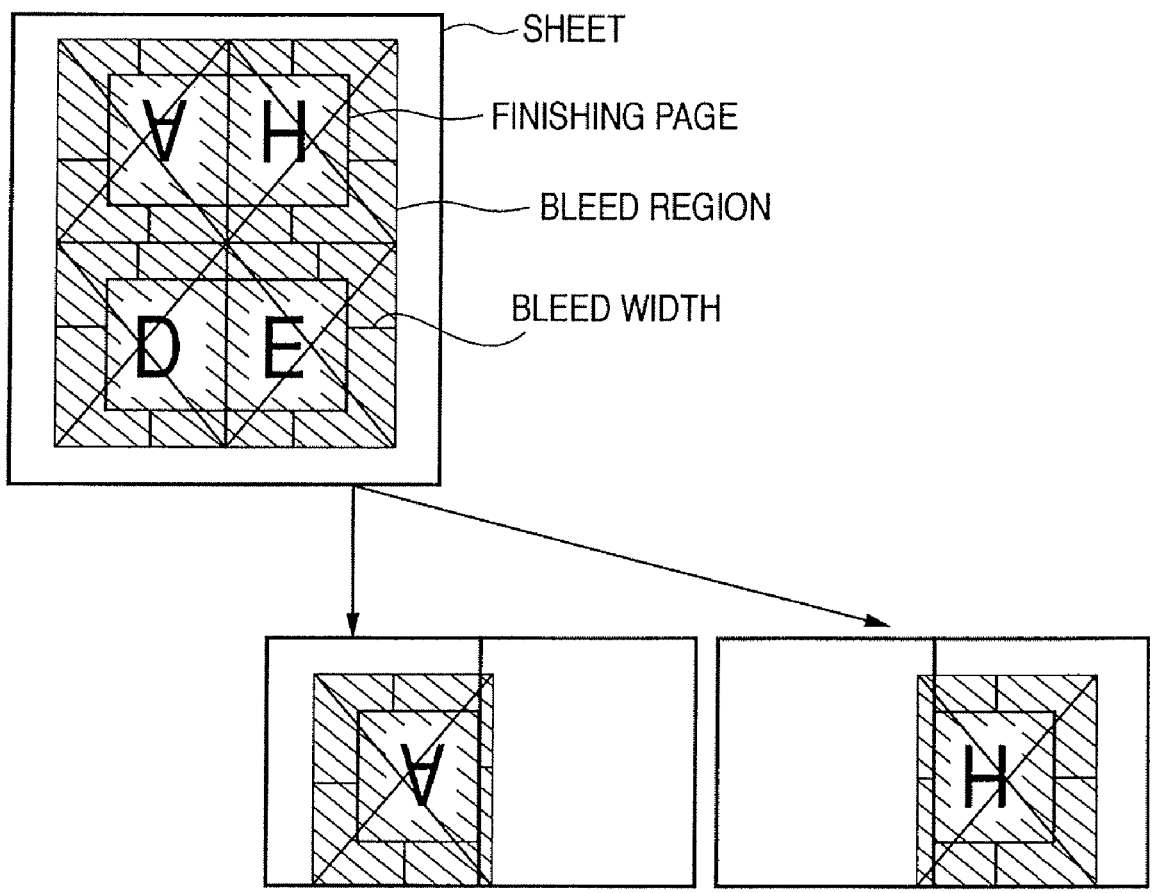
FIG. 44 shows an example of the output result of a manuscript according to the embodiment of the present invention.

FIG. 44 shows the print result obtained when the bookbinding application 104 imposes manuscript data for "quarto". The bookbinding application 104 allocates manuscript data to align the center of each manuscript data to that of a "bleed region" obtained by adding the bleed widths to the finishing size designated by the user in the processing of FIG. 36. Then, the bookbinding application 104 prints only inside the bleed region.

As a result, as shown in FIG. 44, the center of each manuscript data is allocated at that of the finishing page, thus obtaining the finish of user's ideals. As can be seen from FIG. 44, the inner side of the bleed width (bleed) region on the "gutter" side is aligned to the binding side (consequently, the bleed region erodes the finishing page on the opposite side). As a result, the bleed margin region on the "gutter" side is not printed.

Figure 45:
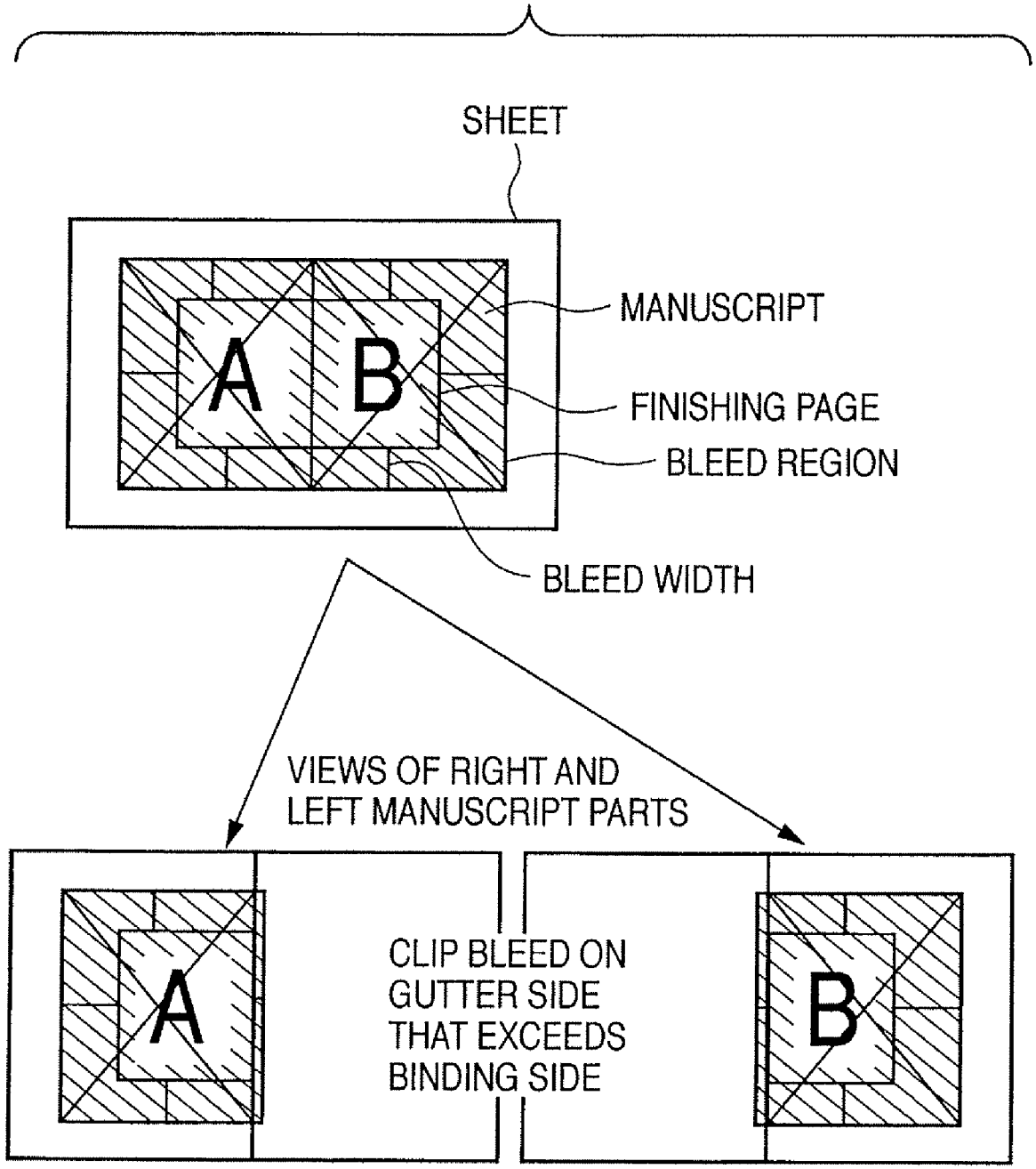
FIG. 45 shows an example of the output result of a manuscript according to the embodiment of the present invention.

FIG. 45 shows the print result obtained when the bookbinding application 104 imposes manuscript data for "saddle stitching". In case of "saddle stitching" as well, the inner side of the bleed width region on the "gutter" side of each of the right and left finishing pages is aligned to the binding side (consequently, the bleed region erodes the finishing page on the opposite side). As a result, the bleed margin region on the "gutter" side is not printed. Based on the processing in FIG. 36, the bookbinding application 104 allocates manuscript data to align the center of each manuscript data to that of each "bleed region" on the sheet layout. As a result, the center of each manuscript data is allocated at that of the finishing page, thus attaining the finish of user's ideals.

Figure 46:
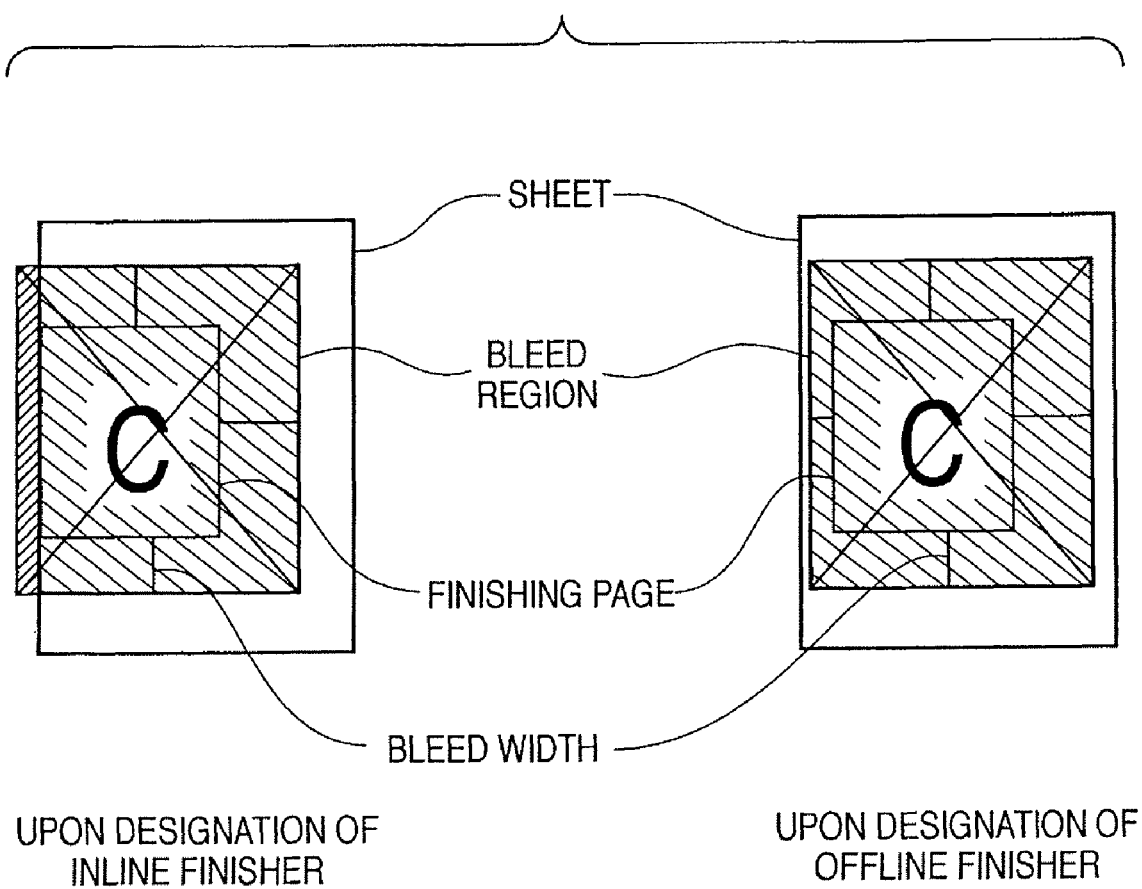
FIG. 46 shows an example of the output result of a manuscript according to the embodiment of the present invention.
Figure 47:
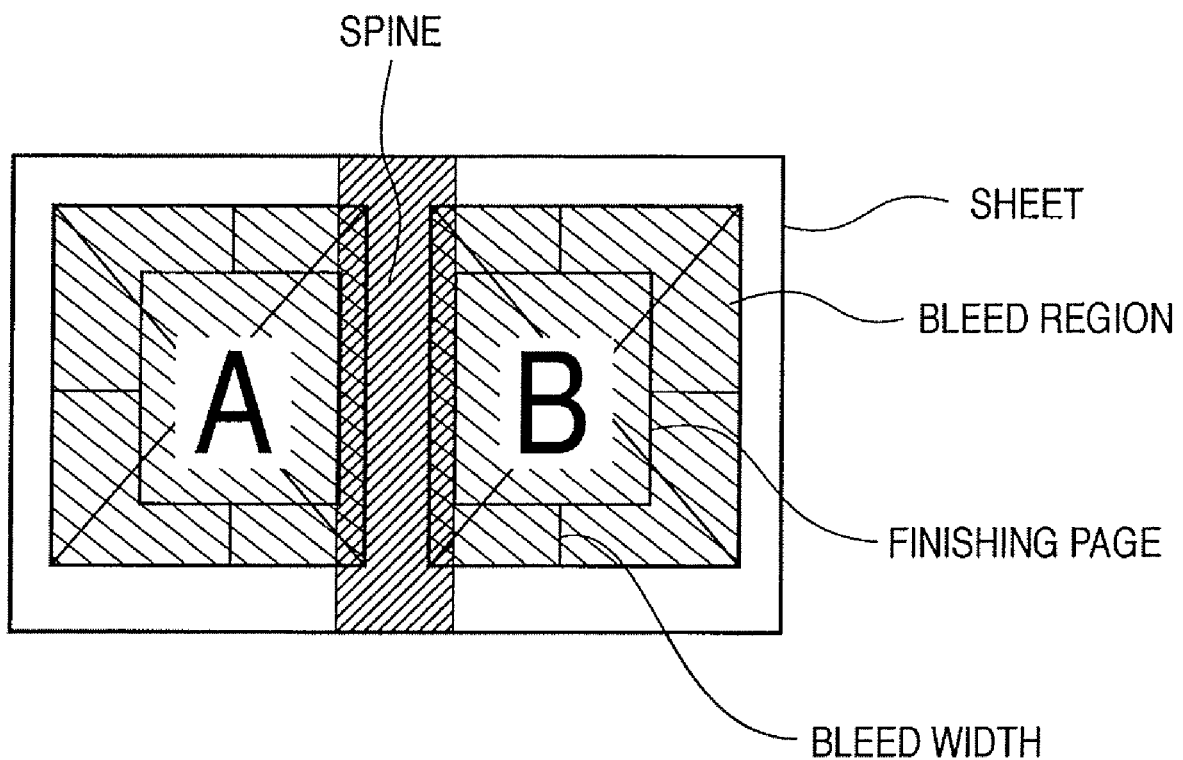
FIG. 47 shows an example of the output result of a manuscript according to the embodiment of the present invention.

FIG. 46 shows the print result of inner sheets obtained when the bookbinding application 104 imposes manuscript data for "casing-in". In case of "casing-in", the bookbinding application 104 determines a sheet layout of inner sheets based on the finishing designation contents. The left side in FIG. 46 indicates the print result upon designation of the inline finisher, and the right side indicates the print result upon designation of the offline finisher.

In case of "casing-in", upon designation of the inline finisher, since the finishing page is allocated against the binding side of a sheet, the bleed margin region on the "gutter" side is set to erode the binding side. As a result, the bleed margin region on the "gutter" side that exceeds the binding side is not printed. Upon designation of the offline finisher, since the finishing page is allocated at the center of a sheet, all bleed regions around the finishing page are printed.

In case of "casing-in", manuscript data is allocated to align the center of manuscript data to that of the "bleed region" on the sheet layout as in "quarto" and "saddle stitching". As a result, the center of manuscript data is allocated at that of the finishing page, thus attaining the finish of user's ideals, as shown in FIG. 46. In this case as well, the user designates the same margin width values as those of the source manuscript data using the menu 1602 on the "printer's mark/bleed setting" window 1600 (FIG. 16). In this way, the finish that the user intended can be obtained.

Furthermore, in FIGS. 44 to 47, when the user designates printer's marks using the bookbinding application 104, "inner printer's marks" can be drawn for the finishing page, "outer printer's marks" can be drawn outside the margin widths, and "fold printer's marks" can be drawn at the position of the binding side.

As described above, according to this embodiment, the bookbinding application 104 allocates manuscript data with reference to a "bleed region" obtained by adding bleed widths designated by the user to the finishing page designated by the user. The bookbinding application 104 does not print any manuscript data which protrudes outside the bleed width region.

Upon designation of booklet imposition, the inner side of the bleed width region on the "gutter" side is set to be aligned with the position of the binding side, so as not to print the bleed width region on the "gutter" side.

In this way, the user can allocate the center of manuscript data that he or she intended at the center of the finishing page after imposition by a simple operation. Also, the bookbinding application 104 can impose any manuscript data without requiring any pre-processing.

Furthermore, the bookbinding application 104 switches an appropriate drawing method between designation of the inline finisher and that of the offline finisher. As a result, the user himself or herself need not selectively create manuscript data for the inline finisher and offline finisher, thus improving the user's convenience.

Note that the flowcharts described in the embodiment can be replaced unless the processing is incomplete.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100400 filed on Mar. 31, 2006, which is hereby incorporated by reference herein in its entirety.

What is claimed is:

1. An information processing apparatus which executes imposition processing for laying out a finishing page on a sheet to print manuscript data on the sheet comprising:
    first setting means for setting a bleed width for the finishing page;
    second setting means for setting an imposition method that requires to execute binding processing of the sheet;
    determination means for determining a bleed region including the finishing page based on the bleed width for the finishing page, which is set by said first setting means, and a size of the finishing page;
    allocation means for determining an allocation of the manuscript data so as to align an inner side of a bleed region on a side to undergo the binding processing of the bleed region determined by said determination means to a binding side on the sheet based on setting contents by said second setting means; and
    third setting means for, when said second setting means sets case binding as an imposition method, setting whether or not the sheet is trimmed using an inline finisher attached to a printing device,
    wherein when said third setting means sets to trim the sheet using the inline finisher attached to the printing device, said allocation means determines the allocation of manuscript data for an inner sheet of casing-in so as to align the inner side of the bleed region on the side to undergo the binding processing of the bleed region determined by said determination means to the binding side on the sheet, and when said third setting means sets not to trim the sheet using the inline finisher attached to the printing device, said allocation means determines the allocation of manuscript data for an inner sheet of case binding so as to leave the bleed region on the side to undergo the binding processing of the bleed region determined by said determination means.

* * * * *